(12) United States Patent
McConnell

(10) Patent No.: US 7,640,254 B2
(45) Date of Patent: Dec. 29, 2009

(54) METHODS, APPARATUS, AND DATA STRUCTURES FOR ANNOTATING A DATABASE DESIGN SCHEMA AND/OR INDEXING ANNOTATIONS

(75) Inventor: Christopher Clayton McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 906 days.

(21) Appl. No.: 11/187,041

(22) Filed: Jul. 22, 2005

(65) Prior Publication Data

US 2005/0256888 A1 Nov. 17, 2005

Related U.S. Application Data

(62) Division of application No. 09/563,900, filed on May 3, 2000, now Pat. No. 6,999,963.

(51) Int. Cl.
G06F 7/00 (2006.01)
G06F 17/00 (2006.01)

(52) U.S. Cl. .................. 707/100; 707/2; 707/3; 707/7; 707/10; 707/205

(58) Field of Classification Search ................ None
See application file for complete search history.

(56) References Cited

U.S. PATENT DOCUMENTS

| | | | |
|---|---|---|---|
| 4,864,502 A | | 9/1989 | Kucera et al. |
| 5,404,295 A | * | 4/1995 | Katz et al. ............... 707/2 |
| 5,495,604 A | * | 2/1996 | Harding et al. ........... 707/102 |
| 5,675,710 A | * | 10/1997 | Lewis ...................... 706/12 |
| 5,884,302 A | | 3/1999 | Ho |
| 5,937,406 A | | 8/1999 | Balabine et al. |
| 5,963,940 A | | 10/1999 | Liddy et al. |
| 6,108,666 A | | 8/2000 | Floratos et al. |
| 6,233,571 B1 | | 5/2001 | Egger et al. |

(Continued)

OTHER PUBLICATIONS

Scott, et al., "Text Classification Using WordNet Hypernyms", retrieved at <<http://citeseer.ist.psu.edu/article/sam98text.html>>, Proceedings of the COLING/ACL Workshop on Usage of WordNet in Natural Language Processing Systems, Montreal, 1998, pp. 45-51.

(Continued)

*Primary Examiner*—Hosain T Alam
*Assistant Examiner*—Usmaan Saeed
(74) *Attorney, Agent, or Firm*—Lee & Hayes, PLLC

(57) ABSTRACT

An authoring tool (or process) to facilitate the performance of an annotation function and an indexing function. The annotation function may generate informational annotations and word annotations to a database design schema (e.g., an entity-relationship diagram or "ERD"). The indexing function may analyze the words of the annotations by classifying the words in accordance with a concordance and dictionary, and assign a normalized weight to each word of each of the annotations based on the classification(s) of the word(s) of the annotation. A query translator (or query translation process) to (i) accept a natural language query from a user interface process, (ii) convert the natural language query to a formal command query (e.g., an SQL query) using the indexed annotations generated by the authoring tool and the database design schema, and (iii) present the formal command query to a database management process for interrogating the relational database.

18 Claims, 26 Drawing Sheets

U.S. PATENT DOCUMENTS

| | | | |
|---|---|---|---|
| 6,272,242 B1 | 8/2001 | Saitoh et al. | |
| 6,327,574 B1* | 12/2001 | Kramer et al. | 705/14 |
| 6,353,830 B1 | 3/2002 | Yee et al. | |
| 6,418,448 B1 | 7/2002 | Sarkar | |
| 6,442,548 B1 | 8/2002 | Balabine et al. | |
| 6,460,043 B1 | 10/2002 | Tabbara et al. | |
| 6,498,921 B1 | 12/2002 | Ho et al. | |
| 6,549,922 B1* | 4/2003 | Srivastava et al. | 707/205 |
| 6,573,907 B1* | 6/2003 | Madrane | 715/719 |
| 6,694,313 B1 | 2/2004 | Roemer | |
| 6,993,475 B1 | 1/2006 | McConnell et al. | |
| 6,999,963 B1* | 2/2006 | McConnell | 707/100 |
| 7,107,218 B1 | 9/2006 | Preston | |
| 7,310,642 B2* | 12/2007 | McConnell et al. | 707/6 |
| 7,512,609 B2* | 3/2009 | McConnell | 707/100 |
| 2002/0099687 A1 | 7/2002 | Krishnaprasad | |
| 2003/0054394 A1* | 3/2003 | Chin et al. | 435/6 |
| 2005/0108001 A1* | 5/2005 | Aarskog | 704/10 |

OTHER PUBLICATIONS

Androutsopoulos I. at al. "Natural Language Interfaces to Databases—An Introduction" Research Paper No. 709 Dept. of Artificial Intelligence University of Edinburgh 1994 pp. 1-50.

Chen et al. "The Entity-Relationship Model—Toward a Unified View of Data" ACM Transactions on Database Systems vol. 1 No. 1 Mar. 1976 pp. 9-36.

Su et al., "Heuristic Algorithms for Path Determination in a Semantic Network" Proceedings of the Fourteenth Annual International Computer Software & Applications Conference (COMPSAC 90), Chicago, IL., Oct. 31-Nov. 2, 1990. pp. 587-592.

\* cited by examiner

| home | movies | restaurants | events | arts & music | places to go | sports | my page | search | newyork.sidewalk™

Find a restaurant   Choose a neighborhood:

[All]

Choose a cuisine type:

[All]

Choose a price range:

[All]   [go!]

Choose a star rating:

[All]

Choose a special option:

[All]

Find this specific restaurant:

[           ]   [go!]

| home | movies | restaurants | events | arts & music | places to go | sports | my page | search |

- About Sidewalk  • Advertising on Sidewalk  • Send us feedback
- © 1998 MIcorsoft and /or its suppliers. All rights reserved. Terms of use.

 

FIGURE 1
(Prior Art)

| home | movies | restaurants | events | arts & music | places to go | sports | my page | search | newyork.sidewalk™

Find a movie  Find this specific movie:

| All | | go! |

Choose a movie type:

| All |

Choose a star rating:

| All | | go! |

Choose a special option:

| All |

| home | movies | restaurants | events | arts & music | places to go | sports | my page | search |

- About Sidewalk    • Advertising on Sidewalk   • Send us feedback
- © 1998 Microsoft and /or its suppliers. All rights reserved. Terms of use.

 

FIGURE 2
(Prior Art)

| home | movies | restaurants | events | arts & music | places to go | sports | my page | search | newyork.sidewalk™

Find a movie theater

Choose a neighborhood:

[All ▾]   [go!]

Choose a special option:

[All ▾]

Find this specific movie:

[_____]   [go!]

| home | movies | restaurants | events | arts & music | places to go | sports | my page | search |

- About Sidewalk  • Advertising on Sidewalk  • Send us feedback
- © 1998 MIcorsoft and /or its suppliers. All rights reserved. Terms of use.

FIGURE 3
(Prior Art)

530

| CUISINE TYPE ID (CTID) | RESTAURANT ID (RID) |
|---|---|
| 2 (AMERICAN) | 1 (FOUR SEASONS) |
| 26 (SEAFOOD) | 2 (OCEANA) |
| 18 (ITALIAN) | 3 (IL MULLINO) |
| 13 (FAST FOOD) | 4 (McDONALDS) |
| * | * |
| * | * |
| * | * |
| 11 (CONTINENTAL) | N (UNION SQUARE CAFE) |

| PERSON/PLACE ID (PPID) | NEIGHBORHOOD ID (NID) |
|---|---|
| 1 (STATUE OF LIBERTY) | 6 (DOWNTOWN) |
| 2 (CHELSEA PIER) | 11 (CHELSEA) |
| 3 (IL MULLINO) | 21 (LITTLE ITALY) |
| 4 (UNION SQUARE CAFE) | 31 (UNION SQUARE) |
| * | * |
| * | * |
| * | * |
| M (NEW YORK STOCK EXCHANGE) | 14 (FINANCIAL DISTRICT) |

Manual annotations on tables
Manual annotations on columns
Automatic annotations on rows

| FRAGMENT (PATTERN OBJECT)1,1 | COST 1,1 = 1 |
|---|---|
| FRAGMENT (PATTERN OBJECT)1,2 | COST 1,2 = 3 |
| FRAGMENT (PATTERN OBJECT)1,3 | COST 1,3 = 5 |

CLIQUE 1

| FRAGMENT (PATTERN OBJECT)2,1 | COST 2,1 = 2 |
|---|---|
| FRAGMENT (PATTERN OBJECT)2,2 | COST 2,2 = 6 |

CLIQUE 2

| FRAGMENT (PATTERN OBJECT)3,1 | COST 3,1 = 4 |
|---|---|
| FRAGMENT (PATTERN OBJECT)3,2 | COST 3,2 = 8 |

CLIQUE 3

FIGURE 23

METHODS, APPARATUS, AND DATA STRUCTURES FOR ANNOTATING A DATABASE DESIGN SCHEMA AND/OR INDEXING ANNOTATIONS

RELATED PATENT APPLICATION(S)

This U.S. Nonprovisional Patent Application is a Divisional Application of co-pending U.S. Nonprovisional patent application Ser. No. 09/563,900, filed on May 3, 2000, and entitled "METHODS, APPARATUS, AND DATA STRUCTURES FOR ANNOTATING A DATABASE DESIGN SCHEMA AND/OR INDEXING ANNOTATIONS". application Ser. No. 09/563,900 is hereby incorporated by reference in its entirety herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

§ 1. BACKGROUND OF THE INVENTION

§ 1.1 Field of the Invention

The present invention concerns an interface to stored information (e.g., a database), and in particular, concerns a natural language interface for generating queries to a database or database management system.

§ 1.2 Related Art

In recent decades, and in the past five to ten years in particular, computers have become interconnected by networks by an ever increasing extent; initially, via local area networks (or "LANs"), and more recently via wide area networks (or "WANs") and the Internet. The proliferation of networks, in conjunction with the increased availability of inexpensive data storage means, has afforded computer users unprecedented access to a wealth of data. Unfortunately, however, the very vastness of available data can overwhelm a user; desired data can become difficult to find and search heuristics employed to locate desired data often return unwanted data.

Various concepts have been employed to help users locate desired data. In the context of the Internet for example, some services have organized content based on a hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through menus. If a user mistakenly believes that a category will be of interest or include what they were looking for, but the category turns out to be irrelevant, the user must backtrack through one or more hierarchical levels of categories.

Again in the context of the Internet for example, some services provide "search engines" which search databased content or "web sites" pursuant to a user query. In response to a user's query, a rank ordered list, which includes brief descriptions of the uncovered content, as well as a hypertext links (text, having associated Internet address information, which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content to be returned in response to a query. Again, unfortunately, the very wealth of available content impairs the efficacy of these search engines since it is difficult to separate irrelevant content from relevant content.

Formal query languages, which include relatively simple declarative command query languages such as SQL (structured query language) for example, facilitate access to information stored in databases. Such formal command languages avoid ambiguities and are consequently easily interpreted by computer-based database management systems. Unfortunately, however, formal command query languages are difficult to learn and master, at least by non-computer specialists.

A form-based query interface may be used to ensure that queries are entered in canonical (i.e., unambiguous) form. A "query-by-example" interface is a more powerful form-based query interface. With a query-by-example database interface, a user can combine an arbitrary number of forms, where each form reflects the structure of a database table (or relation).

An example of a query-by-example database query interface is shown in the New York City SIDEWALK™ city guide Internet Website at "http://newyork.sidewalk.com/find a restaurant", a portion of which is shown in FIG. 1. The query interface depicted in FIG. 1 includes five (5) field types (i.e., "neighborhood", "cuisine type", "price range", "star rating" and "special option") that are logically ANDed together to construct a query. Each of the five (5) field types may include a pull down menu that will be familiar to those who use "Windows 98" or Windows NT® operating systems sold by Microsoft Corporation of Redmond, Wash. Alternatively, information associated with a specific restaurant may be requested. FIGS. 2 and 3 depict similar form-based query-by-example interfaces for finding a movie and for finding a movie theater, respectively.

Although the form-based database query interfaces are fairly easy to use and intuitive, particularly for those familiar with pull down menus, the fact that they ensure proper entry of the query, by their nature, constrains their flexibility. For example, some believe that queries involving negation or quantification (e.g., "Which movies have no violent scenes?" or "Which movies are playing in every theater?") are difficult to express using form-based query interfaces. Moreover, form-based (as well as formal) query interfaces are not particularly well suited for use with speech recognition input devices. Furthermore, users often would prefer to query a database in an even more intuitive method. The ultimate goal in this regard is to permit natural language database queries, such that database queries may be made in the same way people ask other people for information.

Thus, a goal of the present invention is to provide a natural language interface to stored (e.g., databased) information. The natural language interface to the stored information (e.g., a database) should be (i) easy, in terms of effort and expertise required, to author, and (ii) robust with respect to linguistic and conceptual variation (and consequently, easy to use). Each of these issues is addressed below.

More specifically, with respect to authoring, many natural language query interfaces require tedious and lengthy configuration phases before they can be used. Since many natural language query interfaces are designed for a particular database application, any authoring burdens will inhibit porting the natural language query interface to different applications. Thus, the authoring process of a natural language query interface should be relatively simple and quick so that the author need not be an expert and so that it can be easily ported to different applications.

With respect to robustness to linguistic and conceptual variations, a natural language query interface should meet a number of known challenges. Such challenges include modifier attachment ambiguities, quantifier scope ambiguities, conjunction and disjunction ambiguities, nominal compound ambiguities, anaphora, and elliptical sentences, each of which is briefly introduced below.

First, regarding modifier attachment ambiguities, a natural language query may include modifiers that modify the meaning of other syntactic constituents. For example, in the query "List all restaurants serving steak having excellent reviews", it is unclear whether the modifier "having excellent reviews" attaches to "restaurants" or "steak". The challenge is to identify the constituent to which each modifier has to be attached. In the past, semantic knowledge or heuristics were used in an attempt to resolve such ambiguities. Unfortunately, providing such semantic knowledge or heuristics increases the burden of authorizing such natural language query interfaces.

Regarding quantifier scope ambiguities, determiners like "a", "each", "all", "some", etc. are usually mapped to logic quantifiers. It may be difficult to determine the scope of such quantifiers. For example, in the query, "Has every movie received some award?", either (a) each movie is allowed to have received different awards or (b) all movies must have received the same award. One known approach to resolving quantifier scope ambiguities is to prefer scopings preserving a left-to-right order of the quantifiers. Another known approach is to associate a numeric strength to each determiner.

Regarding conjunction and disjunction ambiguities, the word "and" can be used to denote disjunction or conjunction. For example, in the query "What people were born in Washington and Oregon?", the "and" should probably be interpreted as an "or". One known approach uses heuristics to determine cases in which it is conceptually impossible for "and" to denote conjunction and, in such cases, interprets "and" as "or".

Regarding nominal compound ambiguities, in which a noun is modified by another noun or an adjective, it may be difficult to determine the meaning of such compounds. One known approach has required the meaning of each possible noun-noun or adjective-noun compound to be declared during a configuration of a natural language query interface. However, such an approach increases the complexity and tedium of the authoring process.

Anaphora describes a linguistic phenomenon in which pronouns, possessive determiners, and noun phrases are used to denote, implicitly, entities mentioned earlier in a discourse. For example, in query "Does it accept credit cards?", the pronoun "it" refers to a previously introduced noun. For example, "it" may be interpreted as "the Four Seasons" if the preceding query was, "Is the Four Seasons restaurant expensive?". A similar problem is presented by the use of incomplete (or elliptical) sentences, the meaning of which is inferred from a context of a discourse. For example, the elliptical query, "What about Oceana?" means "Does Oceana serve seafood" when it follows the query "Does the Four Seasons serve seafood?" Known natural language systems use a discourse model or contextual substitution rules to properly handle elliptical queries. Otherwise, to avoid the problems of anaphora and elliptical queries, the user would have to repeatedly type in the proper noun, possessive, etc. which can become annoying for the user.

Another challenge to natural language query interfaces is to make computer users comfortable with using them. Users may often improperly use natural language query interfaces because they might not be familiar with limitations of the natural language query interface. That is, they might not know how to construct a query, what they can ask for and they can't ask for. They may assume that a particular query may be processed that, in fact, cannot be processed (also referred to as a "false positive expectation"). On the other hand, they may assume that a particular query cannot be processed that, in fact, can be processed (also referred to as a "false negative expectation"). Moreover, if a query is not processed, it is often unclear to the user whether the query was beyond the system's linguistic capabilities or its conceptual capabilities. Such user uncertainty, and consequent discomfort, can lead to frustration, which may ultimately cause users to abandon a particular natural language query interface.

Thus, there is a need for a natural language query interface which can handle linguistic and contextual ambiguities while, at the same time, minimizing authoring burdens.

§ 2 SUMMARY OF THE INVENTION

The present invention provides methods, apparatus, and data structures for facilitating the performance of at least one of two (2) basic functions. First, an authoring function facilitates the annotation of semantic information related to the design of a database. Second, a translation function facilitates the conversion of a natural language query to a formal command query for interrogating the database.

Basically, the authoring tool (or process) may facilitate the performance of an annotation function and an indexing function. The annotation function may generate informational annotations and word annotations to a database design schema (e.g., an entity-relationship diagram or "ERD"). Informational annotations may (i) distinguish tables corresponding to entities and those corresponding to properties (or attributes) in the database, (ii) attach to rows of the tables, a probability that the row will be referenced, and/or (iii) describe entities in a way that is meaningful to humans. Word annotations may attach related words to tables, rows, columns, or relationships of the database design schema. The indexing function may analyze the words of the annotations by classifying the words in accordance with a concordance and dictionary, and assign a normalized weight to each word of each of the annotations based on the classification(s) of the word(s) of the annotation.

The query translator (or query translation process) may function to (i) accept a natural language query from a user interface process, (ii) convert the natural language query to a formal command query (e.g., an SQL query) using the indexed annotations (and other annotations) generated by the authoring tool and the database design schema, and (iii) present the formal command query to a database management process for interrogating the relational database.

§ 3 BRIEF DESCRIPTION OF THE DRAWINGS

FIG. 1 is a form based interface for submitting a query to databases to find a restaurant.

FIG. 2 is a form based interface for submitting a query to databases to find a movie.

FIG. 3 is a form based interface for submitting a query to databases to find a movie theater.

FIGS. 5 and 6 depict exemplary relations (or tables) of relational databases.

Figure 12:
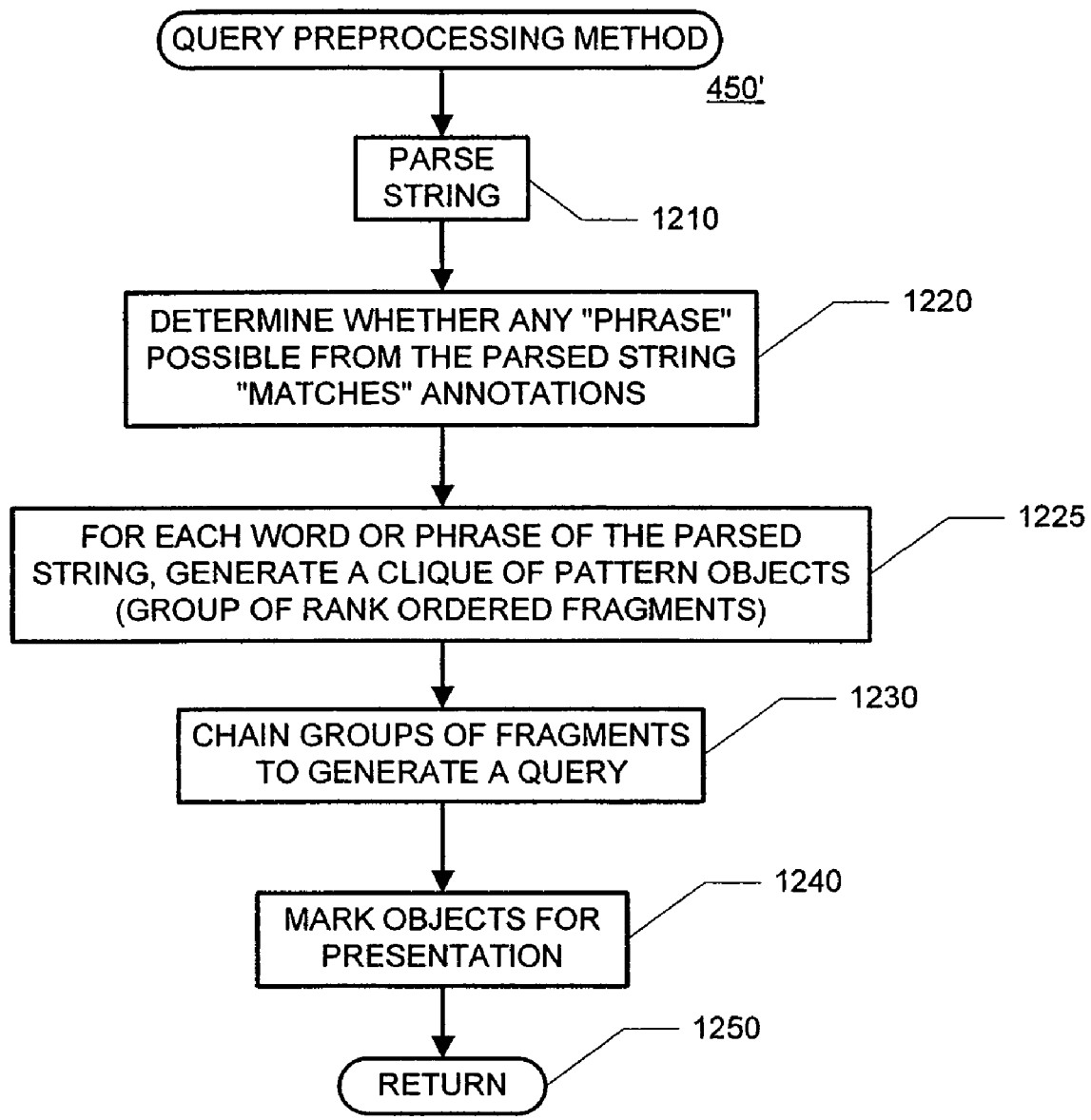
FIG. 12 is a high level flow diagram of an exemplary query translation process that may be carried out by a query translator of the present invention.
Figure 15A:
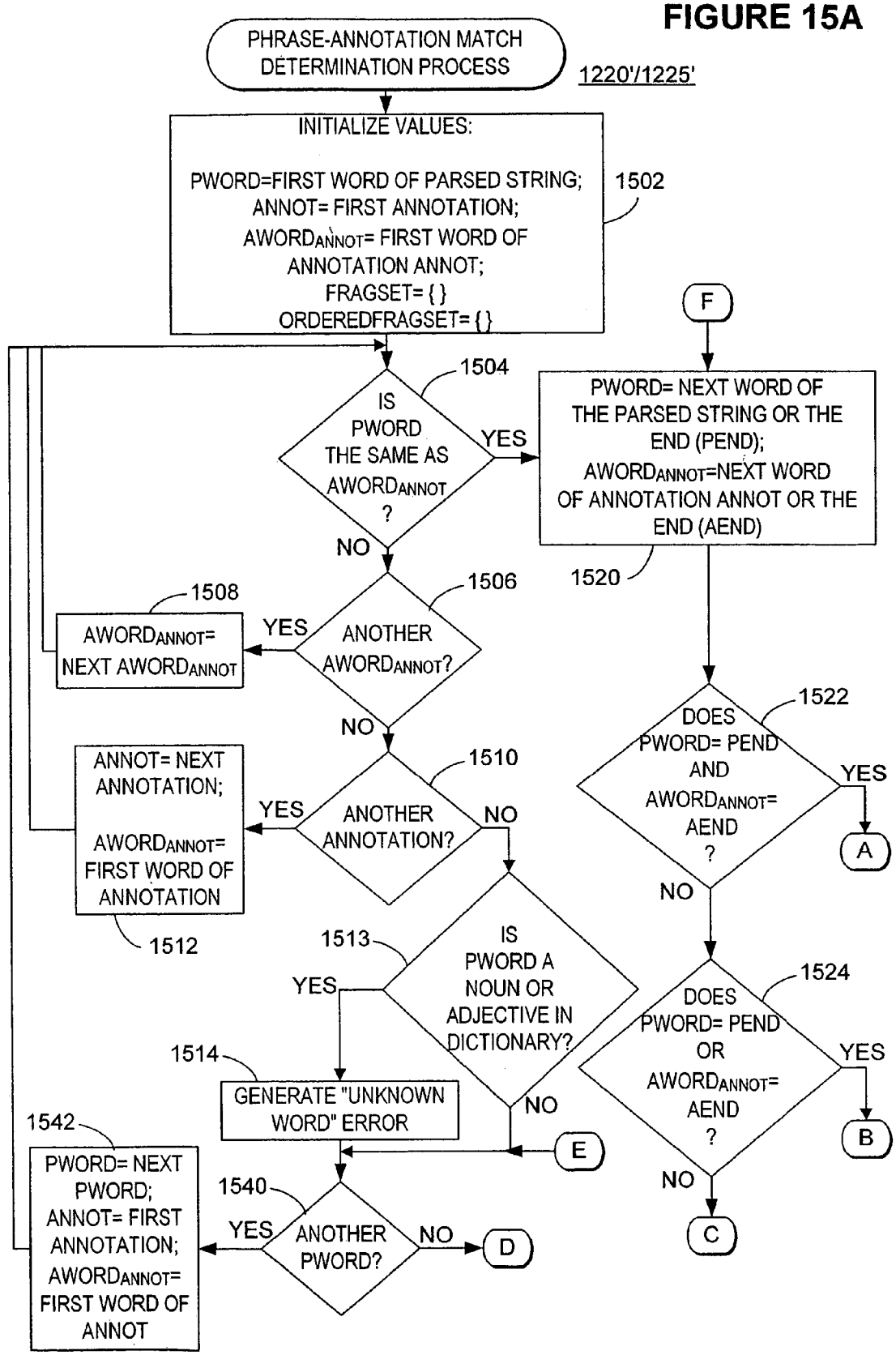
Figure 15:
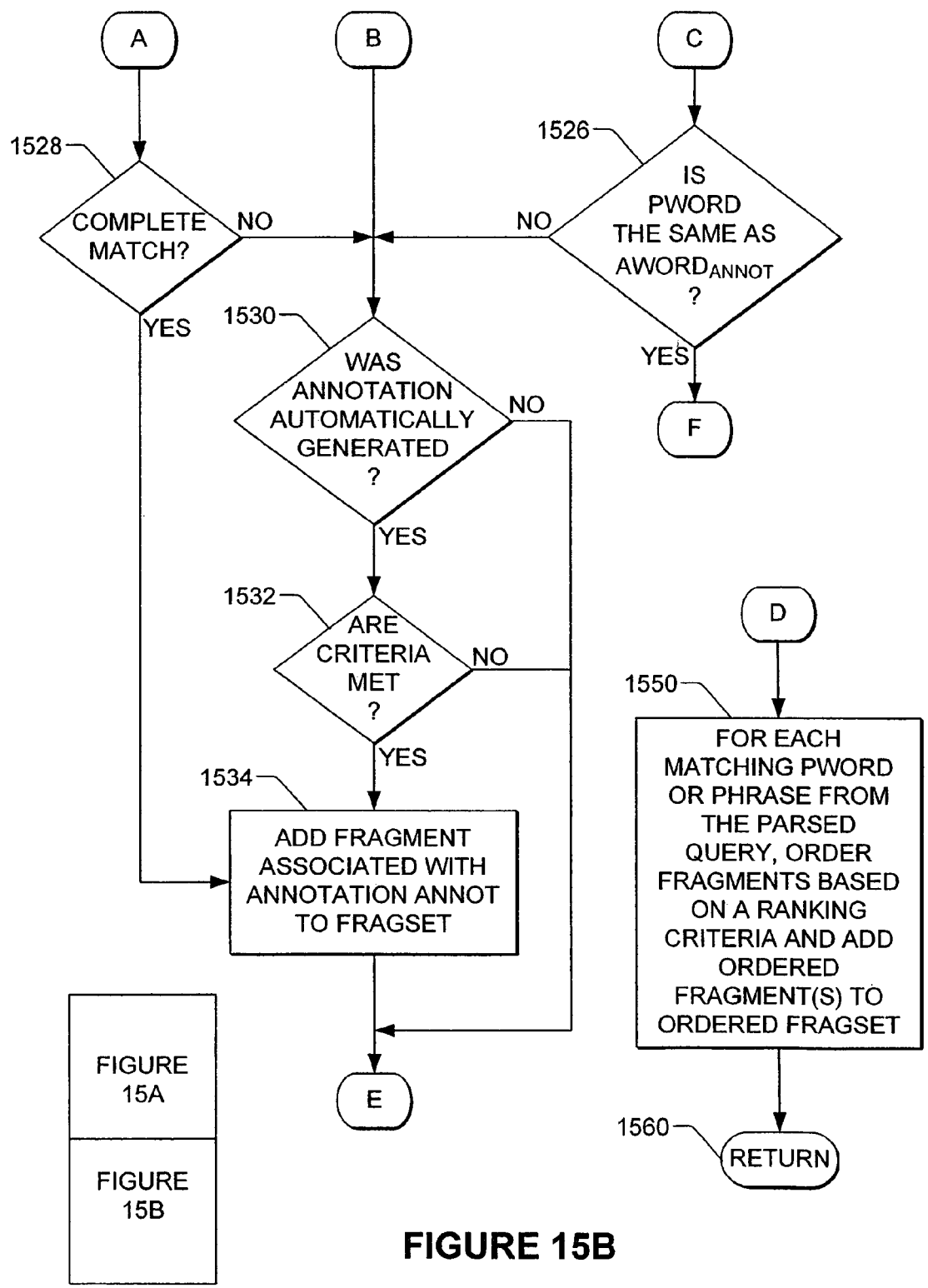

FIG. 15, which includes FIGS. 15A and 15B, is a flow diagram of an exemplary phrase-annotation match determination process that may be used by the exemplary query translation process of FIG. 12.

Figure 16:
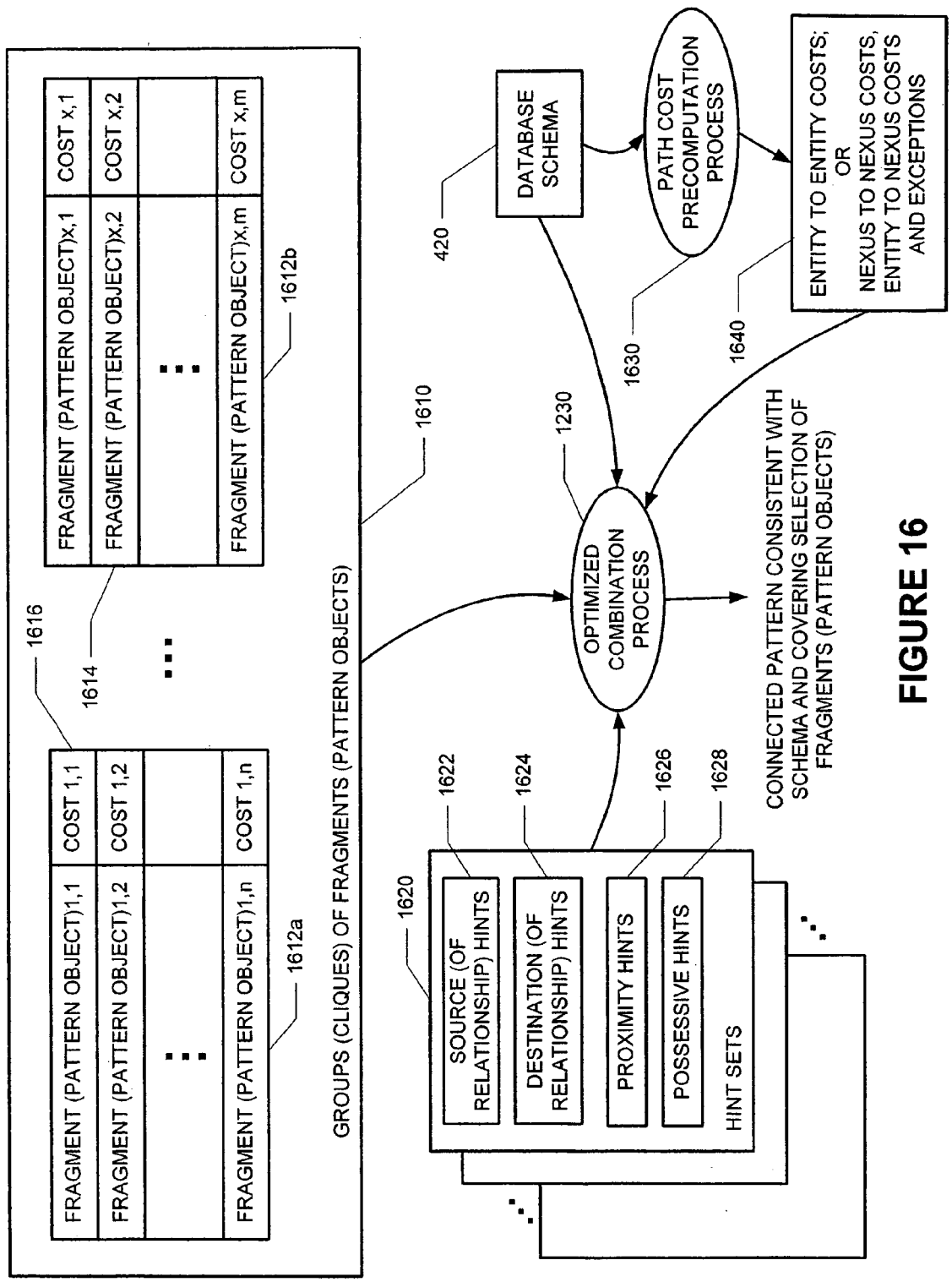

FIG. 16 illustrates information that may be used by a path cost precomputation process and an optimized combination process.

Figure 17:
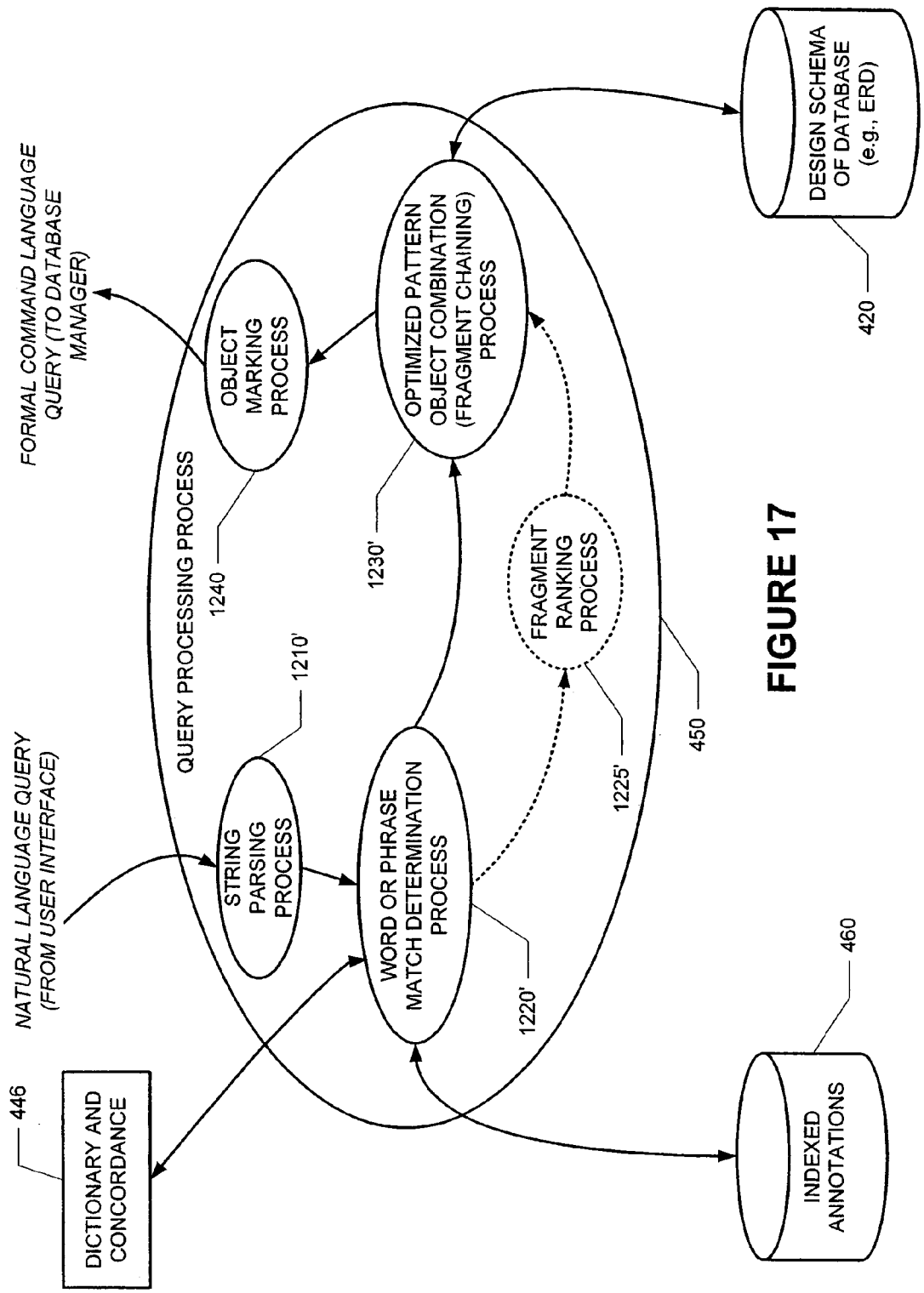

FIG. 17 is a diagram of processes which may be used in a query translation process.

Figure 18:
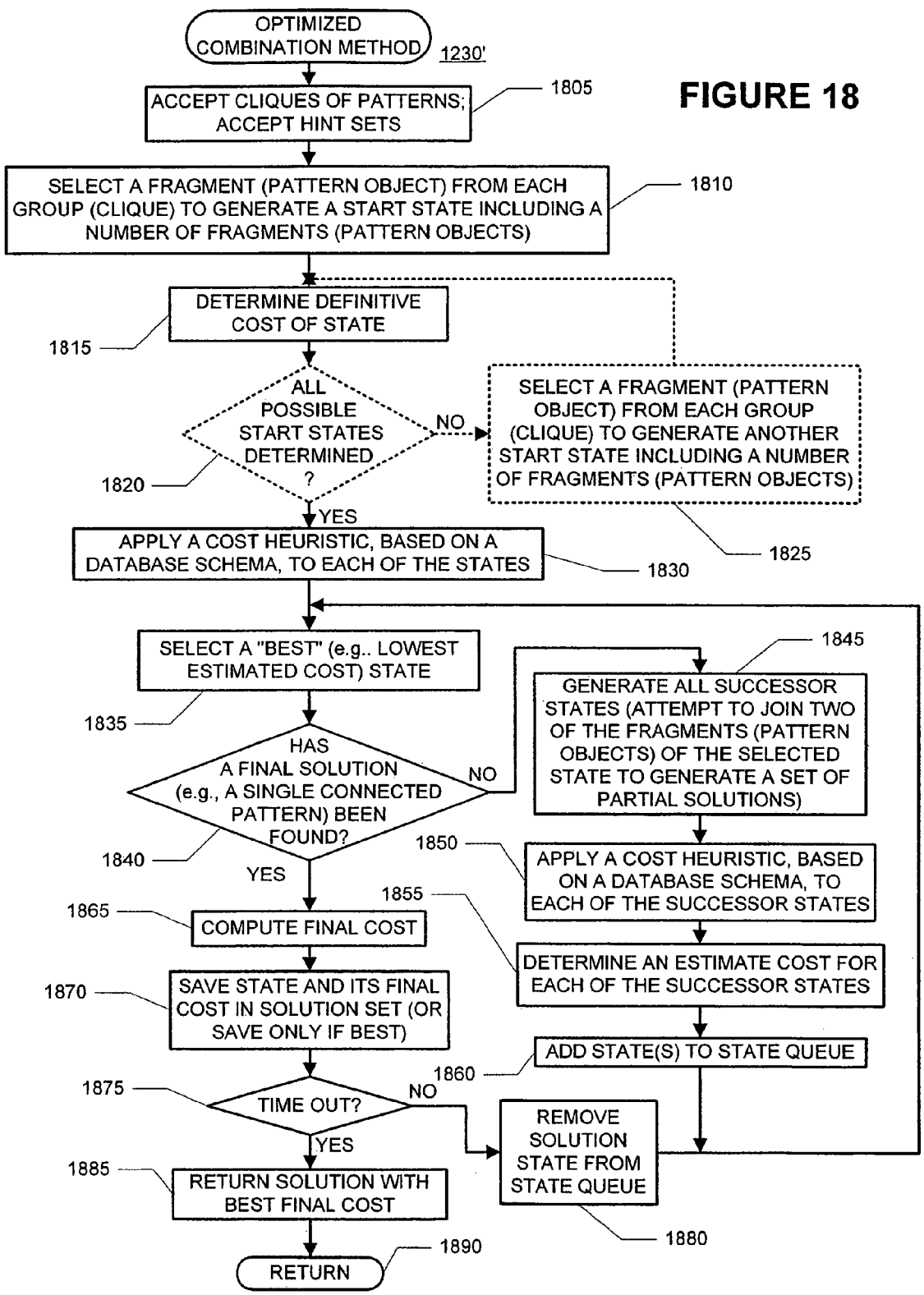

FIG. 18 is a high level flow diagram of an exemplary method which may be used to effect an optimized (pattern) combination process.

Figure 19:
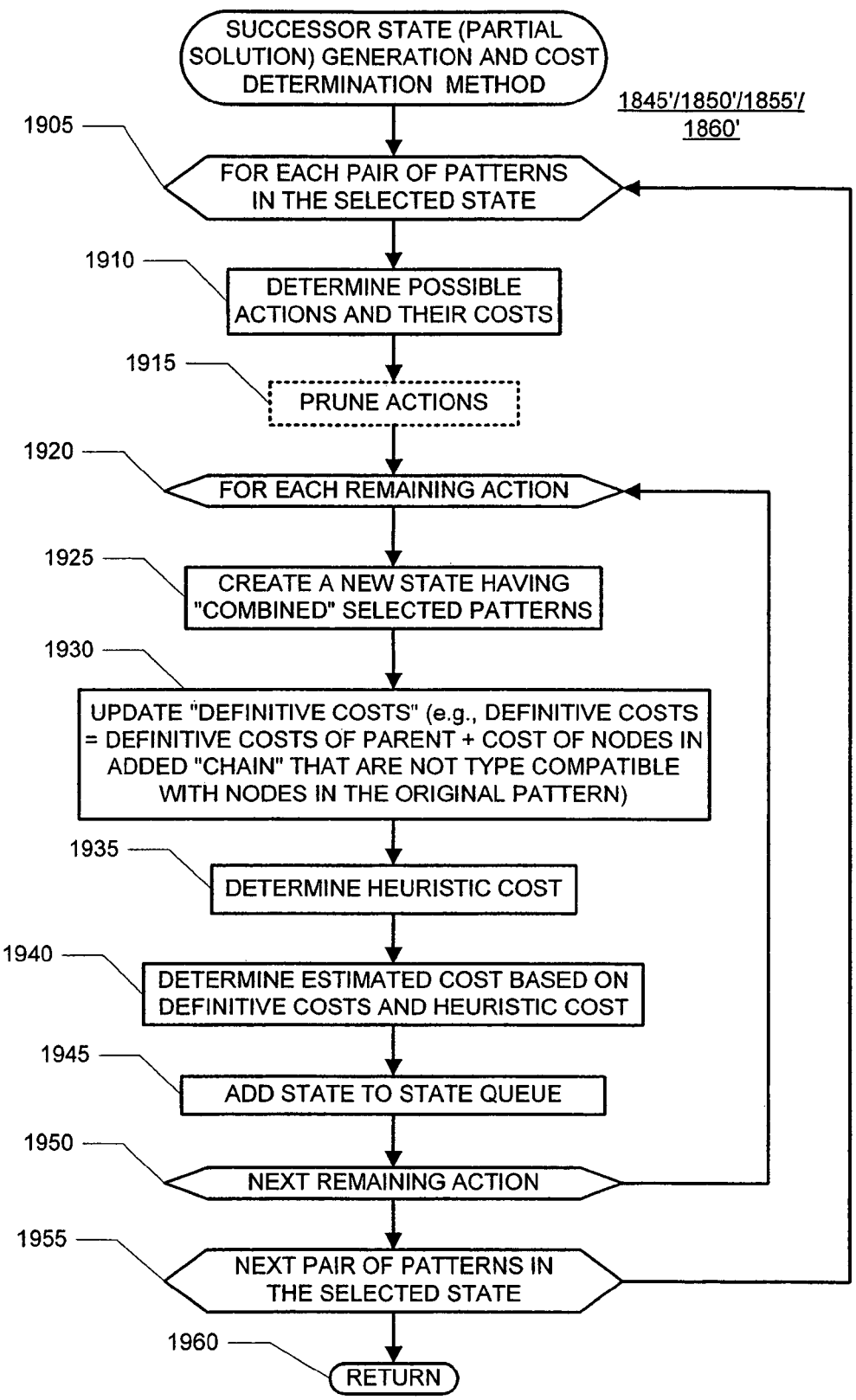

FIG. 19 is a high level flow diagram of an exemplary method which may be used to effect successor state generation and cost determination processes.

Figure 20:
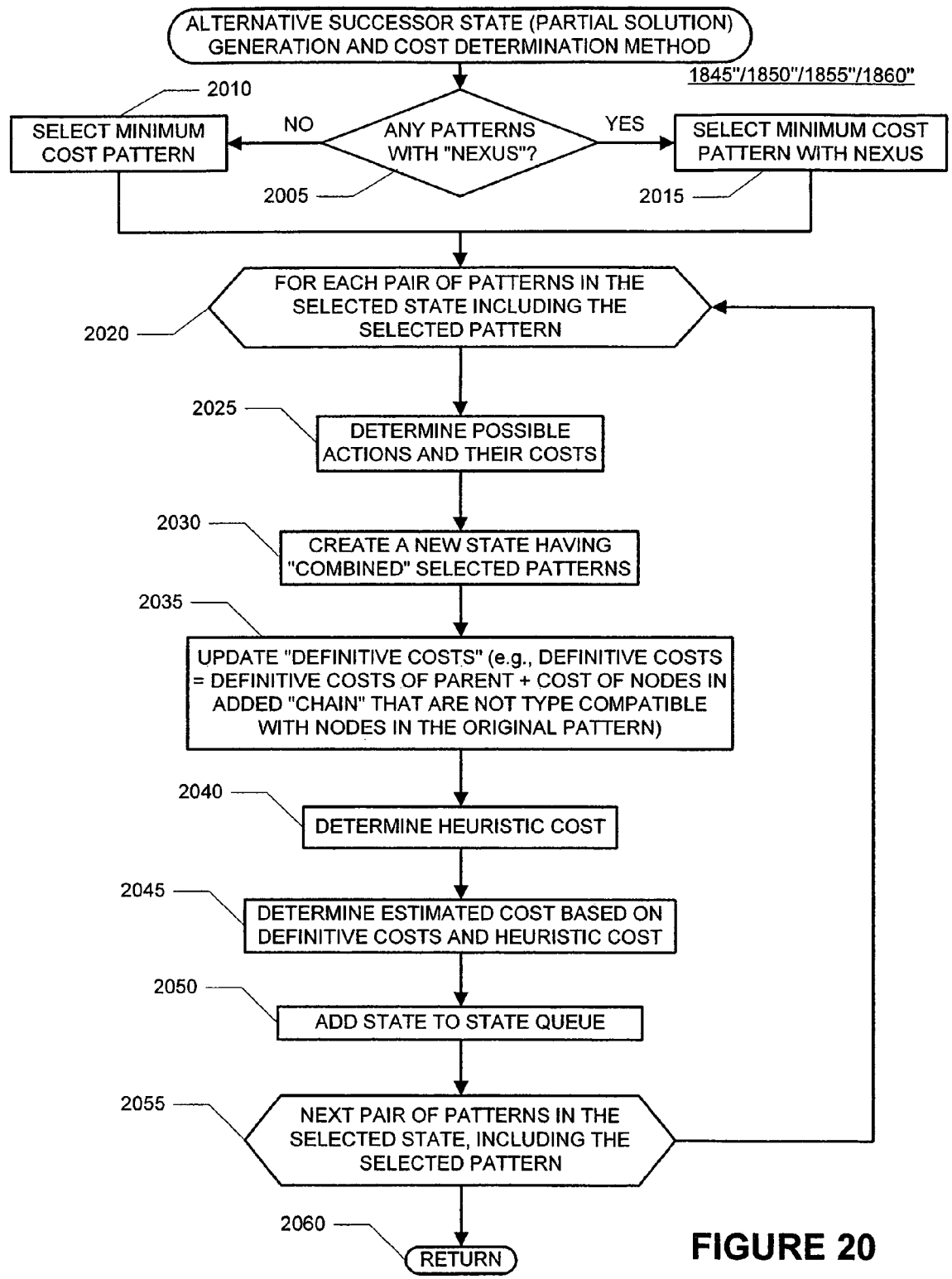

FIG. 20 is a high level flow diagram of an alternative exemplary method which may be used to effect successor state generation and cost determination processes.

Figure 21:
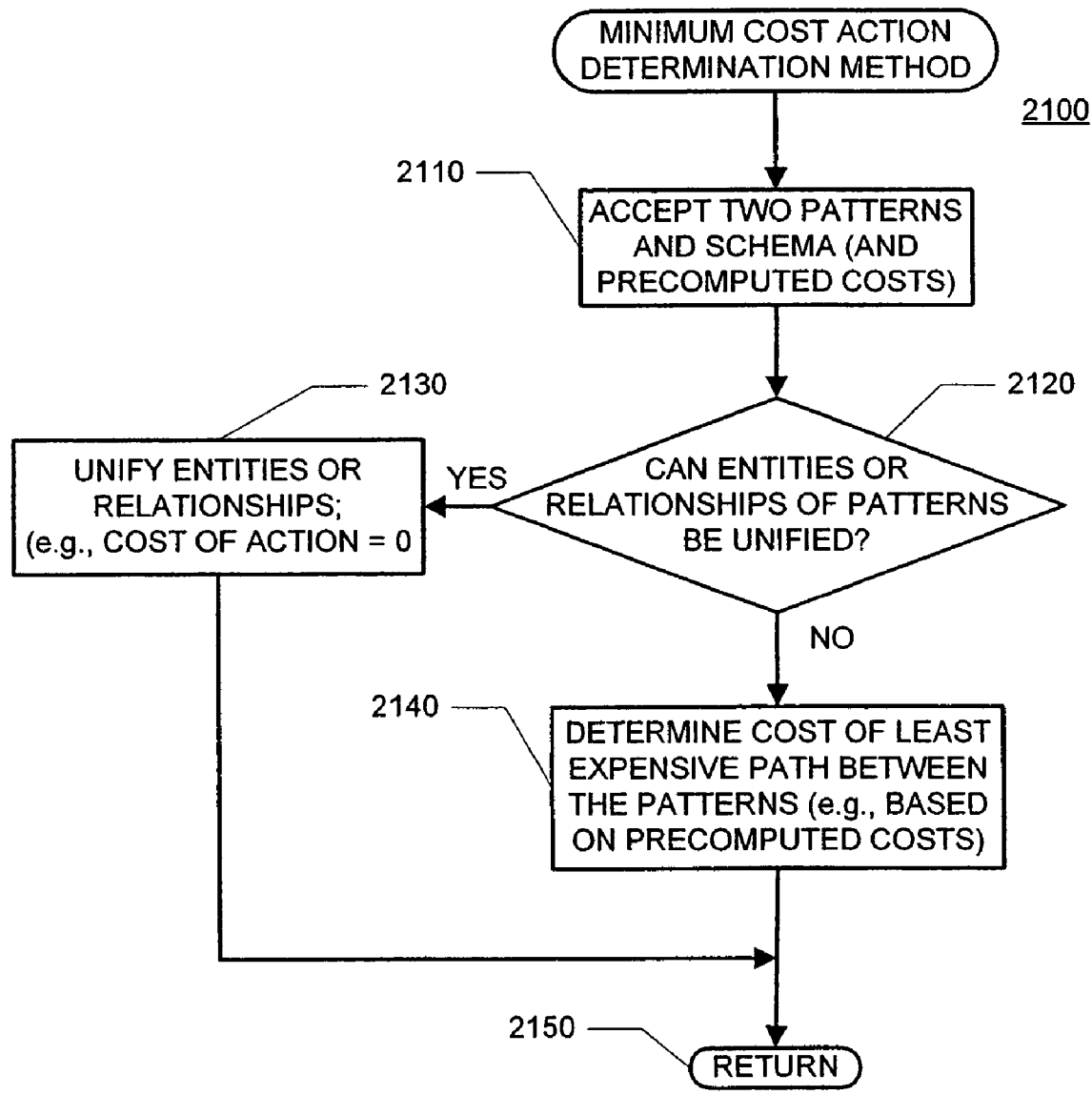

FIG. 21 is a high level flow diagram of an exemplary method which may be used to determine a minimum cost action.

Figure 22:
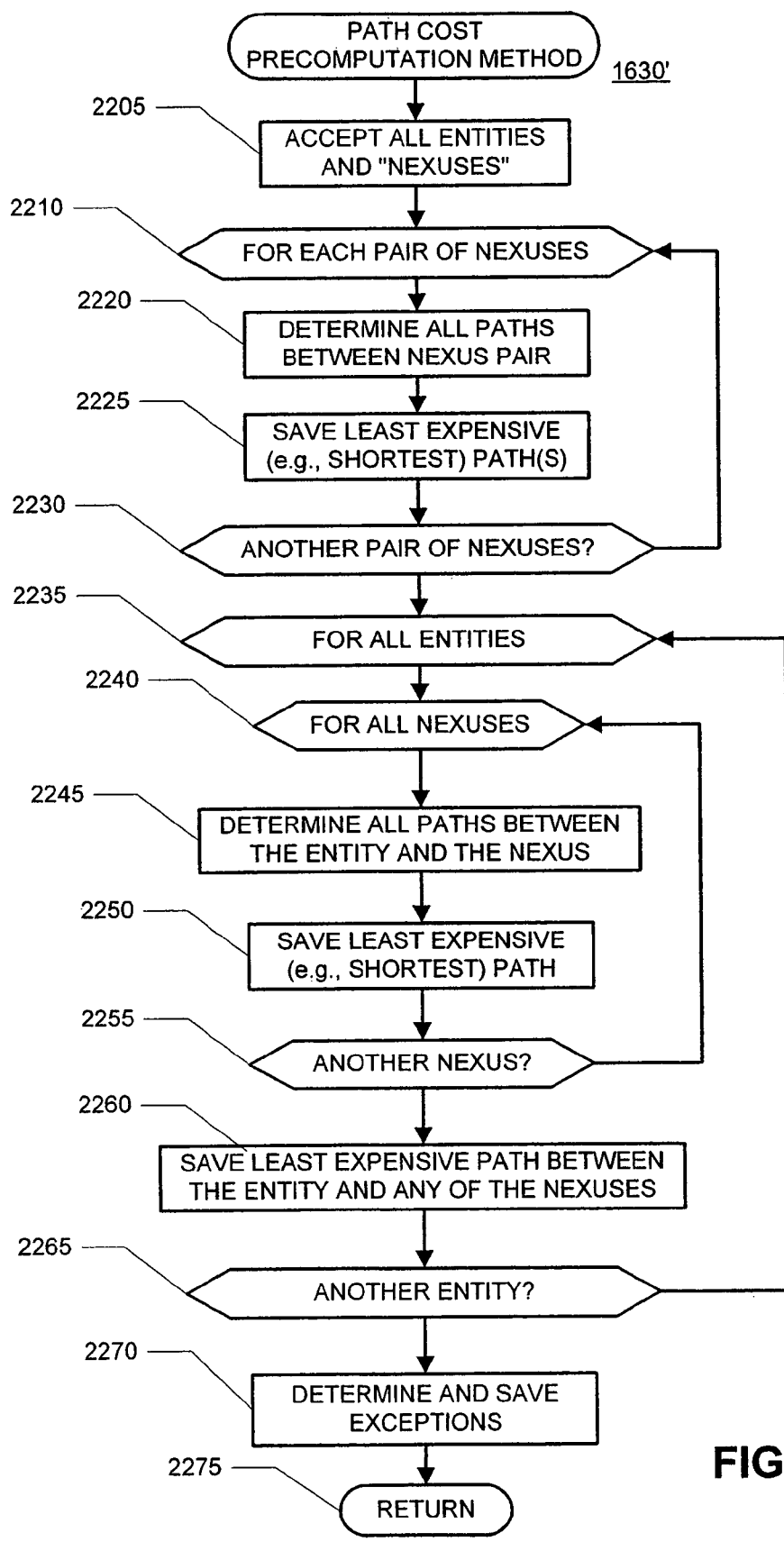

FIG. 22 is a high level flow diagram of an exemplary method which may be used to effect a path cost precomputation method.

FIG. 23 illustrates cliques, each clique having pattern objects which may include patterns and their associated costs.

§ 4 DETAILED DESCRIPTION

The present invention concerns novel methods, apparatus, and data structures for helping to provide a natural language interface to stored information, such as in a database for example. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Below, high level functions which may be performed by, and structure of, a system of the present invention are presented in § 4.1 and § 4.2, respectively. Thereafter, authoring tool and query pre-processor aspects of the present invention are described in § 4.3 and § 4.4, respectively. More specifically, functions of the authoring tool aspect of present invention will be described in § 4.3.1. Thereafter, the structure of an exemplary embodiment for performing the authoring tool aspect of the present invention will be described in § 4.3.2. Finally, examples of operations of the authoring tool aspect of present invention will be described in § 4.3.3. Similarly, functions of the query translation aspect of the present invention will be described in § 4.4.1. Then, the structure of an exemplary embodiment for performing the translation aspect of the present invention will be described in § 4.4.2. Finally, examples of the operations of the translation aspect of the present invention will be described in § 4.4.3.

§ 4.1 System Functions

A system operating in accordance with the present invention may perform two (2) basic functions. First, the system may provide methods, apparatus and data structures for helping to perform an authoring function, in which semantic information related to the design of a database is annotated. Second, the system may provide methods, apparatus and data structures for helping to perform a natural language query to the database.

§ 4.2 System Structure

Figure 4:
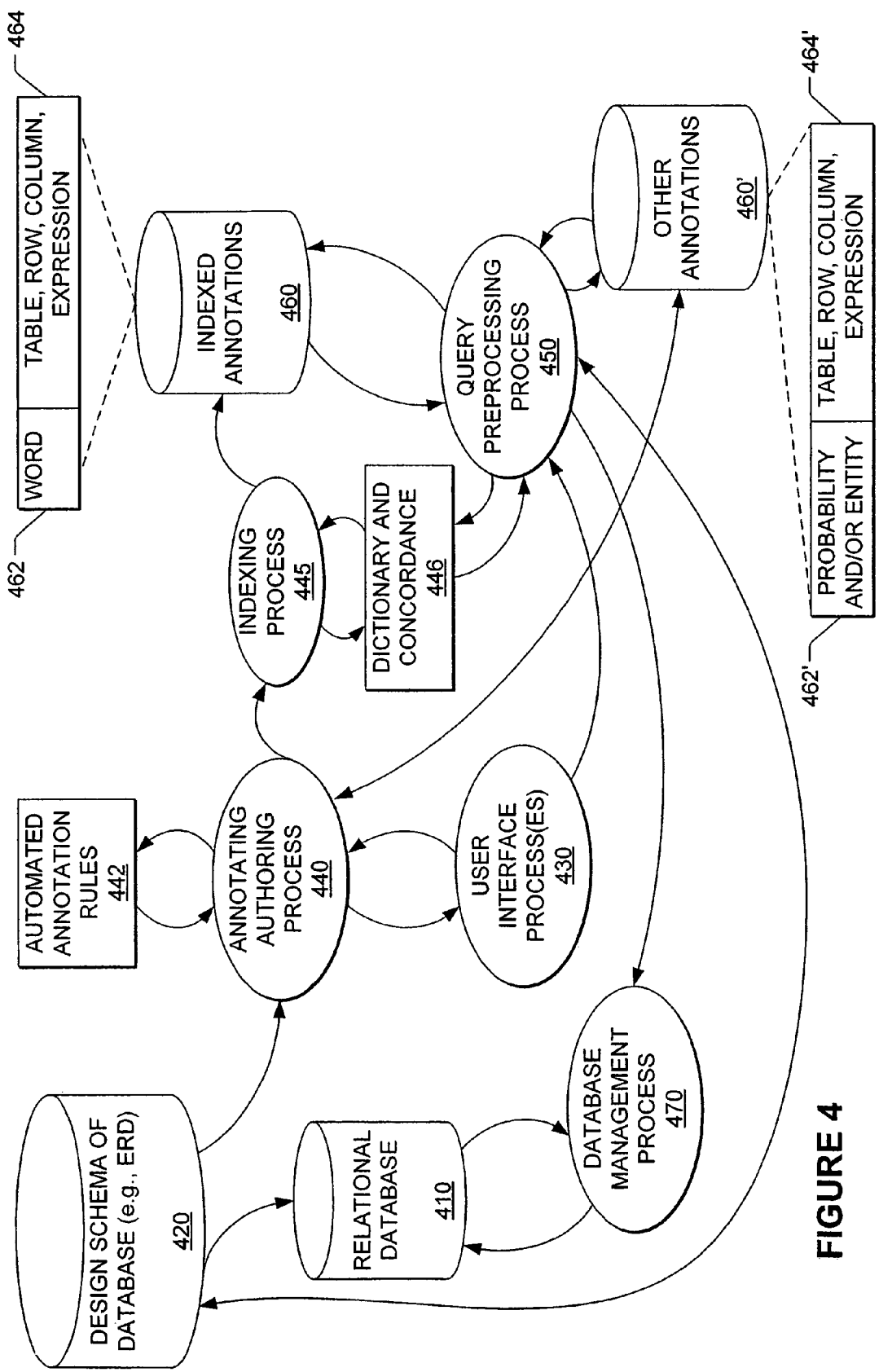
FIG. 4 is a high level diagram of processes that may be used by the present invention.

FIG. 4 depicts processes (or units or facilities for performing processes) which may be used in a system 400 of the present invention. Relational database(s) 410 and design schema of the database(s) 420 and database management processes 470 are known. The other processes (or units or facilities for performing processes) and data structures constitute aspects of the present invention.

Although relational databases and their design are understood by one skilled in the art, each is discussed below for the reader's convenience. A brief overview of the relational model of database design is presented here with reference to examples depicted in FIGS. 5 and 6. FIG. 5 depicts a relational model of a database which relates a cuisine type identifier(s) (or "CTID") to a restaurant identifier (or "RID"). FIG. 6 depicts a relational model of a database which relates a person/place identifier ("PPID") to a neighborhood(s) identifier (or "NID"). In the relational database vernacular, the table 500/600 is referred to as the "relation", each row (or record) 510/610 of the relation 500/600 is referred to as a "tuple", the number of tuples 510/610 in the relation 500/600 is referred to as the "cardinality" of the relation 500/600, each column (or field) 520/620 of the relation 500/600 is referred to as an "attribute" of the relation 500/600, and the number of attributes 520/620 of the relation 500/600 is referred to as the "degree" of the relation 500/600. A "primary key" 530/630 is a unique identifier for the relation. Basically, the primary key may be one or more attributes for which no two (2) tuples (or records) have the same value. The degree of the relation will not change with time, though the cardinality of the relation may change with time as tuples (or records) are added and/or deleted. The cardinality of the relation 500 is "N" and the cardinality of the relation 600 is "M". Finally, a domain is a pool of legal values, excluding the "null" value, from which one or more attributes draw their actual values.

In the relation 500, a restaurant ID number is associated with a particular restaurant and the cuisine type ID number is associated with a particular cuisine type. For example, restaurant ID number 4 corresponds to McDonalds. The following table lists exemplary cuisine types and associated ID numbers.

| CUISINE TYPE ID NUMBER | CUISINE TYPE |
| --- | --- |
| 1 | African, Ethiopian, Morocan |
| 2 | American |
| 3 | Asian |
| 4 | Bar Food, Sandwiches, Hamburgers |
| 5 | Barbecue, Ribs |
| 6 | Bistro |
| 7 | Diners, Cafés, Coffee Bars |
| 8 | Cajun, Creole |
| 9 | Caribbean, Latin American |
| 10 | Chinese |
| 11 | Continental, Belgian |
| 12 | Eclectic |
| 13 | Fast Food, Deli |
| 14 | French |
| 15 | German, Irish, English |
| 16 | Greek, Mediterranean, Turkish |
| 17 | Indian, Pakistani, Afghan |
| 18 | Italian |
| 19 | Japanese, Sushi |
| 20 | Kosher |
| 21 | Mexican, Southwestern |
| 22 | Middle Eastern |
| 23 | New American |
| 24 | Pizza |
| 25 | Russian, Eastern European |
| 26 | Seafood |
| 27 | Southern, Soul Food |
| 28 | Spanish, Portuguese |
| 29 | Steak |
| 30 | Vegetarian, Organic |

Although not shown in the relations, each restaurant may have other attributes such as a star rating (e.g., *, , , or ***), a cost rating (e.g., $, $$, $$$$, or $$$$$) and special options (e.g., Good Deal, Child Friendly, New, Romantic, 24-Hour, Afternoon Tea, Brunch, Delivery, Late Night, Live Entertainment, Noteworthy Wine List, Outdoor Seating, Pre-Theater Menu, Prix Fixe, Smoke Free, Smoke Friendly, View, etc.)

In the relation 600, a neighborhood ID number is associated with a particular neighborhood and the person/place ID number is associated with a person or place. For example, neighborhood ID number 14 corresponds to the "Financial District" neighborhood of New York City. The following table lists exemplary New York City neighborhoods and associated ID numbers.

| NEIGHBORHOOD ID NUMBER | NEW YORK CITY NEIGHBORHOOD |
| --- | --- |
| 1 | Manhattan |
| 2 | Brooklyn |
| 3 | Bronx |
| 4 | Queens |
| 5 | Staten Island |
| 6 | Downtown |
| 7 | Midtown |
| 8 | Upper East Side |
| 9 | Upper West Side |
| 10 | Battery Park City |
| 11 | Chelsea |
| 12 | Chinatown |
| 13 | East Village |
| 14 | Financial District |
| 15 | Flatiron |
| 16 | Garment District |
| 17 | Gramercy Park |
| 18 | Greenwich Village |
| 19 | Harlem |
| 20 | Hell's Kitchen |
| 21 | Little Italy |
| 22 | Lower East Side |
| 23 | Midtown East |
| 24 | Midtown West |
| 25 | Morningside Heights |
| 26 | Murray Hill |
| 27 | NoHo |
| 28 | SoHo |
| 29 | Theater District |
| 30 | TriBeCa |
| 31 | Union Square |
| 32 | West Village |

Having briefly described relational databases and associated terminology, an exemplary database design scheme is briefly discussed. Entity relation diagrams (or "ERDs") provide a semantic model of data in a database and are often used in database design. Semantic modeling permits a database to (i) respond more intelligently to user interactions, and (ii) support more sophisticated user interfaces. ERDs were introduced in the paper, Peter Pin-Shan Chen, "The Entity Relationship Model-Toward a Unified View of Data," *International Conference on Very Large Data Bases*, Framingham, Mass., (Sep. 22-24, 1975), reprinted in *Readings in Database Systems, Second Edition*, pp. 741-754, edited by in Michael Stonebraker, Morgan Kaufmann Publishers, Inc., San Francisco, Calif. (1994) (hereafter referred to as "the Chen paper").

Basically, the Chen paper defines an "entity" as a thing that can be distinctly identified. A "weak entry" is defined as an entity whose existence depends on some other entity. An entity may have a "property" or an "attribute" which draws its value from a corresponding value set. A "relationship" is an association among entities. Entities involved in a given relationship are "participants" in that relationship. The number of participating entities in a relationship defines the "degree" of the relationship. In entity relationship diagrams defined in accordance with the Chen paper, entities are depicted with rectangles, properties are depicted with ellipses, and relationships are depicted with diamonds.

Figure 7:
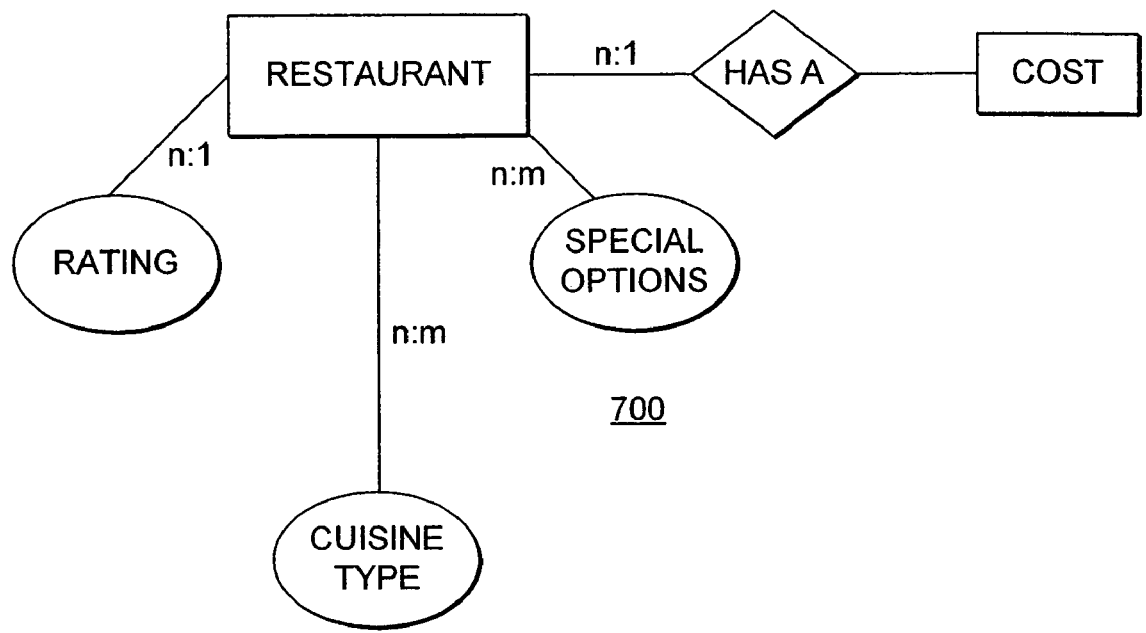
FIGS. 7 and 8 depict entity-relationship diagrams (or "ERDs") of exemplary relational databases.
Figure 8:
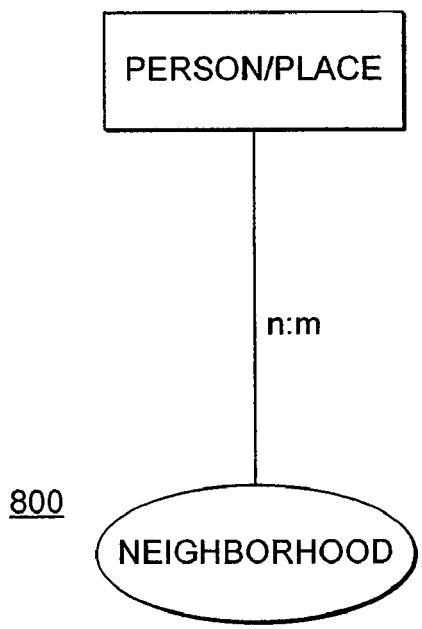

Exemplary entity relationship diagrams are shown in FIGS. 7 and 8. FIG. 7 depicts an exemplary entity relationship diagram 700 of a restaurant database. As shown, the "restaurant" entity has "rating", "cuisine type" and "special option" attributes or properties. As denoted by the "n:1" between the restaurant entity and its rating attribute, each restaurant has only one rating, though more than one restaurant may have the same rating. As denoted by the "n:m" between the restaurant entity and its cuisine type attribute, each restaurant may have more than one cuisine type, and more than one restaurant may offer the same cuisine type. Similarly, as denoted by the "n:m" between the restaurant entity and its special options attribute, each restaurant may have more than one special option, and more than one restaurant may have the same special option. Further, as shown in FIG. 7, the restaurant and cost entities are participants in a "has a" relationship. As depicted by the "n:1" of the "has a" relationship, each restaurant has only one cost, but more than one restaurant may have the same cost.

FIG. 8 depicts an exemplary entity relationship diagram 800 of a neighborhood database. As shown, the "person/place" entity has a "neighborhood" attribute or property. As denoted by the "n:m" between the person/place entity and its neighborhood attribute, each person/place may have more than one neighborhood, and more than one person/place may be in the same neighborhood. For example, there may be many McDonalds restaurants throughout various neighborhoods in New York City.

Tools exist to semantically design databases and/or the extract semantic information from an existing database. For example, InfoModeler, now part of Visio 2000 from Microsoft Corporation of Bellevue, Washington uses ER or object role modeling for designing, optimizing, or re-engineering databases. Also, the ERDwin product can be used to generate databases from ERDs and vice-versa.

Since different terms are used in the relational database and ERD vernacular, and since similar terms may have different meanings in the different contexts (e.g., "relation" and "relationship"), in the following description, terms should be interpreted as follows, unless indicated otherwise:

"table" will be used to refer to a "relation" in the relational database vernacular;

"row" will be used to refer to a "tuple" in the relational database vernacular;

"column" will be used to refer to an "attribute" in the relational database vernacular;

"entity" is to be interpreted in the ERD sense;

"property" or "attribute" will correspond to "attribute" in the ERD sense; and

"relationship" is to be interpreted in the ERD sense.

Having reviewed relational databases and semantic database design information (e.g., ERDs), a system of the present invention will now be described with reference to FIG. 4. The database design schema (e.g., an ERD) 420 is provided to an annotation authoring process 440. A design schema, such as that disclosed in U.S. patent application Ser. No. 09/325,166, entitled "METHODS, APPARATUS AND DATA STRUCTURES FOR PROVIDING A UNIFORM REPRESENTATION OF VARIOUS TYPES OF INFORMATION", filed on Jun. 3, 1999 and listing Edward Jung (incorporated herein by reference) may be used. The annotation authoring process (or more generally, an annotating facility) 440 uses automated annotation rules 442 and/or user annotations received from a user interface process (or more generally, a user interface) 430 to generate annotations to the database design schema (e.g., ERD) 420. An indexing process (or more generally, an indexing facility) 445 analyzes the words of the annotations, using a dictionary and a concordance 446, to enhance the understanding of natural language queries. The indexing process 445 produces indexed annotations 460. Other, non-indexed annotations 460', such as probabilities and/or entities 462' associated with tables, rows, and/or columns, may also be generated by the annotation authoring process 440. However, these annotations 460' are not indexed. Each of the annotations may include a word 462 and an associated table, row, column, and/or expression 464. Both the annotation authoring process 440 and the indexing process 445 (collectively referred to as "a database authoring process" or "authoring tool") are described in § 4.3 below.

Once the database authoring process is complete and indexed annotations 460 are available, the system 400 may process natural language queries accepted via user interface process 430. The natural language query is provided to a query translation process (or more generally, a query translator) 450 which uses the indexed annotations 460 and the database design schema 420 (and the dictionary and/or concordance 446) to generate formal query command(s) (e.g., structured query language (or "SQL") query commands). The formal query command(s) is then provided to a database management process (or more generally, a database manager) 470 which uses the formal query command(s) to interrogate the relational database 410. The results to the formal query command(s) are provided to the database management process 470, which forwards such results to a user interface process 430 for presentation to the user. The query translation process 450 is described in § 4.4 below.

§ 4.3 Authoring Tool

An exemplary authoring tool, which may include an annotation/authoring process 440 and an indexing process 445, is discussed below. More specifically, functions which may be carried out by the exemplary authoring tool are introduced in § 4.3.1. A structure of the exemplary authoring tool is described in § 4.3.2. Finally, examples for illustrating some of the operations of the exemplary authoring tool are described in § 4.3.3.

§ 4.3.1 Functions of the Authoring Tool

In this section, the basic functions which may be performed by the exemplary authoring tool will be briefly described. Basically, the authoring tool may perform an annotation function and an indexing function. The annotation function generates informational annotations and word annotations to the database design schema (e.g., an ERD) 420. Note that semantic information related to the design of a database differs from the semantic (or syntactic) information related to grammar or linguistics used in interpreting natural language query interfaces. Informational annotations (i) distinguish tables corresponding to entities and those corresponding to properties (or attributes) in the database 410, (ii) attach, to rows of the tables, a probability that the row will be referenced, and/or (iii) describe entities in a way that is meaningful to humans. Word annotations attach related words to tables, rows, columns, or relationships of the database design schema. The indexing function analyzes the words of automatically generated annotations by classifying the words in accordance with a concordance and dictionary, and assigning a normalized weight to each word of each of the annotations based on the classification(s) of the word(s) of the annotation. In the exemplary embodiment disclosed here, manually generated annotations must completely match a natural language query. That is, in the exemplary embodiment disclosed here, manually generated annotations have a weight of 1.0 for the phrase in its entirety. Manual and automatic annotations are treated differently because it is believed that manually generated annotations will be more precise and be the product of more thought, while automatically generated annotations have more opportunity for imprecision. Naturally, the requirement for exact matching for manually generated annotations may merely be a default parameter that may be changed such that exact matching is not necessary. In this case, manually generated annotations will be similarly analyzed and provided with a normalized weight.

§ 4.3.2 Structures/Methodologies of the Exemplary Authoring Tool

Having introduced various functions which may be performed by the authoring tool, structures and methodologies of the authoring tool will now be described. Recall that the authoring tool basically includes an annotation/authoring process 440 and an indexing process 445. An exemplary structure or methodology of the annotation/authoring process 440 will be described in § 4.3.2.1 below. Then, an exemplary structure or methodology of the indexing process 445 will be described in § 4.3.2.2 below.

§ 4.3.2.1 Exemplary Structure/Methodology for the Annotation/Authoring Process

Figure 10:
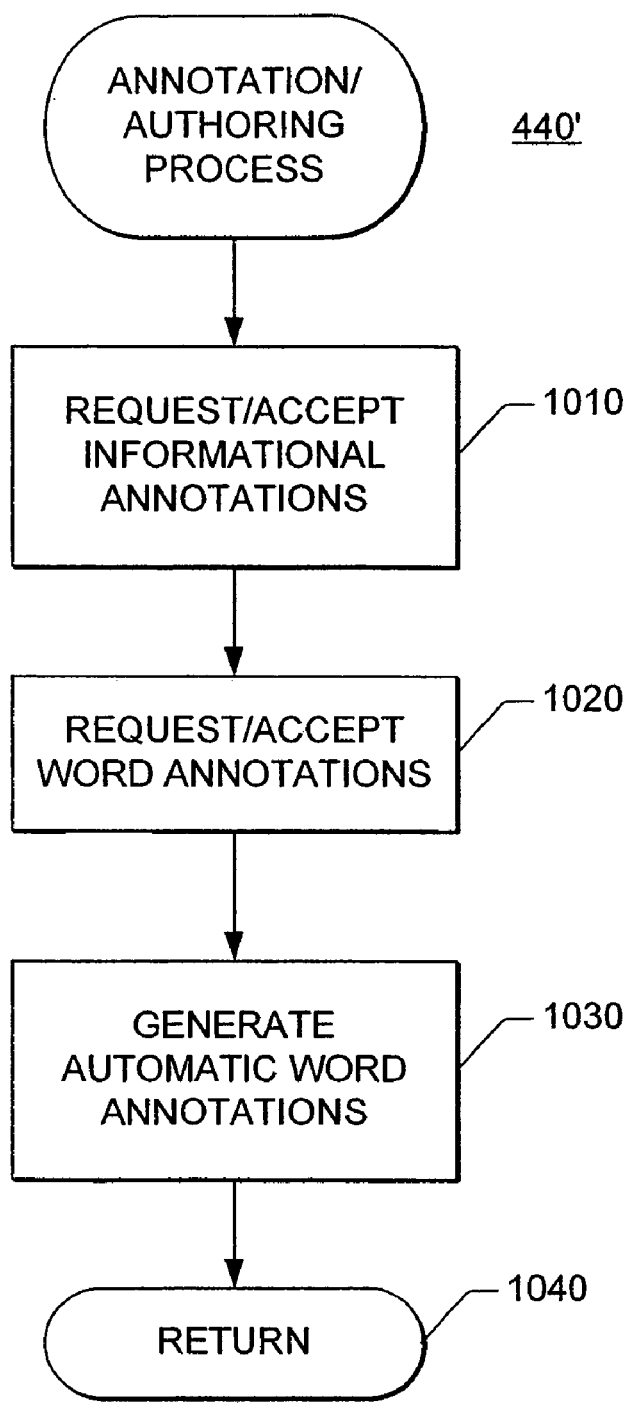
FIG. 10 is a flow diagram of an exemplary annotation/authoring process that may be used by an authoring tool of the present invention.

Recall that the annotation/authoring process 440 uses user inputs from a user interface process 430 and automated annotation rules 442 to generate annotations to a database design schema (e.g., an ERD) 420. FIG. 10 is a flow diagram of an annotation/authoring process 440'. First, as shown in step 1010, informational annotations are requested and/or accepted from the user (e.g., via a user interface process 430 which may include an ERD editor, a keyboard, and a video monitor). Basically, three (3) types of informational annotations may be requested and/or accepted; namely, entity annotations, prior annotations, and description annotations.

Entity annotations distinguish tables corresponding to entities, and those corresponding to properties (or attributes). Entities may be thought of as nouns while properties may be thought of as adjectives (or attributes of the entity). Thus, for example, since a movie has a rating, "movie" would be an entity and "rating" would be an property.

Prior annotations are attached to each row of each table and represent the probability that a reference will be made to that row with respect to all other rows in the table. The automated annotation rules 442 may instruct the annotation/authoring process 440 to automatically determine uniform probabilities for all rows within a table that do not have explicit prior annotations. The uniform probabilities are determined from probabilities associated with the tables. These prior annotations (probabilities) may be updated based on actual usage data. For example, priors can be assigned to a row (e.g., row 37 in restaurants=0.0017) or tables (e.g., P(reference to any restaurant row)=0.37). If a table has a given prior, row priors can be subtracted from the table prior. Then, the difference can be uniformly divided over the other rows.

Description annotations describe entities in a way that is meaningful to humans. For example, a description annotation may denote the "name" column in the restaurant table. This is a human readable way to refer to a specific restaurant in the table.

Returning to FIG. 10, after informational annotations have been requested and/or accepted, word annotations are requested and/or accepted as shown in step 1020. Word annotations are attached to tables, rows, columns, or relations between entities. Word annotations may be divided into two (2) types; namely manual and automatic.

Manual word annotations are created by a human author. A dictionary or thesaurus can be used to suggest words to use as annotations. For example, the word restaurant has a synonym of "eating house" and a hypernym of "building". A lexicographic database, such as WordNet, created by Princeton University of Princeton, N.J., for example, may be used to automate this process, at least to some extent. For example, lexicographer files in WordNet organize nouns, verbs, adjectives, and adverbs into synonym groups, and describe relations between synonym groups.

Next, as shown in step 1030, automatic word annotations are automatically generated from the database 410 in accordance with the automated annotation rules 442. More specifically, information contained in columns/rows may be used to automatically annotate those columns/rows. For example, in a table having a column with movie names, each row may be labeled with a movie name. Processing then continues via return node 1040

§4.3.2.2 Exemplary Structure/Methodology of the Indexing Process

Figure 11A:
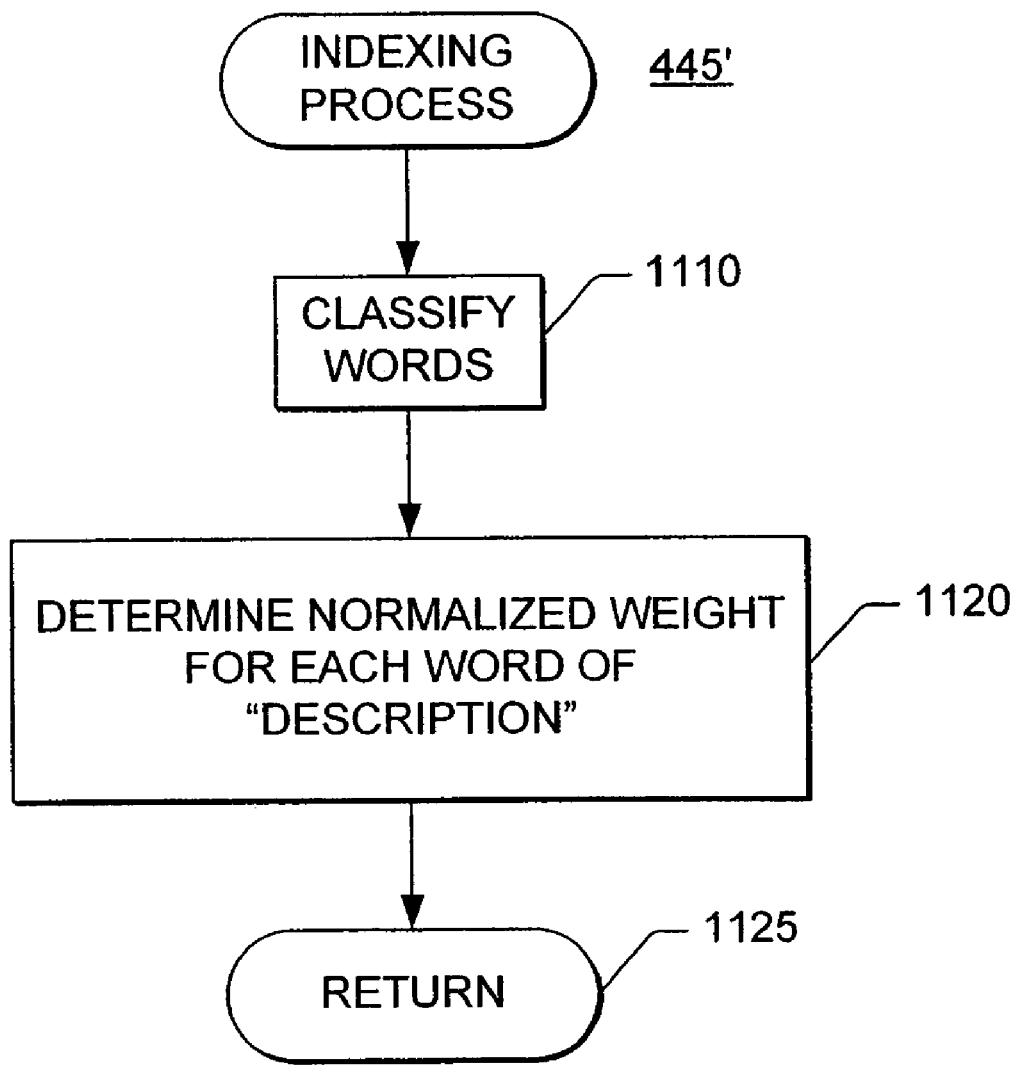
FIG. 11A is a flow diagram of an exemplary indexing process that may be used by an authoring tool of the present invention.

FIG. 11A is a high level flow diagram of an exemplary indexing process 445'. Indexing is based on the words of an annotation. Since "entity" and "prior" "informational" annotations are typically one word (or number), these annotations are not indexed. Rather, automatic word annotations based on the values of rows, as well as manual word annotations, may be indexed.

First, as shown in step 1110, the words of the annotations are classified. This classification facilitates a more sophisticated recognition since some words are more important than others in a natural language query. In general, it has been recognized that the more rare or distinct a word is, the more important it is for purposes of searching a database. For example, the name of a restaurant may be "Azteca Mexican Family Restaurant". The queries "Azteca", "Azteca Restaurant", "Azteca Family Restaurant" or "Azteca Mexican Restaurant" should generate a "match" to this particular restaurant. On the other hand, it may be desired that the queries "Mexican Restaurant" or "Mexican Family Restaurant" should not (only) generate a "match" to this particular restaurant. This is because "Azteca" is a much more unique or distinct word than "Mexican", which is itself more unique or distinct than "Family" or "Restaurant".

During the classification step, each word may be classified into one (1) of eight (8) classes; namely, unique, proper, class, stop, rare, infrequent, frequent, and normal (or common). Referring back to FIG. 4, recall that the indexing process 445 uses a dictionary and concordance 446 (such as WordNet developed by Princeton University, or MindNet developed by Microsoft Corporation). Unique words are either possessives (e.g., "Bob's") or words that are not in the dictionary 446 (e.g., "Azteca"). Proper words are those defined as proper nouns in the dictionary. Class words are defined as words that have been used to annotate all rows in a table. Stop words (e.g., "the", "what") are defined as words that are so common, that they have little semantic meaning for identifying entities. The remaining classifications, rare, infrequent, frequent, and normal, are derived from the frequency of the word and its sense in the concordance 446. The concordance may be built and/or updated from actual queries. However, the concordance will generally be derived from a large sample of text.

Figure 11B:
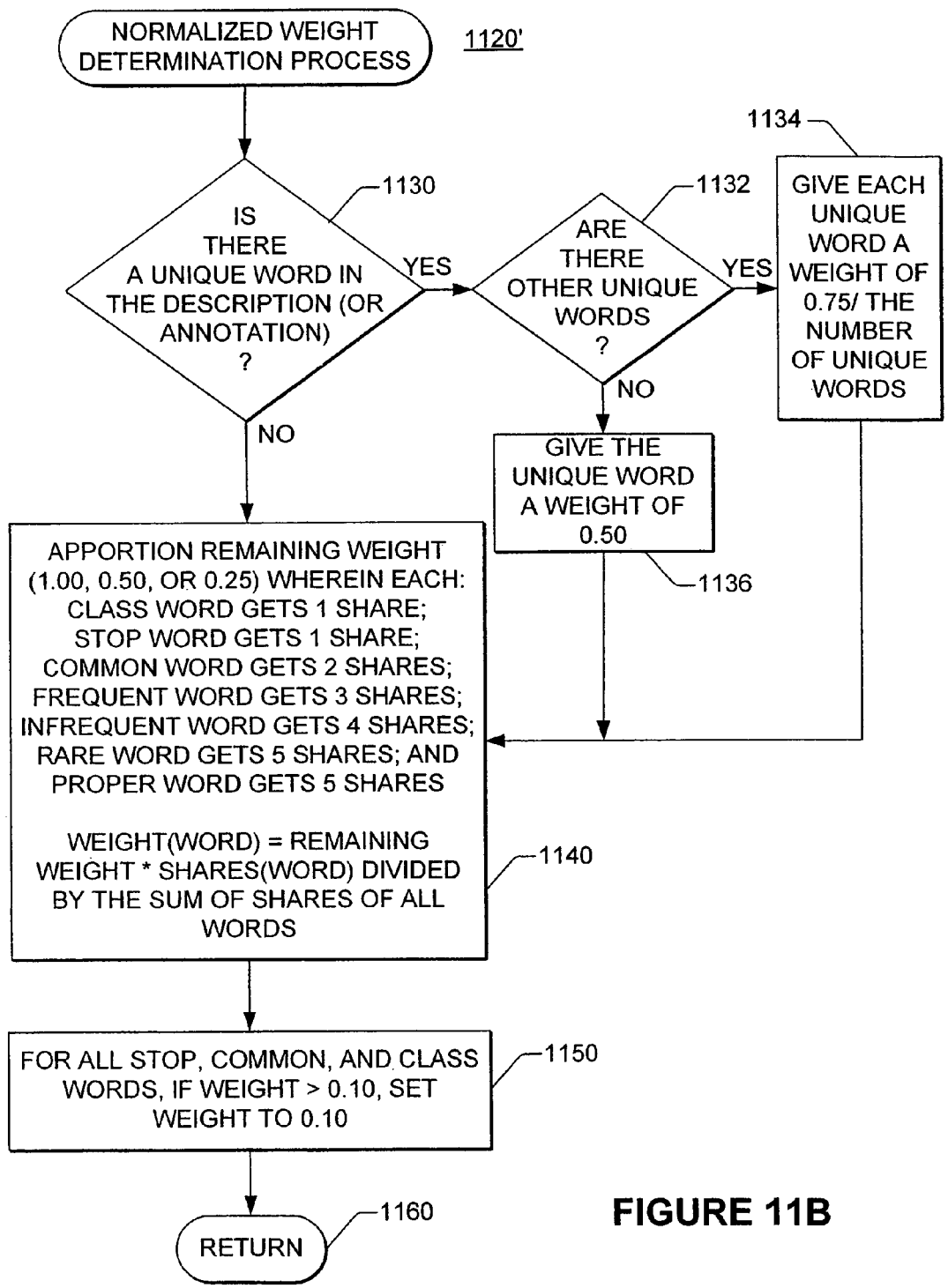
FIG. 11B is a flow diagram of an exemplary process for determining normalized weights of words that may be used by the indexing process of FIG. 11A.

The words of each annotation to be indexed are then provided with normalized weights as shown in step 1120. FIG. 11B is a flow diagram of an exemplary process 1120' for providing normalized weights (e.g., between 0.00 and 1.00) to words of an annotation. First, as shown in step 1130, it is determined whether the annotation contains any words classified as "unique". If, as shown in steps 1132 and 1134, there is more than one "unique" word in the annotation, each of the "unique" words is assigned a normalized weight of 0.75 divided by the number of "unique" words in the annotation. If, on the other hand, as shown in steps 1132 and 1136, there is only one "unique" word in the annotation, that word is assigned a normalized weight of 0.50. The process continues at step 1140 in which the remaining weight (i.e., 1.00 if there are no unique words in the annotation, 0.50 if there is one unique word in the annotation, and 0.25 if there is more than one unique word in the annotation) is apportioned to the remaining words of the annotation. For example, each "class" word gets 1 share of the remaining weight, each "stop" word gets 1 share of the remaining weight, each "common" (or normal) word gets 2 shares of the remaining weight, each "frequent" word gets 3 shares of the remaining weight, each "infrequent" word gets 4 shares of the remaining weight, each "rare" word gets 5 shares of the remaining weight, and each "proper" word also gets 5 shares of the remaining weight. Thus, the weight of a (non-unique) word may be expressed as:

$$\text{weight(word)} = \frac{\text{remaining weight} * \text{share(word)}}{\sum_{\text{for all non-unique words}} \text{share(word)}}$$

where share(word) = 1 if "class" or "stop",
= 2 if "common",
= 3 if "frequent",
= 4 if "infrequent", and
= 5 if "rare" or "proper".

Finally, step 1150 limits the normalized weight assigned to stop, class, and common (or normal) words to 0.10. Processing continues via return node 1160. Referring back to FIG. 11A, once the normalized weights are determined for words of descriptions, processing continues via return node 1125.

Figure 9A:
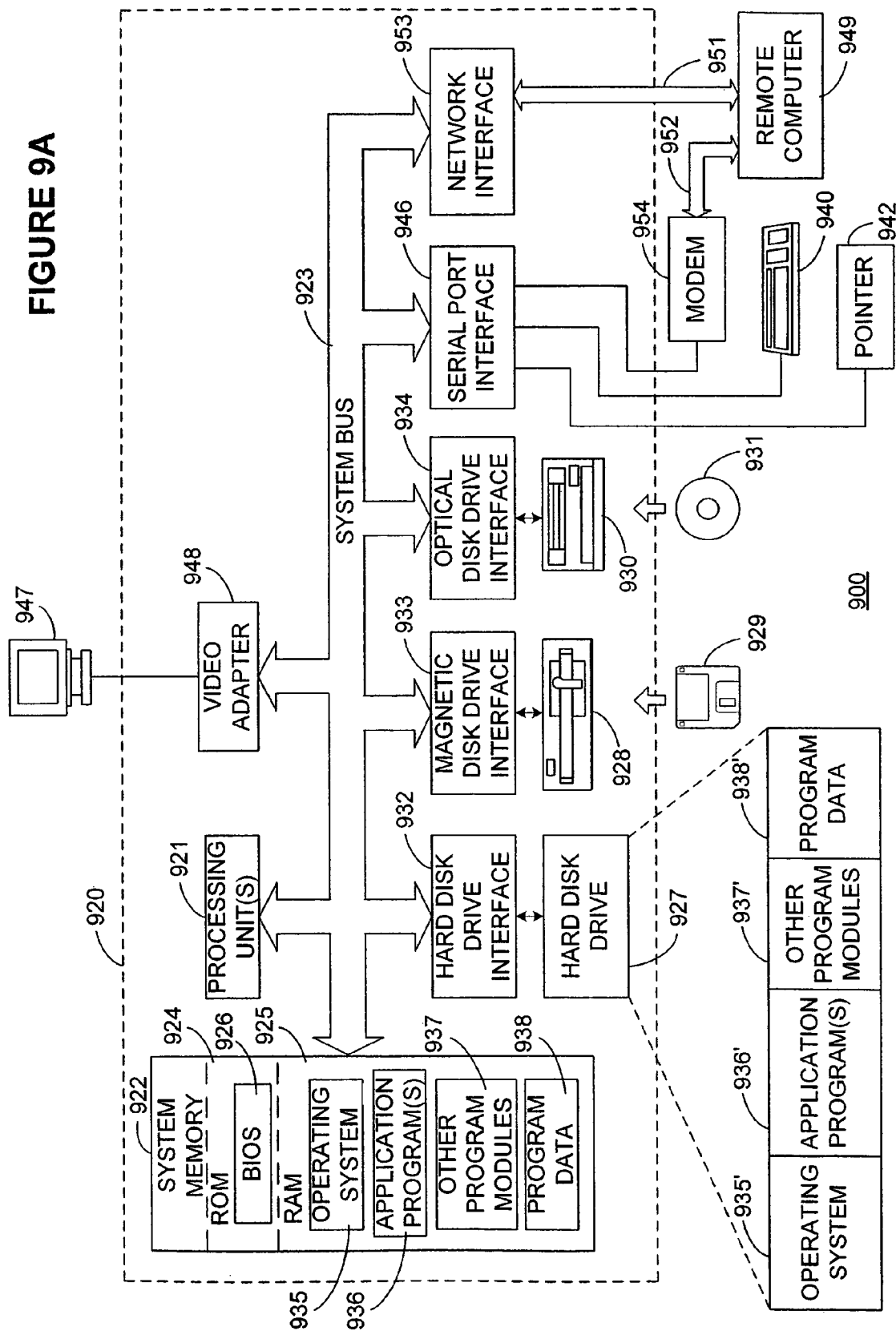
FIG. 9A is a block diagram of a computer on which the present invention may be carried out.

FIG. 9A and the following discussion provide a brief, general description of an exemplary apparatus in which at least some aspects (e.g., at least some of the described processes) of the present invention may be implemented. The present invention will be described in the general context of computer-executable instructions, such as program modules, being executed by a personal computer. However, the methods of the present invention may be effected by (and the data structures of the present invention may be stored on) other apparatus. Program modules may include routines, programs, objects, components, data structures, etc. that perform a task (s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set-top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 9A, an exemplary apparatus 900 for implementing at least some aspects of the present invention includes a general purpose computing device in the form of a conventional personal computer 920. The personal computer 920 may include a processing unit(s) 921, a system memory 922, and a system bus 923 that couples various system components including the system memory 922 to the processing unit 921. The system bus 923 may be any of several types of bus structures including a memory bus or memory controller, a peripheral bus, and a local bus using any of a variety of bus architectures. The system memory may include read only memory (ROM) 924 and/or random access memory (RAM) 925. A basic input/output system 926 (BIOS), containing basic routines that help to transfer information between elements within the personal computer 920, such as during start-up, may be stored in ROM 924. The personal computer 920 may also include a hard disk drive 927 for reading from and writing to a hard disk, (not shown), a magnetic disk drive 928 for reading from or writing to a (e.g., removable) magnetic disk 929, and an optical disk drive 930 for reading from or writing to a removable (magneto-) optical disk 931 such as a compact disk or other (magneto-) optical media. The hard disk drive 927, magnetic disk drive 928, and (magneto-) optical disk drive 930 may be coupled with the system bus 923 by a hard disk drive interface 932, a magnetic disk drive interface 933, and a (magneto-) optical drive interface 934, respectively. The drives and their associated storage media provide nonvolatile storage of machine readable instructions, data structures, program modules and other data for the personal computer 920. Although the exemplary environment described herein employs a hard disk, a removable magnetic disk 929 and a removable optical disk 931, those skilled in the art will appreciate that other types of storage media (with appropriate interface devices), such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk drive 927, magnetic disk 929, (magneto-) optical disk 931, ROM 924 or RAM 925, such as an operating system 935, one or more application programs 936, other program modules 937, and/or program data 938 for example.

A user may enter commands and information into the personal computer 920 through input devices, such as a keyboard 940 and pointing device 942 (e.g., a mouse) for example. Other input devices (not shown), such as a microphone, a joystick, a game pad, a satellite dish, a scanner, or the like, may also (or alternatively) be included. These and other input devices are often connected to the processing unit 921 through a serial port interface 946 coupled to the system bus 923. However, input devices may be connected by other interfaces, such as a parallel port, a game port or a universal serial bus (USB).

A monitor 947 or other type of display device may also be connected to the system bus 923 via an interface, such as a video adapter 948 for example. In addition to (or instead of) the monitor 947, the personal computer 920 may include other (peripheral) output devices (not shown), such as speakers and printers for example.

The personal computer 920 may operate in a networked environment which defines logical and/or physical connections to one or more remote computers, such as a remote computer 949. The remote computer 949 may be another personal computer, a server, a router, a network computer, a peer device or other common network node, and may include many or all of the elements described above relative to the personal computer 920. The logical and/or physical connections depicted in FIG. 9A include a local area network (LAN) 951 and a wide area network (WAN) 952. An intranet and the Internet may be used instead of, or in addition to, such networks.

When used in a LAN, the personal computer 920 may be connected to the LAN 951 through a network interface adapter (or "NIC") 953. When used in a WAN, such as the Internet, the personal computer 920 may include a modem 954 or other means for establishing communications over the wide area network 952. The modem 954, which may be internal or external, may be connected to the system bus 923 via the serial port interface 946. In a networked environment, at least some of the program modules depicted relative to the personal computer 920 may be stored in the remote memory storage device. The network connections shown are exemplary and other means of establishing a communications link between the computers may be used.

Figure 9B:
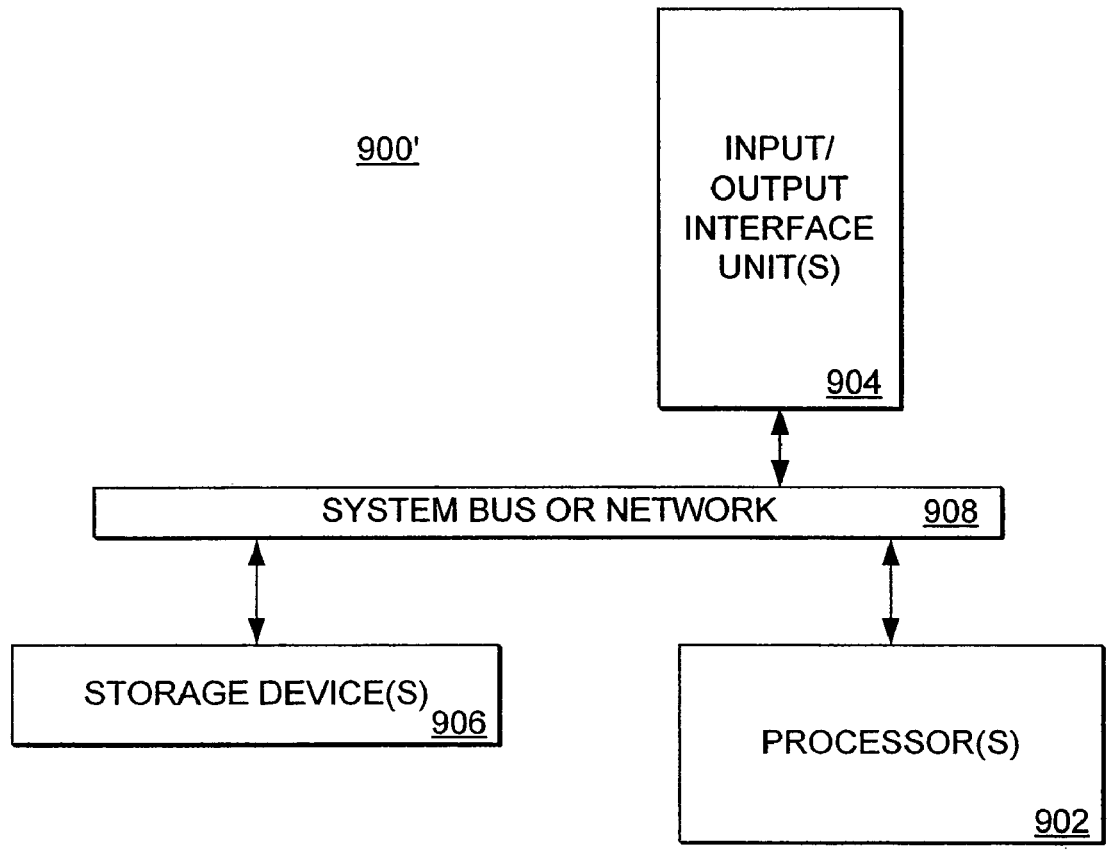
FIG. 9B is a high level block diagram of a machine on which the present invention may be carried out.

FIG. 9B is a more general machine 900 which may effect one or more of the processes discussed above. The machine 900 basically includes a processor(s) 902, an input/output interface unit(s) 904, a storage device(s) 906, and a system bus or network 908 for facilitating the communication of information among the coupled elements. The processor(s)

902 may execute machine-executable instructions to effect one or more aspects of the present invention. At least a portion of the machine executable instructions may be stored (temporarily or more permanently) on the storage device(s) 906 and/or may be received from an external source via an input interface unit 904.

Having now described exemplary structures of both the annotation/authoring process 440 and the indexing process 445 of the authoring tool, an operational example of the authoring tool is now provided in § 4.3.3 below.

§4.3.3 Operations of the Authoring Tool

An example for illustrating the operation of the annotation/authoring process 440 of the authoring tool will be described in § 4.3.3.1 below. Then, an example for illustrating the operation of the indexing process 445 of the authoring tool will be described in § 4.3.3.2 below.

§4.3.3.1 Exemplary Operation of the Annotation/Authoring Process

Figure 14A:
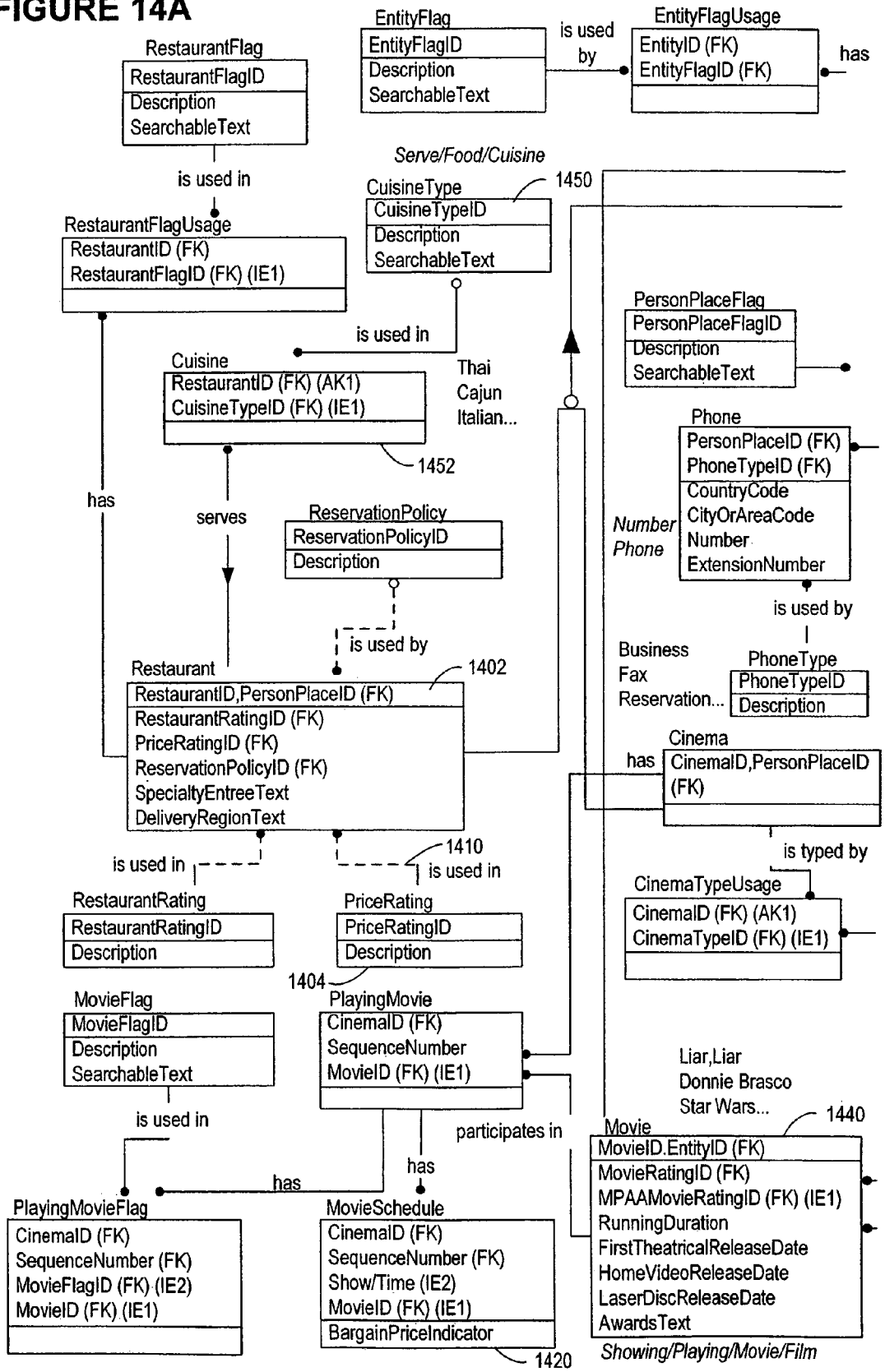
FIG. 14 is an illustrative example of an annotated entity-relationship diagram which may be generated by the authoring tool of the present invention.
Figure 14B:
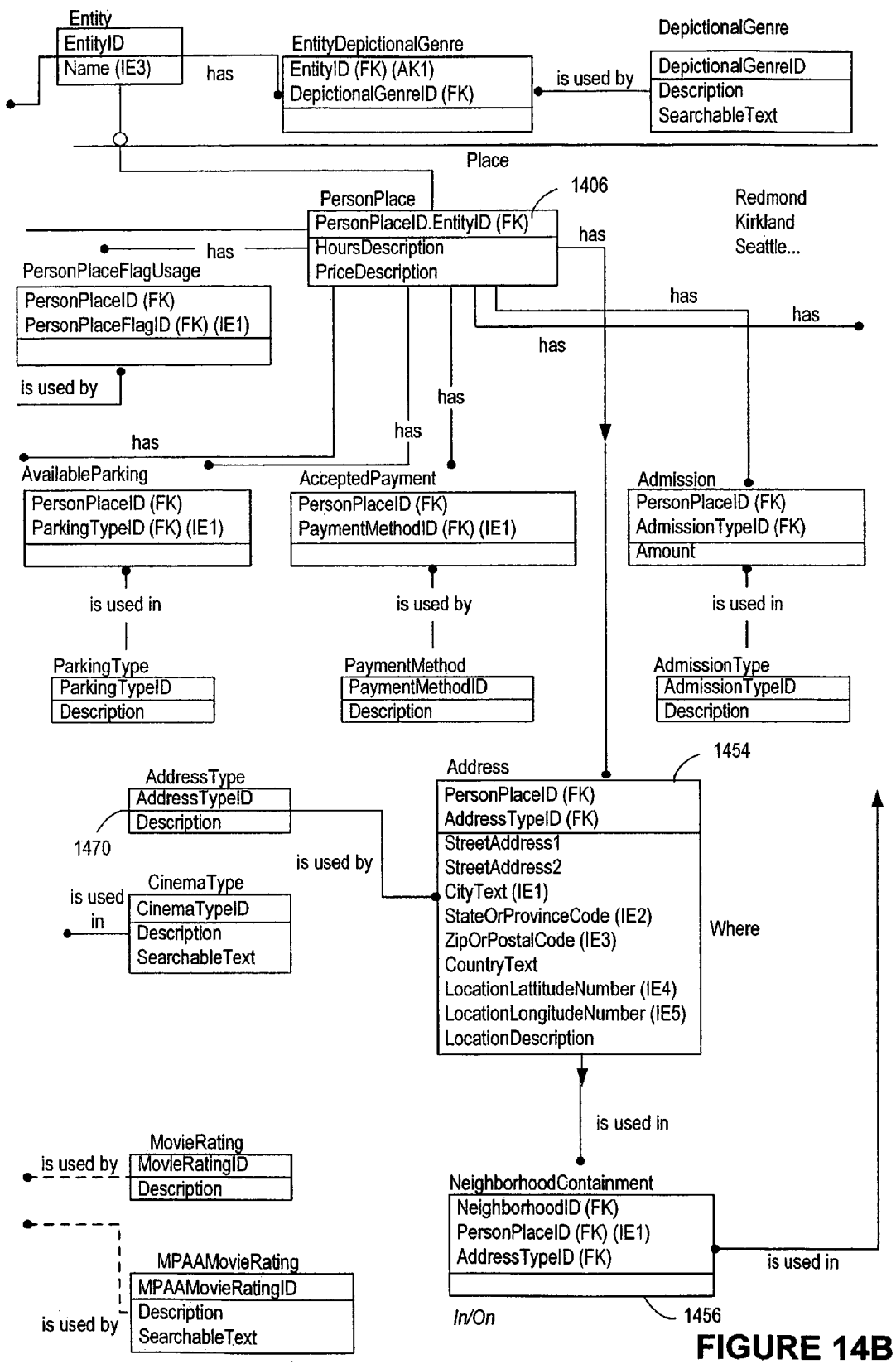
Figure 14C:
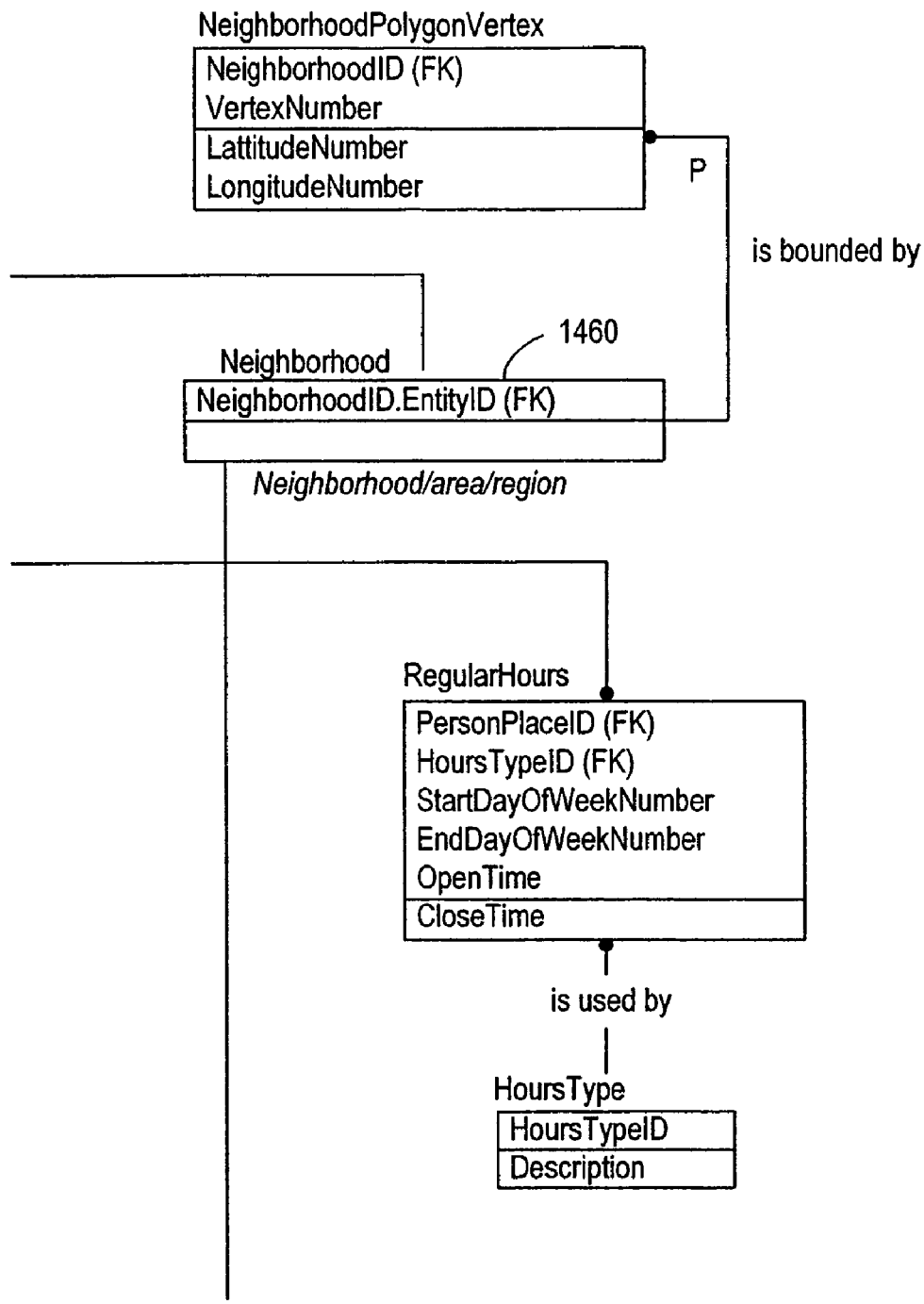

The operation of the annotation/authoring process 440, in the context of a database of movies and restaurants, will now be described with reference to FIGS. 10 and 14 and the attached Appendix A. FIG. 14 is an entity relationship diagram (ERD) of a database having tables with information related to restaurants and movies. The attached Appendix A is a file of a Prolog definition of a database substantially similar to the ERD of FIG. 14, which has been annotated in accordance with the present invention. Portions of Appendix A are reprinted throughout this discussion to facilitate the discussion of the exemplary annotation/authoring process 440. Examples of informational annotations will be presented in § 4.3.3.1.1. Thereafter, examples of word annotations will be discussed in § 4.3.3.1.2.

§ 4.3.3.1.1 Informational Annotations

Recall that three (3) types of informational annotations may be made to the database design schema 420; namely entity annotations, prior annotations, and description annotations. Examples of each of these informational annotations will now be described with reference to the following two (2) tables (defined in Prolog), as well as commands from Appendix A:

```
%% Restaurant
table(restaurant, "Restaurant", restaurantID).
column(restaurantID, restaurant, "RestaurantID", restaurant).
column(restaurantPID, restaurant, "PriceRatingID", price).
column(restaurantQID, restaurant, "RestaurantRatingID",
   quality).
column(restaurantRID, restaurant, "ReservationPolicyID",
   reservation).
column(specialty, restaurant, "SpecialtyEntreeText", string).
column(delivery, restaurant, "DeliveryRegionText", string).
restaurantID <=> personPlaceID.
%%% PriceRating
table(price, "PriceRating", priceID).
root(price).
column(priceID, price, "PriceRatingID", price).
column(priceName, price, "Description", string).
desc(price, [price, priceName(_)]).
priceID <== restaurantPID.
```

In the first table, the first line "%% Restaurant" is merely a comment line. The second line:

table(restaurant, "Restaurant", restaurantID).

defines a table having a "restaurant" label, a ""Restaurant"" name, and a "restaurantID" primary key. Referring to FIG. 14, the table 1402 has its name above the box and its primary key above the horizontal line in the box. The third through tenth lines:

```
column(restaurantID, restaurant, "RestaurantID", restaurant).
column(restaurantPID, restaurant, "PriceRatingID", price).
column(restaurantQID, restaurant, "RestaurantRatingID",
   quality).
column(restaurantRID, restaurant, "ReservationPolicyID",
   reservation).
column(specialty, restaurant, "SpecialtyEntreeText", string).
column(delivery, restaurant, "DeliveryRegionText", string).
``` define columns in the restaurant table. For example, the first column has a "restaurantID" label, belongs to the "restaurant" table, has a ""RestaurantID"" column name, and has a "restaurant" type (i.e., restaurantID is referring to a restaurant). The eleventh line:

restaurantID <=> personPlaceID.

defines a relationship between the "restaurantID" primary key of the Restaurant table and the "personPlaceID" primary key of a PersonPlace table. More specifically, the <==> in this line denotes an "IS A" generalization. That is, a Restaurant is a PersonPlace. In other words, Restaurant is a specialization of PersonPlace, or PersonPlace is a generalization of Restaurant. Referring to FIG. 14, this relationship is depicted by line and open circle 1408 between the Restaurant table 1402 and the PersonPlace table 1406. As described in more detail below, the restaurant table is an entity, not a property.

In the second table, the first line
%%% PriceRating is merely a comment line. The second line:
table(price, "PriceRating", priceID).

defines a table as discussed above. The fourth and fifth lines:

```
column(priceID, price, "PriceRatingID", price).
column(priceName, price, "Description", string).
``` define columns of the table as discussed above. The sixth line:
desc(price, [price, priceName(_)]).

is a description type informational annotation. Thus, information in the priceName column of the price table is used to describe price. Finally, the seventh line:
priceID <== restaurantPID.

relates the priceID primary key of the Price table (shown as PriceRating table 1404) to the restaurantID primary key of the Restaurant table 1402. More specifically, the <== in the line denotes an "has an attribute" (or simply "HAS A") relationship. That is, the Price table 1404 is an attribute of the Restaurant table 1402 (and the restaurant table 1402 has a Price table 1404 attribute). Referring to FIG. 14, this relationship is depicted by line 1410 between Restaurant table 1402 and PriceRating table 1404. As described in more detail below, this price table 1404 is a property, not an entity.

Recall that entity annotations distinguish entities and properties. In general, entities may correspond to nouns while properties may correspond to adjectives (or attributes of entities), though this distinction is not necessary. In the tables described above, the "is a" relation, <==>, will infer that the table is an entity. On the other hand, the "has an attribute" relation, <==, as well as the description line, desc, will infer that the table is a property. Thus, tables may be identified, automatically, as either entities or properties based on the foregoing. However, there are some database schemas where these assumptions would not necessarily be true. In such cases, tables should be explicitly (e.g., manually) identified as entities or properties.

Finally, recall that prior annotations attach to each row of a table, a probability that the row will be referenced with respect to all possible rows. A prior annotation from Appendix A is reprinted below:

```
% Model for column priors
model([[0.8,
    [0.5, neighborhood, cuisineType, city],
    quality, price, stars, rating, entityFlag, genre,
    personPlaceFlag, paymentType, addressType, phoneType,
    admissionType, reservation,
    parkingType, hoursType, restaurantFlag, cinemaType,
movieFlag],
    movie, restaurant, cinema]).
```

In this example, (i) 0.5 of a 0.8 probability is uniformly distributed over the neighborhood, cuisineType, and city tables, (ii) the remainder (i.e., 0.3) of the 0.8 probability is uniformly distributed over the quality, price, stars, rating, entityFlag, genre, personPlaceFlag, paymentType, addressType, phoneType, admissionType, reservation, parkingType, hourType, restaurantFlag, cinemaType, and movieFlag tables, and (iii) a 0.2 probability is uniformly distributed over the movie, restaurant, and cinema tables. Note that the movie, restaurant, and cinema tables are "entity" type tables, while the other tables are property (or attribute) type tables. As noted above, the prior annotations (i.e., probabilities) may be updated based on actual usage.

§ 4.3.3.1.2 Word Annotations

Examples of word annotations are set forth below with reference to FIG. 14 and selected lines from Appendix A. First, examples of word annotations to tables (defined in Prolog) from Appendix A are reprinted below:

```
%% Table words
tablew(cuisineType, [food, cuisine, serve]).
tablew(personPlace, [place]).
tablew(restaurant, [restaurant, eat]).
tablew(cinema, [cinema, theater]).
tablew(movie, [movie, film, showing, playing]).
tablew(genre, [genre]).
```

For example, the sixth line annotates the movie table 1440 with the words "movie", "film", "showing", and "playing". (Note that to simplify the drawing, not all of the tables shown in FIG. 14 depict the above word annotations.)

Examples of word annotations to columns from Appendix A are reprinted below:

```
columnw(specialty, [specialty]).
columnw(duration, [duration, long]).
columnw(awards, [award, won, winning]).
```

For example, the third line annotates the awards column(s) with the words "award", "won", and "winning".

Examples of word annotations to variables from Appendix A are reprinted below:

```
word([when, time, start], [[schedule, showtime(_),
    bargain(_)]]).
```

For example, the showtime values and bargain values of the schedule table 1420 are annotated with the words "when", "time" and "start".

Automatic word annotations are made to the tables based on information in the database. For example, the PhoneType table 1430 is automatically annotated with information from the database from its rows. In the example depicted in FIG. 14, the PhoneType table 1430 is automatically annotated with the words "Business", "Fax", "Reservation", etc.

§4.3.3.2 Operation of the Indexing Process

Referring to FIGS. 11A and 11B, assume that the restaurant name "Toronto's Maple-liscious All You Can Eat Flap-Jack House" is a value in a restaurant name column in a table of a database. Recall that the automatic word annotation will annotate the row with its contents. Assume further that "Toronto's" is a proper word, "Maple-licious" is a unique word, "All" is a stop word, "You" is a common word", "Can" is a stop word, "Eat" is a common word, "Flapjack" is a rare word, and "House" is a frequent word. Referring to steps 1130, 1132, and 1136 of FIG. 11B, since "Maple-liscious" is the only unique word of the annotation, it would be assigned a normalized weight of 0.50. The remaining weight, 0.50, will be apportioned among the remaining words. The sum of all of the shares of the remaining words is 17 (i.e., 5+1+2+1+2+5+3). Accordingly, the normalized weights assigned to "Toronto's" and "Flap-Jack" would each be 0.15 (i.e., 5/17*0.50), the normalized weight assigned to "House" would be 0.09 (i.e., 3/17*0.50), the normalized weights assigned to "You" and "Eat" would each be 0.06 (i.e., 2/17*0.50), and the normalized weights assigned to "All" and "Can" would each be 0.03 (i.e., 1/17*0.50).

Having described the function, structure and operations of the authoring tool, the functions, structure, and operations of the query translator is now described in § 4.4 below.

§ 4.4 Query Translator

An exemplary query translator is described below. More specifically, functions which may be performed by the query translator are introduced in § 4.4.1. Then, a structure of the exemplary query translator is described in § 4.4.2. Finally, an exemplary operation of the exemplary query translator is set forth in § 4.4.3.

§ 4.4.1. Functions of the Query Translator

Referring back to FIG. 4, the query translator (or query translation process 450) may function to (i) accept a natural language query from a user interface process 430, (ii) convert the natural language query to a formal command query (e.g., an SQL query) using the indexed annotations 460 (and other annotations 460') generated by the authoring tool and the database design schema 420, and (iii) present the formal command query to the database management process 470 for interrogating the relational database 410. As will become apparent in the following description, the conversion function is the main function of the query translator. A structure and methodology of an exemplary query translator is presented below.

§ 4.4.2 Structure/Methodology of the Exemplary Query Translator

FIG. 12 is a high level flow diagram of an exemplary query translation process 450'. Generally, the natural language query accepted from the user interface process 430 is an alphanumeric string. For example, if the user interface process 450 accepts inputs from a keyboard or keypad, the user enters the alphanumeric string by manipulating the keys of the keyboard or keypad. If the user interface process 450 accepts inputs from a pressure sensitive tablet and character recognition means, the user enters the alphanumeric string by writing letters and/or numbers on the tablet. If the user interface process accepts inputs from a microphone and speech recognition means, the user enters the alphanumeric string by speaking into the microphone. Naturally, other types of user interfaces may be used to accept a natural language query.

Referring first to step 1210 of FIG. 12, the accepted string is parsed. Details of an exemplary string parser are described in § 4.4.2.1 below with reference to FIG. 13. Then, as shown in step 1220, phrases determined from the parsed string are checked against the stored indexed annotations to determine whether any of the phrases "match" any of the indexed annotations. Since, as shown in FIG. 4, the records of the indexed annotations associate a word 462 with a table, row, column, or expression of the relational database 410, when a "match" is determined, a selected one of the associated data (also referred to as a "fragment" or as a "pattern") 464 is returned. As shown in step 1225, for each word or phrase of the parsed string, a clique (or set) of pattern objects (or a group of rank ordered fragments) is generated. Details of an exemplary matching (and fragment ranking) facility are described in § 4.4.2.2 below with reference to FIG. 15. In step 1230, the patterns of the cliques (or fragments from the groups of rank ordered fragments) are "combined" (or "chained") together, based on the database design schema 420, to generate a formal command query. Details of a chaining process (or more generally, a chaining facility) are described in § 4.4.2.3 below with reference to FIGS. 16 through 23. Finally, as shown in step 1240, objects of the chained query are marked in accordance with a presentation process (or facility). Processing continues via return node 1250. In this way, a natural language query is converted to a formal command query.

FIG. 17 is a diagram of processes that may be used by the query translation process 450 of FIG. 4. A string parsing process (or more generally, a string parser) 1210' accepts a natural language query from the user interface process 430, and provides a parsed string to a word or phrase-annotation match determination process (or more generally, a match determination facility) 1220'. The word or phrase-annotation match determination process 1220' determines matches between words and/or phrases of the parsed string and indexed annotations 460. The word or phrase-annotation match determination process 1220' may also use the dictionary and concordance 446 as will be explained later. The matching indexed annotations have associated patterns (or fragments) which may include one or more objects (e.g., tables, columns, rows, relationship, and/or expression) of the relational database 410 or the database design schema 420. In one exemplary embodiment, for each word or phrase of the parsed query, associated fragments may be rank ordered by the fragment ranking process (or more generally, the fragment ranking facility) 1225'. The groups of rank ordered fragments are then provided to a fragment chaining process (or more generally, the fragment chainer) 1230' which attempts to chain the groups of rank ordered fragments based on the database design schema 420. Alternatively, the patterns generated from the word or phrase match determination process 1220' may be provided to the optimized (pattern) combination process 1230'. Finally, certain objects of the combined patterns (or chained fragments) are marked for presentation by an object marking process (or more generally, a presentation facility) 1240'. The marked objects of the combined patterns (or chained fragments) are converted to a formal query command(s) and presented to a database management process 470 for interrogation of the relational database 410.

Referring back to FIG. 9B, the processor(s) 902 may effect the processes of the query translation process 450 by executing machine-executable instructions. At least a portion of the machine-executable instructions may be stored on the storage device(s) 906 and/or may be received from an external source via an input interface 904.

§ 4.4.2.1 String Parser

Figure 13:
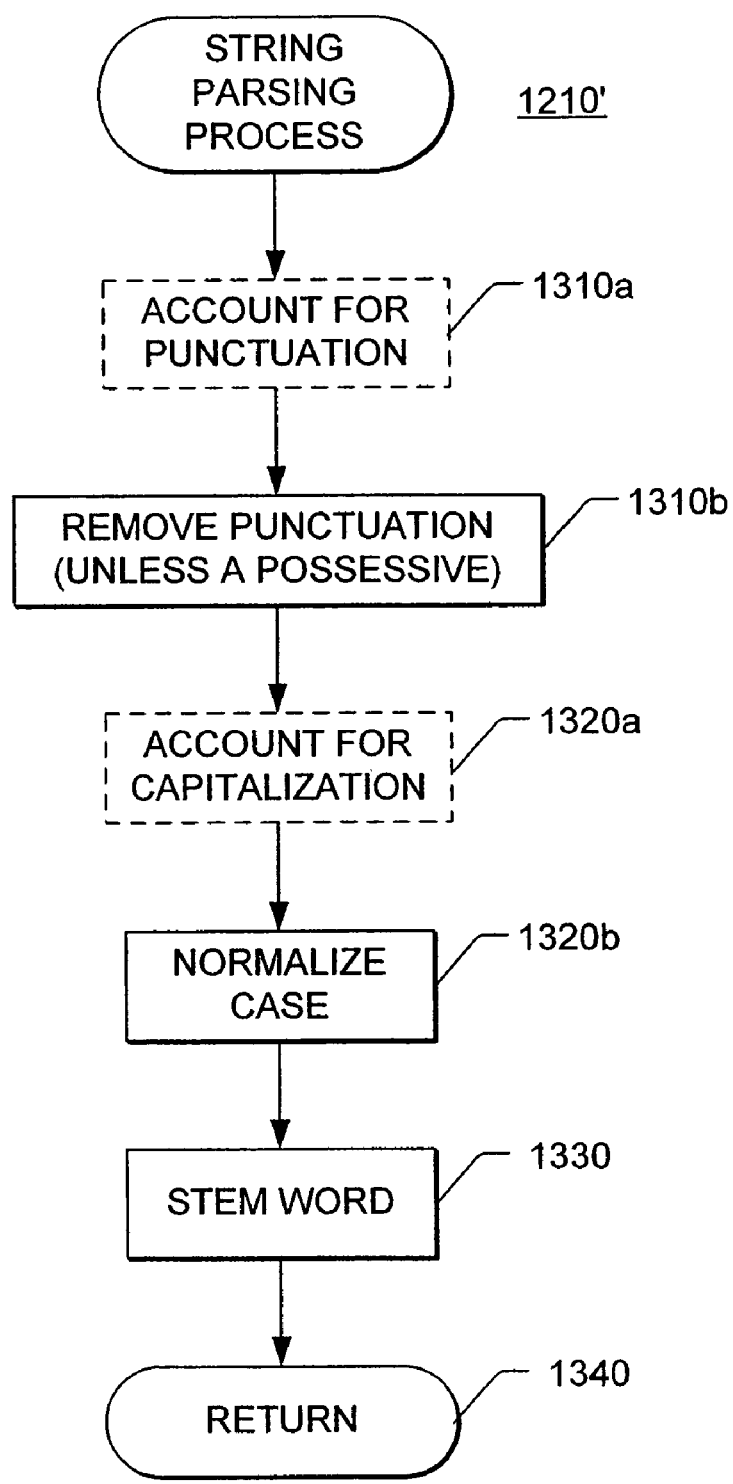
FIG. 13 is a flow diagram of an exemplary string parsing process that may be used by the exemplary query translation process of FIG. 12.

FIG. 13 is a flow diagram of an exemplary process 1210' for parsing an alphanumeric string accepted by the query translator 450'. Although, as shown in optional alternative step 1310*a*, punctuation in the input string may be considered, all punctuation is removed (or ignored) in our exemplary parser as shown in step 1310*b* (except for identifying a possessive such as "Bob's" for example). Similarly, although, as shown in optional alternative step 1320*a*, capitalization may also be considered, case is normalized (or ignored) in our exemplary parser as shown in step 1320*b*. In this way, a user does not need to be concerned with whether their query will be case sensitive or whether their query will require punctuation. It is believed that a natural language interface made and operated in accordance with the present invention will be robust enough to operate well without the semantic information which may be conveyed by case or punctuation. This robustness is particularly important if the user interface process 430 employs speech recognition because case and punctuation information might not exist. Finally, as shown in step 1330, the parsed words may be stemmed so that only their roots are left. Processing continues via return node 140.

§ 4.4.2.2 Phrase Matcher/Ranker

FIG. 15, which includes FIGS. 15A and 15B, is a flow diagram of an exemplary process 1220'/1225' for generating groups of rank ordered fragments 464 (or simply sets or cliques of pattern objects) associated with the database design schema 420 based on "matches" between phrases in the parsed string and the indexed annotations 460. The exemplary process 1220'/1225' flows as follows. First, as shown in step 1502, values are initialized. In the following, PWORD will refer to a particular word of the parsed string, ANNOT will refer to a particular annotation in the indexed annotations 460, $AWORD_{ANNOT}$ will refer to a particular word of the particular annotation (ANNOT), FRAGSET will be a set of fragments (or pattern objects), and ORDEREDFRAGSET will be a set or group of rank ordered fragments from FRAGSET. Thus, step 1502 may initialize these terms by initializing PWORD to the first (e.g., leftmost) word of the parsed string, initializing ANNOT to the first word of the indexed annotations 460, initializing $AWORD_{ANNOT}$ to the first word of the annotation ANNOT, initializing FRAGSET as an empty set and initializing ORDEREDFRAGSET as an empty set.

Next, as shown in decision step 1504, it is determined whether PWORD is the same as $AWORD_{ANNOT}$. Note that, in each case, the words may be the root (or stem) of the words. If PWORD is not the same as $AWORD_{ANNOT}$, processing branches to decision step 1506. As shown in steps 1506 and 1508, if the annotation has another word, then the annotation word $AWORD_{ANNOT}$ is set to that next word and processing continues at decision step 1504. Referring back to decision step 1506, if there are no more annotation words $AWORD_{ANNOT}$ in the particular annotation ANNOT, then processing branches to decision step 1510. As shown in steps 1510 and 1512, if there are other annotations remaining in the indexed annotations, then the annotation ANNOT is set to the next of the remaining annotations and the annotation word AWORD$_{ANNOT}$ is set to the first word of the new annotation ANNOT. Processing the continues, once again, at decision step 1504. Referring back to decision step 1510, if, on the other hand, there are no remaining annotations in the indexed annotations 460, then processing branches to decision step 1513.

Decision step 1513 determines whether the dictionary 446 indicates that the current word PWORD of the parsed string is a noun or adjective (or an "open" class word). If PWORD is a noun or adjective, it is assumed that PWORD is important and, as shown in step 1514, an "unknown word" error is generated and presented to the user. Processing then proceeds to decision step 1540. If, on the other hand, PWORD is not a noun or adjective, processing continues at decision step 1540. The following example illustrates the importance of steps 1513 and 1514.

If unrecognized words (i.e., words that do not match any annotations) were merely ignored, misleading query results could be generated. For example, if the query "restaurants with food from Chad" were entered and if Chad was not recognized (i.e., if Chad does not match any of the annotations), the result would return all restaurants in the database 410 and their associated cuisine types. As a further example of what would occur if steps 1513 and 1514 were not performed, the query "Chad restaurant" would return all restaurants without their cuisine type. In this case, the user might incorrectly assume that all of the restaurants serve food from Chad. On the other hand, recall that only unrecognized nouns and adjectives generate error messages. Otherwise, if every unrecognized word generated an error message, users would likely become frustrated by too many spurious error messages.

Finally, as shown in steps 1540 and 1542, if the parsed string has another remaining word, then the word of the parsed string (PWORD) is set to the next remaining word (NEXT PWORD) ANNOT is reset to the first annotation, and AWORD$_{ANNOT}$ is reset to the first word of the annotation ANNOT. Processing then continues at decision step 1504. Otherwise, (matching nodes D in FIGS. 15A and 15B) as shown in step 1550, any fragments in the set may be ordered in accordance with a ranking methodology and processing continues via return node 1560. In the embodiment of the optimized combination process discussed in § 4.4.2.3, the cliques (or sets) of pattern objects (or fragments) do not need to be rank ordered. Accordingly, any steps related to such ranking need not be performed in that embodiment.

Returning back to decision step 1504, if the current word of the parsed string (PWORD) is the same as the current word of the current annotation (AWORD$_{ANNOT}$), then processing continues at step 1520. At step 1520, the current word of the parsed string (PWORD) will be set to the next word (if one exists) of the parsed string. If there are no more words in the parsed string, then the word of the parsed string (PWORD) is set to an end of parsed string message (PEND). Similarly, at step 1520, the current word AWORD$_{ANNOT}$ of the current annotation (ANNOT) is set the next word (if one exists) of the current annotation (ANNOT). If there are no more words in the current annotation (ANNOT), then the word (AWORD$_{ANNOT}$) of the current annotation (ANNOT) is set to an end of annotation message (AEND). Processing then continues with decision step 1522.

As shown in decision step 1522, if both the word of the parsed string is the last word and the word of the current annotation is the last word (i.e., if both PWORD is set to PEND and AWORD$_{ANNOT}$ is set to AEND), then (matching nodes A in FIGS. 15A and 15) processing branches to decision step 1528 which determines whether or not the phrase and the annotation match completely or only partially. More specifically, as shown in decision step 1528, if the first word of the phrase is the same as the first word of the annotation, then processing branches to step 1534. Otherwise, processing branches to decision step 1530.

Returning to decision step 1522 of FIG. 15A, if PWORD is not set to PEND or AWORD$_{ANNOT}$ is not set to AEND, then processing continues at decision step 1524. As shown in decision step 1524, if either the word of the parsed string is the last word or the word of the current annotation is the last word (i.e., if either PWORD is set to PEND or AWORD$_{ANNOT}$ is set to AEND), then (matching nodes B in FIGS. 15A and 15B) processing branches to decision step 1530.

At decision step 1530, it is determined whether the current annotation (ANNOT) was made manually or automatically. This determination is made because manual annotations should match the phrase exactly while partial matches between automatic annotations and the phrase may suffice if some conditions are met. Manual and automatic annotations are treated differently because it is believed that manually generated annotations will be more precise and be the product or more thought, while automatically generated annotations have more opportunity for imprecision. Naturally, the requirement for exact matching for manually generated annotations may merely be a default parameter that may be changed such that exact matching is not necessary. Similarly, the fact that partial matches may suffice for automatically generated annotations may merely be a default parameter that may be changed such that exact matches are required. If, the current annotation (ANNOT) was not generated automatically (i.e., if it was generated manually), then (matching node E in FIGS. 15B and 15A) processing branches to decision step 1540 which was discussed above. This is because the phrase of the parsed string and the current annotation do not match exactly. If, on the other hand, the current annotation (ANNOT) was generated automatically, then processing branches to decision step 1532.

Decision step 1532 checks to see whether the phrase meets certain criteria related to the degree of the match or the confidence of the match. An exemplary set of criteria is set forth below. A partial match is considered valid if (i) (a) all non-class words in the annotation are present or (b) the sum of all the normalized word weights is at least 0.50, and (ii) if there are any unique words in the parsed string, at least one unique word is present. Other criteria may be used to judge partial matches. As shown in FIG. 15B, if the criteria are met, processing branches to step 1534 where a fragment associated with the annotation (ANNOT) is added to the set of fragments (FRAGSET). If, on the other hand, the criteria are not met, (matching nodes E in FIGS. 15B and 15A) processing branches to decision step 1540.

Returning now to decision step 1524 of FIG. 15A, if the current word of the parsed string is not the last word of the parsed string (PWORD≠PEND) and the current word of the current annotation is not the last word of the annotation (AWORD$_{ANNOT}$≠AEND), then (matching nodes C in FIGS. 15A and 15B) processing branches to decision step 1526. If the current word of the parsed string (PWORD) is the same as the current word of the annotation (AWORD$_{ANNOT}$), then (matching nodes F in FIGS. 15B and 15A) processing branches to step 1520 to determine whether the adjacent words also match. If, on the other hand, the current word of the parsed string (PWORD) is not the same as the current word of the annotation (AWORD$_{ANNOT}$), then processing branches to decision step 1530 since there is only a partial match.

After all of the words of the parsed string are checked against all of the words of all of the annotations, a set of fragments (FRAGSET) is analyzed. Naturally, the set of fragments may be empty if step 1534 was never reached. However, assuming that there are some fragments in the set, the fragments may be rank ordered as shown in step 1550. More specifically, as shown in step 1550, for each PWORD or phrase from the parsed query, a group of the fragments may be rank ordered based on a ranking criteria and the rank ordered fragment(s) are added to the set ORDEREDFRAGSET.

For example, in the query "Russian Room", the word "Russian" may completely match an annotation to a particular row of a CuisineType column of a Cuisine table and may partially match an annotation "Russian Tea Room" to a particular row of a Restaurant column of a Restaurant table. Similarly, the phrase "Russian Room" may partially match an annotation "Russian Tea Room" to the particular row of the Restaurant column of the Restaurant table. Finally, the word "Room" may partially match a number of annotations to particular rows of the Restaurant column of the Restaurant table and a Movie column of a Movie table for example. The selection operation selects one of these fragments for each "matching" (partially or completely) word or phrase of the natural language query.

One exemplary set of ranking criteria (rules) is described below. First, complete matches are ranked ahead of partial matches. Second, assuming a complete match, the fragments associated with the matches are ranked: (i) first from the highest number of words in the match to the lowest; and (ii) then from the highest prior (probability) associated with the objects to the lowest. Assuming a partial match, the fragments associated with the matches are ranked: (i) first from the highest product of the normalized weight and the prior (probability) for object references to the lowest; (ii) second from the highest number of words in the match to the lowest; (iii) third from the lowest number of matching entities to the highest; and (iv) finally from the highest normalized weight to the lowest. For each word or phrase of the parsed query, the fragments are rank ordered in accordance with the above criteria. To reiterate, in the embodiment of the optimized combination process described in § 4.4.2.3 below, the cliques (or sets) or pattern objects (or fragments) do not need to be rank ordered. However, each initial pattern may be assigned a cost. In addition, an empty pattern having an associated cost of ignoring the clique to which it belongs may be provided in some or all of the cliques.

In the database schema, there may be relations that have "free text" (or "blurb") entities as their destinations. If at least part of a natural language query can be a "blurb", the blurb entity (pattern object) may appear across multiple (adjacent) cliques, just as a phrase pattern object may appear across multiple (adjacent) cliques.

§ 4.4.2.3 Combining Fragments (Patterns)

As discussed in § 4.4.2.2 above, a phrase matcher may be used to generate groups of fragments (also referred to as "patterns"), each group corresponding to a word of the parsed string. If a pattern corresponds to a phrase (i.e., more than one word) of the parsed string, the pattern may appear across multiple groups. Each group of pattern objects may be referred to as a "clique". Although the pattern objects may be rank ordered within each clique, for example as described in § 4.4.2.2 above, they need not be so ranked. One aspect of the present invention may function to combine these pattern objects to generate a formal query.

Before describing the optimized (pattern object) combination process 1230', certain terms, which may be used below, are defined.

A pattern may be a set of entity and relation variables. Each entity or relation variable of a nonempty pattern may have a distinct type. In addition each relation variable connects a source and a destination entity variable. It is worthwhile thinking of a pattern as a directed graph, in which entity variables are vertices and relation variables are edges. Each vertex and edge may be labeled with a type symbol. The source and destination of a directed edge is the source and the destination of the relation variable. The graph corresponding to a pattern is connected, meaning that any entity or relation variable can be reached from any other entity or relation variable by going through the source and destinations of relation variables. There is one exception—a pattern may also be a single relation variable with unspecified source and destination (also referred to as a "singleton relation"). The corresponding graph for such a pattern would be ill formed—an edge for which the source and destination do not exist but nevertheless, it is considered connected.

Although not part of the combination process, it should be noted that patterns with this structure are typically used for graph matching. Consider a directed graph in which each vertex and each edge is labeled with a type, as for the patterns. Both vertices and edges could have additional properties. A pattern "matches" a graph if one can construct a one-to-one correspondence between entity variables and vertices and between relation variables and edges, such that the label on each vertex and edge is the same as that of the corresponding variable and such that for each relation variable, its source and destination are the source and destination vertices of the corresponding edge. Empty patterns, defined later, match anything.

An entity variable that is an element of some pattern P is denoted by T(X), where T is the entity type name and X is a symbol that is unique in P. Similarly a relation that is an element of P is denoted by T(X,S,D), where T is the relation type name, X is a symbol that is unique in P, S is the symbol for the source entity and D is the symbol for the destination entity. When a symbol is not significant, it may be denoted as '_'.

A pattern may be denoted by an expression [$T_1, \ldots, T_k$], where each $T_i$, $1 \leq i \leq k$, denotes an element of the pattern as above (the order is not significant). For example, a pattern consisting of a single entity variable of type employee could be denoted by

[employee(_)], a pattern consisting of two entity variables of types person and first-name, as a relation of type has-name from one to the other could be denoted by

[employee(E), has_name(_, E, N), first_name(N)], and a pattern consisting of three entity variables of types movie, person and theater, a relation variable of type has-director from the movie to the person, and a relation of type shows-at from the movie to the movie theater could be denoted by

[movie(M), has_director(_, M, D),
person(D), shows_at(_, M, T),
theater(T)].

In addition, a pattern may have a restriction, which is presently a logical statement built from conjunction, disjunction and negation connectives, and atomic statements that are applications of predicates (equality, etc) to properties of entity variables and constants. Two examples of patterns with restrictions are:

[employee(E), has_name(_, E, N), first_name(N)]
where value(N) = 'Greg' which matches a graph in which some employee E has a name that is a first name N with a value of Greg, and

[employee($E_1$), has_salary(_, $E_1$, $A_1$), amount($A_1$),
employee($E_2$), has_salary(_, $E_2$, $A_2$), amount($A_2$)]
where value($A_1$) > value($A_2$).

which matches a graph in which there are employees $E_1$ and $E_2$ with salary amounts $A_1$ and $A_2$ respectively, such that the value of the former is greater than that of the latter.

A pattern object may include: (1) a unique identifier, which will be assumed to be a natural number; (2) a pattern, as described above; (3) a cost, which is a nonnegative number; and (4) a set of identifiers of ancestor pattern objects. The identifier uniquely identifies a pattern object so when the meaning is obvious, a pattern object, its identifier and its pattern may be discussed as if they were the same.

A pattern object with an empty pattern is called a void pattern object.

For an input pattern object, a cost (described in more detail later) is given. For a pattern constructed during an optimized combination process, the cost may be computed as described below. In one exemplary embodiment, costs of input patterns are in the range 1 to 10.

The ancestor set reflects the set of patterns that were used to construct the pattern. For an input pattern, the ancestor set contains its only own identifier. For other patterns, the computation of the ancestor set is described below. (Sometimes, patterns of identical structure, but that were built by connecting different initial patterns and that may thus have different costs, may be constructed. The ancestor set gives sufficient information to correctly distinguish such patterns and compute their costs correctly.)

A clique is a set of patterns objects, which should be thought of exclusive alternatives. As described below, an optimized combination process chooses exactly one pattern from each clique and joins the chosen patterns. Thus, a clique can be thought of as alternative but contradictory interpretations. A clique may contain at most one void pattern object. Choosing the void pattern object of a clique effectively ignores the clique (and the word of the parsed phrase with which the clique is associated) but does incur the cost of the void pattern object.

Thus, referring to FIG. 16, the phrase matcher may generate data 1610 which includes cliques 1612 of pattern objects 1614. Each clique 1612 may have a different number of pattern objects 1614. For example, clique 1 1612a may have n pattern objects 1614 while clique x 1612b may have m pattern objects 1614. Further, each pattern object 1614 may include an associated cost 1616. This cost may correspond to the ranking aspect of the phrase matcher described in § 4.4.2.2 above. For example, this cost may be based, at least in part, on a degree to which a string of the parsed query "matched" the annotation associated with the pattern of the pattern object, or a word class (e.g., adverb, adjective, verb, noun, proper noun, etc.) of the string or the annotation associated with the pattern of the pattern object. Some of the cliques 1612 may have a cost 1616 for ignoring its pattern objects 1614. (Recall "void pattern objects".) This cost of ignoring may be based on a word class of the string with which the clique 1612 is associated (e.g., the cost of ignoring an adverb or an adjective may be 1, the cost of ignoring a verb may be 3, the cost of ignoring a noun may be 5, and the cost of ignoring a proper noun may be infinite).

As shown in FIG. 16, an exemplary optimized combination process (or, more generally, a combination process) 1230' may function to accept the cliques 1612 of pattern objects 1614 and a database schema 420 (See, e.g., FIG. 14.) and to generate a connected pattern consistent with the schema 420 and covering a selection of pattern objects 1614, one from each of the cliques 1612.

As is further shown in FIG. 16, the exemplary optimized combination process 1230' may consider hints 1620 when determining how to best combine patterns from the cliques 1612. The hints 1620 may include, for example, source hints 1622, destination hints 1624, proximity hints 1626, and possessive hints 1628. For example, in the queries:

Who does Andrew work for? and
Who works for Andrew?

There may be, within the database schema 420, two "person" entities, one of which has the value "Andrew", connected by a "works for" relationship. Source and destination hints may apply a syntactic (or linguistic) analysis to determine whether the "person" entity having the "Andrew" value is the source of the "works for" relationship (as is the case in the first exemplary query) or the destination of the "works for" relationship (as is the case in the second exemplary query). A source hint may apply a discount (e.g., 0.25) if a pattern from one clique is a source of a pattern in another clique. If there is an intervening entity between the patterns, the discount may be decreased (e.g., 0.125). Similarly, a destination hint may apply a discount (e.g., 0.25) if a pattern from one clique is a destination of a pattern in another clique. If there is an intervening entity between the patterns, the discount may be decreased (e.g., 0.125).

As an example of proximity hints 1626, consider the query:
Italian or Chinese restaurants in Midtown.

A proximity hint 1626 may be used to favor solutions that combine "Chinese" with "restaurant". A proximity hint may apply a discount (e.g., 0.25) if a pattern from one clique is next to (i.e., directly related to) a pattern from another clique. If there is an intervening entity between the patterns, the discount may be decreased (e.g., 0.125).

As an example of possessive hints 1628, consider the query:
Bob's e-mail on December 1.

A possessive hint 1628 may be used to favor solutions that combine "Bob's" with "e-mail". Various sets of hints may be tried. Within a set of hints, the hints should not be based on inconsistent linguistic interpretations of the query.

Thus, hint sets may be generated from a syntactic analysis of the natural language query. Different hint sets may apply to different interpretations of the same natural language query. Each hint set will be coherent. For example, from the phrase:
Where can I see a bird on a hill with a telescope?

The nouns "I" or "bird" can be combined with "one a hill" or "with a telescope". Thus, there are at least four possible linguistic interpretations of the phrase, thereby generating at least four hint sets. (Recall, for example, modifier attachment ambiguities, quantifier scope ambiguities, conjunction and disjunction ambiguities, nominal compound ambiguities and anaphora. Hint sets may be used to address these linguistic ambiguities.) When a given state is generated, as described below, it is determined whether or not hints in a hint set can be applied. Discounts to the cost of a state may be made for each hint within a hint set that can be applied. Only one hint set at a time is applied. However, if certain hints appear across multiple sets, the discount associated with such a hint may be increased due to an increased confidence in the applicability of the hint.

Referring still to FIG. 16, notice that a path cost precomputation process 1630 may be used to generate entity-to-entity costs or, alternatively, nexus-to-nexus, entity-to-closest nexus, and entity-to-entity exception costs from the database schema 420. The precomputation process 1630 may be used to ease computational burdens on the optimized combination process 1230' during runtime, as will become apparent below.

Having introduced a context in which the optimized combine process 1230' may be used, an exemplary method 1230" for effecting the optimized combine process 1230' is now described with reference to FIG. 18.

FIG. 18 is a high level flow diagram of an exemplary method 1230" which may be used to effect the optimized combine process 1230'. As will become apparent, the exemplary optimized combination method 1230" can be thought of a "best first" searching method in which costs of various states, each state corresponding to pattern objects, at least some of which are combined, are estimated and updated. After each update, the most promising (e.g., lowest estimated cost) state can be further pursued. If an updated estimated cost of the most promising state turns out to be greater than the estimated cost of a previous state, that previous state can be pursued.

More specifically, referring to FIG. 18, the cliques 1612 of pattern objects 1614 are accepted (hint sets 1620 may also be accepted) as shown in block 1805. Then, as shown in block 1810, a pattern object 1614 is selected from each clique 1612 to generate a start state. Further, as shown in optional decision block 1820 and block 1825, all possible start states may be determined by selecting all possible combinations of one pattern object 1614 from each of the cliques 1612.

At this point, all possible start states have been generated. As shown in block 1830, a cost heuristic may be applied to each of the start states (or more generally, "states") based on the database schema 420. An exemplary cost heuristic will be described in more detail in § 4.4.2.3.1.2.2 below. Next, as shown in block 1835, a best (e.g., lowest estimated cost) state is selected. Then, in decision block 1840, it is determined whether or not a final solution has been found. This determination may be based on determining whether the state is a single connected pattern. If a final solution has not been found, the method branches to block 1845.

In block 1845, successor states of the selected state are determined. Basically, such successor states may be generated by combining (e.g., by unification or joining described in § 4.4.2.3.1.1 below) patterns of the selected state. For example, if the selected state has a number K of patterns, the successor states should each have K−1 patterns. Alternatively, more than two patterns can be combined, in which case the each of the successor states would have less than K patterns. The number of successor states may be pruned as will be described in § 4.4.2.3.1 below. As shown in block 1850, a cost heuristic, based, for example, on the database schema 420, may be applied to each of the successor states. Then an estimated cost may be applied to each of the successor states as shown in block 1855. The estimated cost may be a function of an actual (or known) cost and the heuristic (or unknown) cost. Finally, as shown in block 1860, the successor states (that have not been pruned) may be added to a state queue. Alternative methods for performing blocks 1845, 1850, 1855 and 1860 are described in § 4.4.2.3.1 with reference to FIGS. 19 and 20.

After block 1860, the method branches back to block 1835 where a new best (e.g., lowest estimated cost) state is selected. Thus, the method 1230" is iterative and pursues a state that is estimated to provide the best (e.g., lowest cost) solution (i.e., a single connected pattern).

Returning to decision block 1840, if it is determined that a final solution has been found (e.g., the state has a single connected pattern), then the method 1230" branches to block 1865 where a final cost is computed. As will become more apparent in § 4.4.2.3.1.2 below, the final cost may be adjusted to include any entity or relation types in the final pattern that are not type compatible with entity or relation types in the original patterns (i.e., those patterns in the cliques). Such costs are tracked but are not used when determining the definitive or known heuristic cost component of the estimated cost since it is not known whether or not these entities (and their associated costs) will remain.

The method 1230" may use a predetermined time limit to determine more than one solution. Alternatively, there may be two (2) timeouts in the method 1230. First, if no solution is found within a first predetermined time $T_1$ (where $T_1$ may be infinite), the method "gives up". Second, once a first solution is found, the method can continue the search for a second predetermined time $T_2$ (where $T_2$ may be 0). In this alternative embodiment, the first predetermined time $T_1$ should be checked on each round of the loop (e.g., just before decision block 1835), and not just when a solution is found. Thus, in this alternative, an initial time allotment of $T_1$ is provided and after a first solution has been found, the method gets another time allotment of $T_2$ (from the time of the first solution). As will be appreciated from the description in § 4.4.2.3.1 below, this is because some assumptions in pruning successor states, which are very useful in reducing runtime computations, may, in some relatively rare instances, cause a non-optimal solution to be generated. Therefore, if time permits (for example, if a user would not perceive or be unduly annoyed by the extra time), additional solutions may be found as indicated by decision block 1875. More specifically, the solution state and its final cost may be saved as shown in block 1870. Actually, if there is already a better (e.g., lower cost) solution state, the present solution state need not be saved. Then, at decision block 1875, if a time out period has not expired, the solution state is removed from the state queue as shown in block 1880 and the method 1230" continues at block 1835. (Although not shown, once the known costs of a state exceed the total cost of a solution, that state should no longer be pursued since it cannot be an optimal solution.) If, on the other hand, the time out period has expired, the solution with the best final cost is returned as shown in block 1885 and the method 1230" is left via RETURN node 1890. There may be the case that step 1885 finds that no solution has been saved. In such a case, the translator may revert to generating an information retrieval style of query, searching for words occurring in the input in predetermined columns.

Having described one way to effect the optimized combination process 1230', at least at a high level, exemplary methods for generating and determining costs of successor states are now described in § 4.4.2.3.1 below with reference to FIGS. 19 and 20.

§ 4.4.2.3.1 Generating and Determining Costs of "Successor" States

Recall from blocks 1845, 1850, 1855 and 1860 of FIG. 18 that given a selected state, successor states are generated, cost heuristics are applied to each of the successor states, an estimated cost is applied to each of the successor states and the successor states are added to a state queue. FIGS. 19 and 20 are high level flow diagrams of alternative methods for effecting these acts. Each will be described in turn.

FIG. 19 is a high level flow diagram of an exemplary method 1845'/1850'/1855'/1860' for effecting the foregoing acts. For each pair of patterns in the selected stated, a number of acts are performed as shown within loop 1905-1955. First, as shown in block 1910, for the given pair of patterns of the selected state, actions (for combining) the patterns and the associated costs of such actions are determined. Actions for combining patterns may include a "unify entity" action described in § 4.4.2.3.1.1.1 below, a "unify relationship" action described in § 4.4.2.3.1.1.2 below, and a "join" (or link) pattern objects action described in § 4.4.2.3.1.1.3 below. As will be described in more detail below, in one exemplary embodiment, the cost for a unify entity or unify relation action is zero, and the cost of a join (or link) pattern objects action is based on the cost of relationships (e.g., a cost of 2 for each relationship) and entities (e.g., a cost of 1 for each entity) added to the pattern.

Next, as shown in optional block 1915, these actions may be pruned. Pruning serves to reduce computations. In one exemplary embodiment, for a given pair of patterns in the selected state, only the lowest cost action(s) and actions within a predetermined range of (e.g., within 1.15 times) the lowest cost action(s) are kept—the rest are deleted. In practice, the present inventors have found that such limited pruning advantageously reduces later computations (i.e., computational complexity) while still permitting a globally optimal solution to be found. Recall from FIG. 18 that more than one solution may be found.

Referring to loop 1920-1950, for each of the remaining (un-pruned) actions, a number of acts are performed. As shown in block 1925, for each remaining action, a new state having the combined selected patterns is created. Then, as shown in block 1925, a definitive (or known) cost component of an estimated cost associated with the newly created state is updated. More specifically, the definitive (or known) cost may be defined as the definitive costs of the parent plus the cost of the action. If the action was a join (or link) pattern objects, the cost of the action can ignore costs of entities and relationships in the "path" or "chain" connecting the selected patterns that are type compatible with entities and relationships in the original pattern objects (i.e., the pattern objects 1614 selected from the cliques 1612). This is because such entities and relationships, and their associated costs, may drop out later. Hence, the cost of such entities and relationships is unknown. As shown in block 1935, a heuristic cost associated with the newly generated state may be determined. Exemplary ways of effecting this act are described in § 4.4.2.3.1.2.2 below. Then, as shown in block 1940, an estimated cost associated with the state, which is based on the definitive (or known) cost and the heuristic (or unknown) costs, is determined. In one exemplary embodiment, the estimated cost may be the sum of the definitive costs and the heuristic costs. The newly generated state (and its associated estimated cost) may then be added to a state queue as shown in block 1945. After all remaining actions are processed with in the loop 1920-1950, a next pair of patterns in the selected state are determined and processed in the loop 1905-1955.

After all pairs of patterns in the selected state are processed, the method 1845'/1850'/1855'/1860' is left via RETURN node 1960.

FIG. 20 is a high level flow diagram of an alternative exemplary method 1845"/1850"/1855"/1860" for effecting the associated acts in FIG. 18. Basically, this alternative exemplary method uses a different pruning scheme than that used in the exemplary method illustrated in FIG. 19.

Referring now to FIG. 20, at decision block 2005, it is determined whether or not any patterns of the selected state have one or more "nexus". A nexus may be defined as an entity which is the source of or destination to a relatively large number of relationships. Nexuses may be manually selected or identified, may be defined as "having" greater than a predetermined number of relationships, or may be defined as being within a top predetermined percentile of entities "having" relationships. If any patterns of the selected state have one or more nexus, a pattern(s) of these patterns with a minimum cost is selected as shown in block 2015. Otherwise, if none of the patterns of the selected state have a nexus, a minimum cost pattern of all of the patterns is selected as shown in block 2010. The present inventors believe that this pruning technique may be useful because it favors pursuing patterns with one or more nexus first. Such patterns are pursued first since the inventors believe that the presence of one or more nexus in the pattern will permit the other patterns of the selected state to be added with less expense later.

In any event, referring once again to FIG. 20, the acts within the loop 2020-2055 are performed for each pair of patterns in the selected state, where each such pair of patterns includes the pattern(s) selected in block 2010 or 2015. For a given pair of patterns, as shown in block 2025, actions (for combining) the patterns and the associated costs of such actions are determined. To reiterate, actions for combining patterns may include a "unify entity" action described in § 4.4.2.3.1.1.1 below, a "unify relationship" action described in § 4.4.2.3.1.1.2 below, and a "join" (or link) pattern objects action described in § 4.4.2.3.1.1.3 below. As will be described in more detail below, in one exemplary embodiment, the cost for a unify entity or unify relation action may be zero, and the cost of a join (or link) pattern objects action may be based on the cost of relationships (e.g., cost of 2 for each entity) and entities (e.g., cost of 1 for each entity) added to the pattern. Then, as shown in block 2030, a new state having the combined selected patterns is created. Then, as shown in block 2035, a definitive (or known) cost component of an estimated cost associated with the newly created state is updated. To reiterate, the definitive (or known) cost may be defined as the definitive costs of the parent state plus the cost of the action. If the action was a join (or link) pattern objects, the cost of the action should ignore costs of entities and relationships in the "path" or "chain" connecting the selected patterns that are type compatible with entities and relationships in the original pattern objects (i.e., the pattern objects 1614 selected from the cliques 1612). As shown in block 2040, a heuristic cost associated with the newly generated state may be determined. Exemplary ways of effecting this act are described in § 4.4.2.3.1.2.2 below. Then, as shown in block 2045, an estimated cost associated with the state, which is based on the definitive (or known) cost and the heuristic (or unknown) costs, is determined. To reiterate, in one exemplary embodiment, the estimated cost may be the sum of the definitive costs and the heuristic costs. The newly generated state (and its associated estimated cost) may then be added to a state queue as shown in block 2050. After all pairs of patterns, including a selected pattern, of the selected state are processed in the loop 2020-2055, the method 1845"/1850"/1855"/1860" is left via RETURN node 2060.

Recall from FIGS. 19 and 20 that for a given pair of patterns, actions for joining those patterns, and their costs, may be determined. Exemplary ways to combine pattern objects are now described in § 4.4.2.3.1.1 below.

§ 4.4.2.3.1.1 Ways to Combine Patterns (Fragments)

As introduced in § 4.4.2.3.1 above with reference to FIGS. 19 and 20, pattern objects may be joined by unifying entities in the pattern objects, unifying relationships in the pattern objects, or joining pattern objects (e.g., via a path including entities and relationships that is consistent with the database schema 420).

Basically, each pattern (fragment) is a collection of (one or more) objects (e.g., at least a part of entity tables or property tables) that are related to one another in accordance with the database design schema 420 (e.g., the ERD). All patterns have a "type". For example, referring to the Prolog file of Exhibit A, each column of each table has a defined type. In the exemplary ERD of Exhibit A, the types include: addressType, admissionFlag, cinema, cinemaType, city, cuisineType, date, entity, entityFlag, floating point, genre, hoursType, integer, movie, movieFlag, neighborhood, neighborhoodID, parkingType, paymentType, personPlace, personPlaceFlag, phoneType, price, quality, rating, reservation, restaurant, restaurantFlag, stars, starsID, string, time. As is evident from Exhibit A, different columns of different tables can be of the same type.

Each object may be either bound (i.e., confined to a particular set of rows of its type) or unbound (not confined).

As shown in step 1230, patterns (or fragments) of the cliques (or groups) 1612 are "combined" so that a formal command query may be generated for interpretation by the database management process 470. Basically, the combination process combines the patterns in each of the groups (or cliques) in a way consistent with the annotated database design schema 420 (e.g., the annotated ERD) and in a least costly way. Once the pattern objects 1614 from each of the cliques 1612 are combined, the resulting connected pattern can be easily converted to a formal command query.

Unifying entities in patterns is described in § 4.4.2.3.1.1.1 below. Then, unifying relationships in patterns is described in § 4.4.2.3.1.1.2 below. Finally, joining patterns (e.g., via a path that is consistent with the database schema 420) is described in § 4.4.2.3.1.1.3 below.

§ 4.4.2.3.1.1.1 Unifying Entities of Patterns

Consider two patterns $P_1$ and $P_2$, where $P_1$ contains an entity of type $T_1$ with symbol $v_1$ and $P_2$ contains an entity of type $T_2$ with symbol $v_2$, such that $T_1$ and $T_2$ are unifiable (e.g., min $(T_1, T_2)$ exists, which in turn means that either $T_1$ and $T_2$ are the same, or one is (transitively) a subtype of the other). $P_1$ and $P_2$ can then be connected by unification. The result of connecting the patterns is then a single pattern in which the two terms of types $T_1$ and $T_2$ have been merged to a single term of type min$(T_1, T_2)$. For example, the two patterns

[person(X), has(_, X, Y), name(Y)]

and

[employee(U), has(_, U, V), address(V)]

can be connected by unification on the person/employee type entities (assuming that employee is a subtype of person) and the resulting pattern is

[employee(X), has(_, X, Y), name(Y), has(_, X, V), address(V)].

The result of the unification may be thought of as an addition of a restriction that X=U. In either case, the resulting pattern matches an employee having a name and an address.

If $P_1$ and $P_2$ are connected by unification of a pair of entity variables $T_1(v_1)$ in $P_1$ and $T_2(v_2)$ in $P_2$, then the pattern of P is that expressed by $(P_1 \backslash T_1(v_1))[v\backslash v_1] \cup (P_2 \backslash T_2(v_2))[v\backslash v_2] \cup \{T(v)\}$, where v is a new symbol and T is min$(T_1, T_2)$. (E[v/w] means the expression resulting from replacing with v each free occurrence of w in E.)

Potential generalizations of this form of unification include unifying three or more patterns at the same time, unifying patterns on more than one variable, and unifying two variables in the same pattern.

An alternative method may unify complete patterns. More specifically, if two (2) patterns are unified, all objects in those patterns are unified, thereby combining the two (2) patterns to define a single pattern. To put it another way, to unify two (2) patterns, there must be at least one (1) pair of objects (i.e., at least a part of an entity table or a property table) that can be coerced to refer to the same object. More specifically, two (2) objects can be coerced to refer to the same object if both objects are of the same type or of a more general type.

The following is an example of unifying two (2) patterns having objects of the same type. In the query "I'd like to eat Mexican food", the word "eat" matches annotations to patterns, including the pattern having the object "cuisineType (variable_1)". In addition, the word "Mexican" matches annotations to patterns, including the pattern having the object "cuisineType(Mexican)". Finally, the word "food" matches annotations to patterns, including the pattern having the object "cuisineType(variable_2)". Since these patterns contain objects (in this case, entities) of the same type, namely, cuisineType, they are combined to form the unified pattern having the object (in this case, entity) cuisineType (Mexican).

The following is an example of unifying patterns where a first pattern has an object which is of a more general type and the second pattern has an object which is of a more specific type (i.e., the two (2) objects belong to tables related by an "IS A" relation). In the query "Restaurants named Gabriel's", the word "restaurant" matches annotations to patterns, including the pattern having the object "restaurantID(variable_1)". Further, the word "Gabriel's" matches annotations to patterns, including the pattern having the object "personPlaceID (n)", where "n" is a number associated with "Gabriel's". Since the personPlaceID table is a supertype of the restaurantID table, i.e., restaurantID <==> personPlaceID, the supertype is unified into the subtype restaurant to form a pattern having the object "restaurantID(n')", where n' is a number associated with "Gabriel's".

Two (2) objects that are unbound (i.e., have unspecified or variable values; not constrained to particular a row(s)) can be coerced into a single unbound object. For example, in the query "Eat food", the word "eat" matches annotations having patterns, including the pattern having the object cuisineType (variable_1). Further the word "food" matches annotations having patterns, including the pattern having the object cuisineType(variable_2). Since the object types are the same (tables having a "IS A" relation can also be unified in this way), the variables are set to a single variable. That is, the patterns, when unified, form a pattern having the object "cuisineType(variable)".

An unbound object and a bound (i.e., constrained to certain value(s) or row(s)) object can be coerced to a grounded (i.e., constrained to a single value or row) object. For example, in the query "eat Italian", the word "eat" matches annotations to patterns, including the pattern having the object "cuisineType (variable_1)". Further, the word "Italian" matches annotations to patterns, including the pattern having the object "cuisineType(Italian)". These two (2) patterns may be unified to form a pattern having the object "cuisineType(Italian)".

Two (2) bound entities (tables) can be coerced to an entity bound to a non-empty intersection of their bindings. This is because entities can only be joined by a relationship, not by implicit conjunctions. For example, in the query "restaurant in downtown Financial District", the word "downtown" will match annotations to patterns, including patterns having the objects "neighborhood(Battery Park)", "neighborhood(Wall Street)", and "neighborhood(Financial District)". Further, the phrase "Financial District" will match annotations to patterns including the object "neighborhood(Financial District)". In this case, unification yields a pattern based on the non-empty intersection of the bound entities. That is, the unification produces a pattern having the object "neighborhood(Financial District)".

Two (2) bound properties (or attributes of entities) can be coerced to a property bound to a union of their bindings. This is because properties are like adjectives. For example, in the query "movie with Robert DeNiro and Dustin Hoffman" the phrase "Robert DeNiro" matches annotations to patterns, including the pattern having the object "movieStarID(x)", where "x" corresponds to Robert DeNiro. Similarly, the phrase "Dustin Hoffman" matches annotations to patterns, including the pattern having the object "movieStarID(y)", where "y" corresponds to Dustin Hoffman. In this case, unification yields a pattern based on the union of the bound properties. That is, the unification produces a pattern having the objects "movieStarID(x)" and "movieStarID(y)".

§ 4.4.2.3.1.1.2 Unifying Relationships of Patterns

Relationships can be unified if (i) the relationships have types that are compatible, (ii) the source entities of the relationships can be unified, and (iii) the destination entities of the relationships can be unified.

For example, the two patterns:
[employee(X), has(A, X, Y), salary(Y)]
and

[person(U), has(B, U, V), compensation(V), has(C, U, W), name(W)]

can be connected by unification on the relationships A and B (assuming that employee is a subtype of person and that salary is a subtype of compensation) and the resulting pattern is

[employee(U), has(B, U, V), salary (V), has(C, U, W), name(W)]

§ 4.4.2.3.1.1.3 Joining Patterns

Before the act of joining patterns is described in detail, exemplary notions of paths and schema are described.

A path may be defined as a nonempty sequence $e_0 R_1 e_1 \ldots e_{k-1} R_k e_k$, $k \geq 1$, where each $e_i$ names an entity type, $0 \leq i \leq k$, and each $R_j$ is either $r_j$ or $r_j^{-1}$ where $r_j$ names a relation type, $1 \leq j \leq k$. (That is, a path may be thought of as a sequence of alternating entity and relation types that begins and ends with an entity type and where relation types can be annotated with $^{-1}$.) Without the annotation the source and destination of the relation are on its left and right, respectively, while with the annotation it is the opposite, so a $^{-1}$ annotation denotes an inverse relationship. When R is one of r and $r^{-1}$, |R| is used to stand for r. For example, one path supported by a database schema is sidewalk:restaurant
  ppt:has
    ppt:address
      ppt:has$^{-1}$
        sidewalk:cinema
          ppt:has
            ppt:name Let the length of a path may be defined as the number of relation types in it (possibly annotated with $^{-1}$) The length of the path in the example above is 3. A unit path is a path of length 1, i.e., a path on the form $e_0 R_1 e_1$.

For any path $Z=e_0 R_1 e_1 \ldots e_{k-1} R_k e_k$, there is a corresponding pattern which is that denoted by the expression

[$e_0(X_0)$,
$r_1(u_1, v_1, w_1)$,
$e_1(X_1)$,
...,
$e_{k-1}(X_{k-1})$,
$r_k(u_k, v_k, w_k)$,
$e_k(X_k)$]

where each $x_i$ and $u_i$ is a distinct symbol, and for each i, $1 \leq i \leq k$, if $R_i$ is on the form $r_i^{-1}$, then $v_i$ is $x_{i-1}$ and $w_i$ is $x_i$; otherwise $R_i$ is $r_i$, $v_i$ is $x_i$ and $w_i$ is $x_{i-1}$. Below, this pattern is denoted by $Z[x_0, x_k]$.

For example, the pattern corresponding to the path above can be denoted by

[sidewalk:restaurant(R),
ppt:has(_, R, A),
ppt:address(A),
ppt:has(_, C, A),
sidewalk:cinema(C),
ppt:has(_, C, N),
ppt:name(N)].

(Note how the $^{-1}$ annotation on the ppt:has relation connecting the address and the cinema meant that the address is the destination and the cinema is the source.)

As described below, the cost of a path may be a function of the number of entities and relations it contains: a constant $c_e$ times the number of entities plus a constant $c_r$ times the number of relations. Sample values of $c_e$ and $c_r$ are 2 and 1. (The rationale is that assuming a new entity should be more expensive than assuming a new relationship between existing entities.) The cost of a path may be made to depend on the types of the relations and entities involved. For example, if attributes are modeled by subtypes of a relation core:has, then making paths containing such relations less expensive may be desirable.

A database design schema 420 may include (i) transitive subtype relation over pairs of types, and (ii) a present set of unit paths. A pattern adheres to a schema if for any relation variable in the schema, the triple (S, R, D) is in the present set of the schema, where S is the type of the source entity variable, R is the type of the relation variable, and D is the type of the destination variable.

The schema supports a path if for each subsequence $e_1 \, r \, e_2$ or $e_2 \, r^{-1} \, e_1$ of the path, where $e_1$ and $e_2$ are entity types and r is a relation type, there is unit path $e_1 \, r \, e_2$ in the schema.

A schema may be generalized so that it can contain larger chunks (longer paths or more complex patterns).

Consider two patterns $P_1$ and $P_2$ where $P_1$ contains an entity of type $T_1$ with symbol $v_1$ and $P_2$ contains an entity of type $T_2$ with symbol $v_2$, such that $T_1$ and $T_2$ are not unifiable. The two patterns can be connected (in the current schema) by adding a path from $T_1$ to $T_2$, as follows. Let $Z = e_0 \, R_1 \, e_1 \ldots e_{k-1} \, R_k \, e_k$, $k \geq 1$, be a path that is supported by the current schema and such that $e_0$ is a subtype of $T_1$ and $e_k$ is a subtype of $T_2$. One result of connecting the two patterns is then the set denoted by $$(P_1 \backslash T_1(v_1)) \cup (P_2 \backslash T_2(v_2)) \mathring{A} Z[v_1, v_2],$$

where $Z[v_1, v_2]$ is the pattern corresponding to the path Z where the first entity variable has symbol $v_1$ and the last entity variable has symbol $v_k$.

For example, suppose that the patterns

```
[sidewalk:business(B),
    foo:has_ceo(_, B, P),
    ppt:person(P)]
``` and

```
[ppt:name(N)]
    where value(N) = 'Cinerama'
``` are to be connected using the path

```
sidewalk:restaurant
    ppt:has
        ppt:address
            ppt:has⁻¹
                sidewalk:cinema
                    ppt:has
                        ppt:name.
```

In the schema, sidewalk:restaurant is a subtype of sidewalk:business.

The pattern corresponding to the path, beginning with symbol B and ending with symbol N, is

```
[sidewalk:restaurant(B),
    ppt:has(_, B, A),
    ppt:address(A),
    ppt:has(_, C, A),
    sidewalk:cinema(C),
    ppt:has(_, C, N),
    ppt:name(N)].
```

The result of combining the patterns by adding the path above is then the pattern

```
[sidewalk:business(B),
    foo:has_ceo(_, B, P),
    ppt:person(P),
    ppt:has(_, B, A),
    ppt:address(A),
    ppt:has(_, C, A),
    sidewalk:cinema(C),
    ppt:has(_, C, N),
    ppt:name(N)]
    where value(N) = 'Cinerama'
``` where the restriction was inherited from one of the original patterns.

If the patterns to be connected have restrictions, the restriction of the resulting pattern is the conjunction of those restrictions. For example, if the patterns are

```
[employee(E_1), has_name(_, E_1, N), first_name(N)]
    where value(N) = 'Greg'
``` and

```
[employee(E_2), has_salary(_, E_2, A), amount(A)]
    where value(A) > 100000
``` and these patterns are combined by unification on $E_1$ and $E_2$, then the resulting pattern is

```
[employee(E), has_name(_, E, N), first_name(N),
              has_salary(_, E, A), amount(A)]
    where value(N) = 'Greg'
    and value(A) > 100000.
```

Sometimes the result of combining two patterns can be impossible to satisfy. For example, given the patterns

```
[first_name(N_1)]
    where value(N_1) = 'Greg'
``` and

```
[first_name(N_2)]
    where value(N_2) = 'Edward',
``` unification on $N_1$ and $N_2$ results in the pattern

> [first_name(N)]
> where value(N) = 'Greg'
> and value(N) = 'Edward'.

Inconsistent patterns on this form are easy to detect and discard. Other inconsistencies may be less obvious and harder to detect.

If two (2) given patterns from two (2) cliques 1612 cannot be combined via unification, a combination via a path linking operation should be tried. Basically, the two (2) patterns from the two (2) cliques 1612 may be combined if there is a path, defined by the database design schema 420, that connects an object (e.g., an entity) from each pattern. In the following, it will be assumed that the database design schema 420 is an ERD. If the database design schema is an ERD, then the path may include relationships and entity tables or property tables through the ERD that connects an object (i.e., at least a part of a entity table or property table) from each pattern. The path may include ("IS A") relationships from a subtype entity table to supertype entity table (but not from a supertype to a subtype). Such links of the path may be referred to as "generalization links". The path may also include ("HAS A") relationships from an entity table to a property table or ("BELONGS TO") relationships from a property table to an entity table.

Since there may be a number of different paths between different objects (e.g., entities) of the two (2) patterns, the path between two (2) objects (e.g., entities) of the patterns should be an optimum path.

Such an optimum path may be determined as follows. First, since each of the patterns to be joined may have more than one (1) object (e.g., entity), the two (2) objects (e.g., entities) of the patterns to be joined should be determined. These two (2) objects (e.g., entities) may be selected based on an ERD path cost criteria, and, in the event of a tie, then based on a query distance criteria. Both ERD path cost and query distance are described below.

The ERD path cost between two (2) objects (e.g., entities) may be defined as the (or a) minimum weighted sum of all edges on a path between the tables of the objects (e.g., entities). That is, each ("IS A") relationship between entity tables and each ("HAS A" or "BELONGS TO") relationship between an entity table and a property table may be provided with a weight (e.g., between 0.0 and 1.0) in the database design schema 420. If no weight is provided, each of the relationships may be assigned a default weight (e.g., 1.0 for "HAS A" relationships and 0.0 for "IS A" relationships). In such a case, the ERD path cost may be simply thought of as an ERD path distance. If an optimum path cannot be conclusively determined based on ERD path cost (i.e., if there is a tie), then query distance, as described below, may be used as a "tie breaker".

Since objects are selected from patterns associated with annotations that match the words of a query, the query distance between two (2) objects is the number of words between the two (2) words of the query from which the two (2) objects were generated.

Referring to FIG. 16, a path cost pre-computation process 1630 may be used to precompute entity-to-entity costs. Alternatively, a path cost pre-computation process 1630 may be used to precompute nexus-to-nexus, entity-to-nexus, and exception entity-to-entity costs. This process 1630 may be used to ease run-time computational burdens.

If there is a relatively small number of entities in the database schema 420, a simple breadth first search may be used to determine the costs of paths, and thus the cheapest path, between each of the entities. For example, in a database schema having 100 entities, storing the cheapest paths for 10,000 entity pair combinations is feasible given current (year 2000) memory technology and cost, and those computing devices typically used by potential end users of the present invention.

If, on the other hand, there is a relatively large number of entities in the database schema 420, in order to save storage resources, nexus-to-nexus cheapest path, entity with cheapest path nexus, and exception entity-to-entity cheapest paths may be stored. For example, in a database schema having 1000 entities, storing the cheapest paths for 1,000,000 entity pair combinations may not be feasible given current memory technology and cost, and those computing devices typically used by potential end users of the present invention. FIG. 22 is a high level flow diagram of an exemplary method 1630' which may be used to effect this process 1630.

Referring to FIG. 22, all entities and nexuses are accepted as shown in block 2205. As shown by loop 2210-2230, blocks 2220 and 2225 are performed for each pair of nexuses. First, as shown in block 2220, all paths between a given nexus pair are determined, for example, by using a breadth first search. Then, the least expensive path between the nexus pair is saved as shown in block 2225. If each entity or relationship in the database schema 420 is assigned the same cost, the least expensive path(s) will correspond to the shortest path(s).

As shown by nested loops 2235-2265 and 2240-2255, blocks 2245 and 2250 are performed for each entity-nexus pair. First, for a given entity and nexus, all paths between the entity and the nexus are determined as shown in block 2245. These paths may be determined by using a breadth first search for example. Then, the least expensive of these paths is saved as shown in block 2250. As shown by block 2260, which is outside the nexus loop 2240-2255 but inside the entity loop 2235-2265, for each entity, the least expensive path between it and any of the nexuses is saved. More specifically, for each entity, only paths to the nexuses that are closest to it are saved. To do this, the paths from that entity to every nexus are examined, but the paths to every nexus are not saved. As was the case above, if each entity or relationship in the database schema 420 is assigned the same cost, the least expensive path(s) will correspond to the shortest path(s).

Typically, the least expensive path between two entities will be (i) the least expensive path between the first entity and one of the nexuses, (ii) the least expensive path between the second entity and one of the nexuses, and (iii) the least expensive path between the two nexuses (unless they are the same). However, there will be some exceptions. Therefore, as shown in block 2270, these exceptions are determined. Basically, for each entity pair, the least expensive path is determined. This may be done using a depth first search, for example. Then, the actual least expensive path between entities is compared with the least expensive path via nexuses, as determined above. If the costs of the two paths are the same, there is not an exception. If, however, the cost of the least expensive entity-to-entity path is less than the least expensive path via the nexuses, as determined above, then an exception is noted and the entity pairs and the cost of the least expensive path between them is saved. After all exceptions are determined, the method 1630' is left via RETURN node 2275.

Although the computations performed by the path cost pre-computation method 1630' are fairly expensive, since they are performed pre-runtime, computational complexity is not a critical issue. Although simply storing the least expensive path for each entity pair may be practical when there are not too many entities, when there are a lot of entities, by segmenting costs into a least expensive path between each entity and a nexus, a least expensive path between each pair of nexuses, and entity-to-entity exceptions, memory space becomes manageable, albeit at some small runtime cost (to check exceptions and, if necessary to sum the costs of the three path segments).

Having described ways in which path costs can be precomputed, referring back to FIG. 14, an object from the "CuisineType" table 1450 may be joined with an object from the "Neighborhood" table 1460 via: (i) the "is used in" (basically a "BELONGS TO") relationship to the "Cuisine" table 1452; (ii) the "serves" (basically a "BELONGS TO") relationship to the "Restaurant" table 1402; (iii) the "IS A" relationship to the "PersonPlace" table 1406; (iv) the "has a" relationship to the "Address" table 1454; (v) the "is used in" (basically a "BELONGS TO") relationship to the "NeighborhoodContainment" table 1456; and (vi) the "is used in" (basically a "BELONGS TO") relationship to the Neighborhood table 1460. The pattern resulting from this linking path combination operation will include all of the objects (i.e., entity tables and property tables) used in the path.

§ 4.4.2.3.1.2 Estimating the Cost of a State

Referring back to FIGS. 18 through 20, recall that the cost of a state is estimated. Recall further that an estimated cost of a state may be thought of as including a known (or definitive) cost component and an unknown (or heuristic) cost component. Exemplary ways to determine a known cost component of an estimated cost of a state are described in § 4.4.2.3.1.2.1 below. Exemplary ways to determine a heuristic cost component of an estimated cost of a state are described in § 4.4.2.3.1.2.2 below.

§ 4.4.2.3.1.2.1 Known Cost Component of Estimated Cost of a State

Referring to FIG. 16, recall that, initially, states are generated by selecting one pattern from each clique 1612. As shown in FIG. 16, each pattern will typically have an associated cost 1616. As discussed above, these costs may be based on the word class of the word with which the pattern object is associated and/or a degree to which the word of the parsed string "matches" the annotation associated with the pattern object. Further, some cliques may include an "void pattern object" and an associated cost. Basically, the cost associated with a void pattern is a cost of ignoring the word "matching" the annotation associated with the pattern object. For example, it may be determined that ignoring certain words is more expensive than ignoring other words. Thus, for example, the cost of ignoring an adverb or an adjective may be 1, the cost of ignoring a verb may be 3, and a noun cannot be ignored (i.e., infinite cost to ignore or no empty pattern in a clique associated with a noun annotation).

FIG. 23 illustrates initial costs associated with pattern objects in cliques. Suppose, for example, that $P_{1,3}$ $P_{2,2}$ and $P_{3,2}$ are empty patterns and the associated costs correspond to the costs for ignoring the corresponding clique. Although the combination $P_{1,3}$, $P_{2,2}$ and $P_{3,2}$ represents a final solution, it has an estimated and definitive cost of 19 (=5+6+8) (its heuristic or unknown cost is 0), which may not be the lowest overall cost. The other start states are $P_{1,1}$, $P_{2,1}$ and $P_{3,1}$ which has a definitive cost component of 7, $P_{1,1}$, $P_{2,1}$ and $P_{3,2}$ which has a definitive cost component of 11, $P_{1,1}$, $P_{2,2}$ and $P_{3,1}$ which has a definitive cost component of 11, $P_{1,1}$, $P_{2,2}$ and $P_{3,2}$ which has a definitive cost component of 15, $P_{1,2}$, $P_{2,1}$ and $P_{3,1}$ which has a definitive cost component of 9, $P_{1,2}$, $P_{2,1}$ and $P_{3,2}$ which has a definitive cost component of 13, $P_{1,2}$, $P_{2,2}$ and $P_{3,1}$ which has a definitive cost component of 13, $P_{1,2}$, $P_{2,2}$ and $P_{3,2}$ which has a definitive cost component of 17, $P_{1,3}$, $P_{2,1}$ and $P_{3,1}$ which has a definitive cost component of 11, $P_{1,3}$, $P_{2,1}$ and $P_{3,2}$ which has a definitive cost component of 15, and $P_{1,3}$, $P_{2,2}$ and $P_{3,1}$ which has a definitive cost component of 15.

Recall from FIG. 16 that successor states may be generated by combining two patterns of a state. The definitive cost of any such successor state is the definitive cost of its parent state plus the cost of combining the two patterns. For example, the cost of (the action of) combining two pattern objects via entity unification or relationship unification may be zero. The cost of (the action of) combining two pattern objects by joining them via a path consistent with the database schema 420 may be the sum of the costs of all entities and relationships in the path, less the cost of any entities in the path that are type compatible (as described above for example) with entities in one of the pattern objects in the original state. More specifically, original entities and relationships are those that appeared in the cliques given as input, in contrast to those introduced through join operations (unless they were later unified with original entities and relationships). Thus, in every pattern, for each entity and relationship in that pattern, the original patterns from which entity or relationship originated from, if any, are tracked. (There will be none if it was introduced by a join operation, and more than one if it was involved in a unification between two original patterns.) In one exemplary embodiment, all entities have a cost of 2 and all relationships have a cost of 1. If "blurb" entities exist, they may be provided with a higher cost (e.g., 3.1) since they appear across multiple cliques 1612. Although the costs of all entities in the path that are type compatible with entities in one of the patterns of the original state are not included in the definitive cost (since they may later be unified with such type compatible entities and are therefore not definitive or absolutely known costs), they are tracked and may be saved for use later in computing the final cost of a solution. (Recall, e.g., block 1865 of FIG. 18.)

Having just described exemplary ways to determine a known cost component of an estimated cost of a state, exemplary ways to determine a heuristic cost component of an estimated cost of a state are described in § 4.4.2.3.1.2.2 below.

§ 4.4.2.3.1.2.2 Unknown (Heuristic) Cost Component of Estimated Cost of a State To reiterate, the purpose of the optimized combination process 1230' is to generate a single connected pattern which includes patterns corresponding to annotations which "match" parsed words or phrases of a natural language query. The best solution will be that single connected pattern having the lowest cost. Recall further that the exemplary optimized combination process 1230" of FIG. 18 employs a state-based, best-first search. Until a solution is found, a state, which includes at least two unconnected patterns has a known cost (which includes the costs of the pattern objects 1640 originally selected from the cliques 1620 (Recall, e.g., FIG. 23.) and costs of combining patterns), and an unknown or heuristic cost. Basically, the unknown or heuristic cost represents a prediction about how much it will cost to combine the remaining unconnected patterns of the state. In this exemplary embodiment of the present invention, the heuristic cost function is defined such that, when combined with the known costs, it undershoots (or more precisely, such that, when combined with the known costs, it will not overshoot) the cost of the final solution. In this way, a globally optimal solution is reached. (Recall, however, that pruning used to ease run time computations may, in some cases, cause the optimized combination process 1230' to return a non-optimal solution as its first solution. This is why the optimized combination process 1230' may return more than one solution within a time out period. (Recall, e.g., blocks 1870, 1875, and 1885 of FIG. 18.))

An exemplary cost heuristic to determine the unknown cost component of a state's estimated cost will (i) determine all of the least expensive ways to combine any two patterns of the state and (ii) determine all applicable discounts (Recall, e.g., the hint sets 1620 of FIG. 16.). The exemplary cost heuristic will then define the unknown cost component of the state's estimated cost as (i) the most expensive of all of the least expensive ways to combine any two patterns of the state, as determined above, less (ii) the largest of any of the applicable discounts determined above.

Assuming that (the action of) unifying entities or relationships costs less than (the action of) joining patterns via a path composed of entities and relationships in the database schema 420, unification is preferred over joining. In this case, FIG. 21 is a high level flow diagram of an exemplary method for determining a minimum cost "action" (i.e., a minimum cost to combine two patterns). First, as shown in block 2110, the two patterns to be combined, the database schema 420 and the precomputed costs 1640 are accepted. Then, as shown in decision block 2120, it is determined whether or not an entity of one pattern may be unified with an entity of the other pattern or a relationship of the one pattern may be unified with a relationship of the other pattern. Recall that entities can be unified if they are type compatible. Recall further that relationships can be unified if (i) the relationships are type compatible, (ii) the source entities of the relationships are type compatible, and (iii) the destination entities of the relationships are type compatible. In any event, if unification is possible, it is performed as shown in block 2130. The cost of the unification (action) may be set to zero.

Referring once again to decision block 2120, if, on the other had, unification is not possible, then a least expensive path between the two patterns is determined. For example, for each entity pair defined by an entity of the first pattern and an entity of the second pattern, a least expensive path is determined. Then, the least expensive of these least expensive paths is determined. Recall that the least expensive path between any two entities may be precomputed for all entity pairs of the database schema 420. Alternatively, recall that the least expensive path between two entities may be determined by (i) determining if the entity-to-entity path cost is an "exception", (ii) if the entity-to-entity path is an exception, accepting the cost of the entity-to-entity exception, (iii) if the entity-to-entity path is not an exception, then determining a sum of a first entity to closest nexus path cost, a second entity to closes nexus path cost, and a closest nexus to closest nexus path cost. Recall that if the all entities in the database schema 420 have the same cost and all relationships in the database schema 420 have the same cost, then least cost paths will correspond to shortest paths.

Referring back to the exemplary heuristic for predicting an unknown component of an estimated cost of a state, recall that when determining a cost of a join action, the costs of any entities in the path joining the patterns, that were type compatible with any entities in the original patterns, were not considered to be a part of the known or definitive cost of the resulting state. If, instead, the cost of such type compatible entities of the path joining the patterns were considered as part of the known or definitive cost (which would be, strictly speaking, improper if it could later be subtracted out), then the unknown cost component of the state's estimated cost, as defined by the exemplary cost heuristic, would subtract such cost(s) of type compatible entities of the path joining the patterns.

The various hint sets may be checked against the state to see if any hints apply. The hint set with the largest total discount from applicable hints may be used to decrease the cost by the total discount from the applicable hints of the given hint set. Thus, only the hints from one of the hint sets are applied. However, if a particular hint is found in more than one hint set, its discount may be increased since it is more likely that that particular hint should apply.

At this point, exemplary methods for optimally combining patterns corresponding to annotations "matching" words or phrases of the parsed query have been described. To reiterate, the resulting single pattern, which is consistent with the database schema 420, is used to generate a structured query to the database. The method for optimally combining described above employed a state-based, best-first (or breadth first) search strategy. Naturally, other methods may be used to attempt to combine such pattern objects. One alternative method is described in § 4.4.2.4 below.

§ 4.4.2.4 Alternative Optimized Combination Method

Referring back to FIGS. 12 and 15, as a result of the steps of parsing the string of the natural language query and determining matches between the parsed string and the indexed annotations-460, groups of rank ordered fragments may be generated.

Basically, each fragment is a collection of (one or more) objects (e.g., at least a part of entity tables or property tables) that are related to one another in accordance with the database design schema 420 (e.g., the ERD). All objects have a "type". For example, referring to the Prolog file of Exhibit A, each column of each table has a defined type. In the exemplary ERD of Exhibit A, the types include: addressType, admissionFlag, cinema, cinemaType, city, cuisineType, date, entity, entityFlag, floating point, genre, hoursType, integer, movie, movieFlag, neighborhood, neighborhoodID, parkingType, paymentType, personPlace, personPlaceFlag, phoneType, price, quality, rating, reservation, restaurant, restaurantFlag, stars, starsID, string, time. As is evident from Exhibit A, different columns of different tables can be of the same type.

Each object is either bound (i.e., confined to a particular set of rows of its type) or unbound (not confined).

As shown in step 1230, the groups of rank ordered fragments are "chained" so that a formal command query may be generated for interpretation by the database management process 470. Basically, the chaining process combines the groups of rank ordered fragments in a way consistent with the annotated database design schema 420 (e.g., the annotated ERD). Once the groups of rank ordered fragments are combined, the objects of the resulting "fragment" can be easily converted to a formal command query.

The order in which groups of rank ordered fragments are combined can affect both (i) the interpretation of the query, and (ii) the time for performing the chaining process. Basically, the groups of rank ordered fragments are arranged based on word order in the initial query.

In the alternative optimized combination method, the groups of rank ordered fragments and the database design schema 420 are accepted. The groups of rank ordered fragments may then be classified into one of three (3) classes (also referred to as "class levels"); namely, "or", "order" and "normal". "Or" fragments represent a disjunction in the query and are related to the word "or" in the parsed string. "Order" fragments are related to ordering the result set by some criteria. For example, a returned list of restaurants may be ordered from "best" to "worst" or from "least expensive" to "most expensive". "Normal" fragments are all of the remaining fragments.

A chaining process then attempts to "combine" fragments in adjacent groups of rank ordered fragments, from left to right in the query, within each class. More specifically, the groups of fragments in the "or" class are processed first. If fragments in groups adjacent to an "or" group can be chained, they are. Otherwise, a next "or" group is tried. If no more groups of fragments adjacent to an "or" group of fragments can be chained, chaining is attempted between adjacent "order" class groups of fragments. Upon any successful chaining, processing goes back to the "or" group(s) of fragments. If no more groups of "order" fragments can be chained, chaining is attempted between adjacent "normal" groups of fragments. Upon any successful chaining, processing goes back to the "or" group(s) of fragments. If no more groups of "normal" fragments can be chained, the chaining processing exits.

Thus, if a pair of fragments can be "combined", the new combined fragment replaces both component fragments and the process continues by processing "or" groups of fragments. If no fragments in the adjacent groups of rank ordered fragments can be "combined", another pair of adjacent groups of rank ordered fragments is tried. If all groups of rank ordered fragments at a given class level are tried but cannot be "combined", the process proceeds to the next class level.

For example, assume that the query:

Japanese restaurant or Chinese restaurant in Soho or TriBeCa is entered. After the parsing, matching and group generation steps discussed above with reference to FIG. 12 are carried out, there will be two (2) "OR" groups, no "ORDER" groups, and six (6) "NORMAL" groups. Chaining processing will occur as follows. In the following example, whether or not the chaining is possible is simply stated. The ways in which fragments can be chained by unification or joining, as described in § 4.4.2.3.1.1 above.

The first "OR" group has adjacent "NORMAL" groups with fragments matching "restaurant" and "Chinese". The fragments of these groups cannot be chained. However, the second "OR" group has adjacent normal groups with fragments matching "Soho" and "TriBeCa". The fragments of these groups can be, and are, chained. Since there are no more "OR" groups, "ORDER" groups are processed. Since there are no "ORDER" groups, the first pair of adjacent "NORMAL" groups are processed.

The fragments of the "Japanese" group and the "restaurant" group can be, and are, combined. The "OR" fragment group(s) is now revisited for further processing.

Adjacent to the "OR" group is the group having the combined fragments from the former "Japanese" and "restaurant" groups and the "Chinese" fragment group. The fragments of these fragment groups cannot be chained. Since there are no more "OR" groups, and no "ORDER" groups, the "NORMAL" groups are now processed. Again, the group having the combined fragments from the former "Japanese" and "restaurant" groups cannot be chained with the "Chinese" fragment group. The next pair of adjacent "NORMAL" fragment groups are tried, namely, the "Chinese" fragment group and the "restaurant" fragment group. These fragment groups can be, and are, combined. The "OR" fragment group(s) is now revisited for further processing.

Adjacent to the "OR" fragment group is the fragment group having the combined fragments from the former "Japanese" and "restaurant" groups and the fragment group having the combined fragments from the former "Chinese" and "restaurant" groups. The fragments of these groups can be, and are, chained. There are now no more "OR" groups, and recall no "ORDER" groups. None of the remaining "NORMAL" groups can be further combined. Accordingly, the chaining processing is complete for the foregoing exemplary query.

As was the case with the optimized combination method employing a state-based, best-first (or depth-first) search strategy, in this alternative optimized combination method, since there may be a number of different paths between different objects of two (2) fragments, the path between two (2) objects of the fragments should be an optimum path. To reiterate, such an optimum path may be determined as follows. First, since each of the fragments to be chained may have more than one (1) object, the two (2) objects of the fragments to be joined must be determined. These two (2) objects may be selected based on an ERD distance criteria, and, in the event of a tie, then based on a query distance criteria.

§ 4.4.3 Operation of the Query Translator

Having described the functions and an exemplary structure (methodology) for the query translator (query translator process), an example which illustrates the operation of the exemplary translator (process) is presented below. An expanded version of the example, with detailed intermediate values and more details of the chaining process, is found in Exhibit B. In the following, the intermediate steps of the query translation steps to the query "Where can I get vegetarian food in Montlake?" are shown.

First, a number of candidate fragments are shown for each word. Four (4) groups of candidate fragments are depicted below:

```
[[5, 9,
    [[where], 0, 1,
    [addressType]],
    [[vegetarian], 4, 1, table(cuisineType, 10120, 0)],
    [[food], 5, 1,
    [cuisineType]],
    [[in], 6,1,
    [containment]],
    [[montlake], 7, 1, table(neighborhood, 10193, 0)]],
[5, 9,
    [[where], 0, 1,
    [addressType]],
    [[vegetarian], 4, 1, table(cuisineType, 10120, 0)],
    [[food], 5, 1,
    [cuisineType]],
    [[in], 6, 1,
    [city]],
    [[montlake], 7, 1, table(neighborhood, 10193, 0)]],
[4.5, 8,
    [[where], 0, 1,
    [addressType]],
    [[vegetarian], 4, 1, table(cuisineType, 10120, 0)],
    [[food], 5, 1,
    [cuisineType]],
    [[in], 6, 1,
    [city]],
    [[montlake], 7, 0.5, table(restaurant, 12100, 1)]],
[4.5, 10,
    [[where], 0, 1,
    [addressType]],
    [[vegetarian], 4, 1, table(cuisineType, 10120, 0)],
    [[food], 5, 1,
    [cuisineType]],
    [[in], 6, 1,
    [containment]],
    [[montlake], 7, 0.5, table(restaurant, 12100, 1)]]]
```

In each of the groups of fragments, a total weight and total number of matching words or phrases are first printed. Then, each matching word, its position in the parsed query, its weight, and its associated fragment (from the indexed annotations) is depicted.

For example, in the first group of fragments, a total weight is 5 (=1+1+1+1+1). The word "where" is first (0) word of the parsed query and is associated with a fragment having the addressType table object. The word "vegetarian" is the fifth (4) word of the parsed query and is associated with a fragment having a particular (i.e., bound to row 10120) cuisineType of the cuisineType table object. The word "food" is the sixth (5) word of the parsed query and is associated with a fragment having the cuisineType table object. The word "in" is the seventh (6) word of the parsed query and is associated with a fragment having the containment table object. Finally, the word "montlake" is the eighth (7) word of the parsed query and is associated with a fragment having a particular (i.e., bound to row 10193) value in the neighborhood table object. The second, third, and fourth fragment groups are not discussed in detail. Note, however, that the word "in" is associated with both city table and containment table objects. Similarly, the word "montlake" is associated with both a particular row of the neighborhood table and a particular row of the restaurant table.

The following depicts the highest ranking fragments for each word (or phrase) of the parsed query:

```
"Where can I get vegetarian food in Montlake?"
% Fragments
[[[where], 0, 1,
  [addressType]],
 [[vegetarian], 4, 1, table(cuisineType, 10120, 0)],
 [[food], 5, 1,
  [cuisineType]],
 [[in], 6, 1,
  [containment]],
 [[montlake], 7, 1, table(neighborhood, 10193, 0)]]
```

Recall that for each word (or phrase) of the parsed query, fragments are rank ordered, pursuant to some ranking criteria, from the candidate fragments associated with annotations "matching" words or phrases of the natural language query. Recall also that the fragment groups are assigned to one (1) of three (3) class levels; namely or, order, or normal. Finally, recall that for each class level, an attempt is made to chain fragments, from left to right, as they appear in the query.

Referring to FIG. 14 and Appendix A, since the containment property table 1456 (referred to as the Neighborhood-Containment table in FIG. 14) is an attribute of (related by an "is used in" relationship to) the neighborhoodID entity table 1460, the fragments having these objects may be chained via linking.

Referring to FIG. 14, the containment property table 1465 may then be chained with the address type property table 1470 via the address table 1454 in a linking operation. All three (3) of these tables have an AddressTypeId object. Still referring to FIG. 14, the address table 1454 may then be linked with the CuisineType table 1450 via the (unified) Cuisine table 1452 (common CuisineTypeID object), the (unified) Restaurant table 1402 (common RestaurantID object), and the (unified) PersonPlace table 1406 (common PersonPlace ID object).

The results of the chaining process are reprinted below:

```
[[[neighborhood(9538, 6), restaurant(_G17854, 4),
  addressType(_G17838, 0), cuisineType(53, 4)],
  [containment, containmentPPID(_G17854),
  containmentATID(_G17838), containmentNID(9538)],
  [address, addressPPID(_G17854), longitude(_G22170),
  latitude(_G22178), state(_G22186), city(_G22194),
  sa2(_G22202), sa1(_G22210),
  addressATID(_G17838)],
  [cuisine, cuisineRID(_G17854), cuisineCTID(53)],
  [personPlace, personPlaceID(_G17854)],
  [restaurant, restaurantID(_G17854)],
  [entity, entityID(_G17854), ol(1), name(_G24327)],
  [addressType, addressTypeID(_G17838)]]]
```

In the foregoing, a value with an underscore initially followed by a capital letter (e.g., "_G22210") denotes a variable or "unbound" object. For example, in the first set of brackets, in the "neighborhood(9538, 6)" object, the value "9538" grounds the neighborhood value to a neighborhood containing montlake. The "restaurant(_G17854, 4)" object is unbound as denoted by the value "_G17854". The "addressType(_G17838, 0) object is unbound as denoted by the value "_G17838". Finally, in the "cuisineType(53, 4)" object, the value "53" grounds the cuisineType value to vegetarian.

Logical rules may be used to drop out tables with no additional properties. Note that "entities" are described in an entity table. For example, the table [cuisinetype, cuisinetypeID(53)] may be dropped.

A formal command query (e.g., an SQL query) is generated from these values. The formal command query is reprinted below:

```
% SQL Where can I get vegetarian food in Montlake?
SELECT DISTINCT
  e20.Name,
  a19.StreetAddress1,
  a19.StreetAddress2,
  a19.CityText,
  a19.StateOrProvinceCode,
  a19.LocationLatitudeNumber,
  a19.LocationLongitudeNumber,
  r14.RestaurantID
FROM
  AddressType AS at16,
  Restaurant AS r14,
  Address AS a19,
  NeighborhoodContainment AS nc12,
  Cuisine AS c16,
  Entity AS e20,
  PersonPlace AS pp16
WHERE
  a19.PersonPlaceID = r14.RestaurantID AND
  a19.AddressTypeID = at16.AddressTypeID AND
  nc12.PersonPlaceID = r14.RestaurantID AND
  nc12.AddressTypeID = at16.AddressTypeID AND
  nc12.NeighborhoodID = 9538 AND
  c16.RestaurantID = r14.RestaurantID AND
  c16.CuisineTypeID = 53 AND
  e20.EntityID = r14.RestaurantID AND
  e20.OnLineIndicator = 1 AND
  pp16.PersonPlaceID = r14.RestaurantID
```

The "SELECT DISTINCT" values define what will be returned (e.g., presented) to the user. These values are derived from (i) columns with variables not referenced elsewhere and (ii) any unbound objects from the original list. The "FROM" commands define the objects. The "WHERE" commands join unified objects.

The values are returned in the following format:

```
[["Restaurant", "StreetAddress 1", "StreetAddress2", "CityText",
    "StateOrProvinceCode", "LocationLatitudeNumber",
  "LocationLongitudeNumber",
    "RestaurantID"],
```

The actual message presented to the user may include the following values:

```
["Galerias", "2355-1/2 10th Ave E", null, "Seattle", "WA",
    9.53384e-307, 9.53384e-307, 3754]]
```

Thus, the query translation process (or query translator) 450 may include a presentation process (or more generally, a presentation facility). More specifically, the result of chaining is a set of objects (constraints) used for selecting desired information from the database. However, these objects (constraints) do not indicate how to render the desired information to the user. The presentation process (or facility) adds annotations to (i.e., marks) the query. These annotations indicate which objects in the query should be returned and how they should be named.

The objects in a query to be returned are determined based on whether or not the word "what" was in the natural language query. If the natural language query does not include the word "what", then all objects that refer to more than one (1) row are marked for presentation. That is, unbound objects and bound objects with at least two (2) rows are marked for presentation. If, on the other hand, the natural language query includes the word "what", then the marking is more involved. First, all objects are sorted by the minimum (left most) position in the natural language query of the word that generated (i.e., matched an annotation associated with) the object. If there is a tie, objects of entity tables are put before objects of property tables. Then, the first object of the sorted list that refers to more than one (1) row, and all of its properties, are marked for output. An object is named by referring to the column found in the description annotation for that object's class. These names are then used as columns in the SQL "SELECT DISTINCT" statement.

The above example was provided merely to illustrate the operation of one structure (or methodology) of an exemplary query translator (process). Naturally, other structures (or processes) may be used without departing from the present invention.

§ 5.0 CONCLUSIONS

Thus, a natural language interface to stored information, which is both (i) easy to author and (ii) robust, is disclosed above.

What is claimed is:

1. An apparatus comprising:
   a processor;
   a memory operatively coupled to the processor, the memory containing processor executable components comprising:
      an authoring tool to annotate components of a database design schema thereby generating annotations;
      an indexer for indexing the annotations, which are generated by the authoring tool, responsive to a plurality of classifications that are based on information contained in a dictionary and concordance, wherein the indexer comprises:
         a normalizer for assigning a normalized weight to words of each annotation, based on classifications associated with the words, such that the normalizer assigns more weight to more distinct words than to less distinct words; and
      a query translator for performing operations comprising:
         accepting a natural language query;
         converting the natural language query to a command query using the database design schema and indexed annotations generated by the authoring tool; and
         presenting the command query to a database management process for interrogating a database;
         wherein converting the natural language query to the command query comprises:
            parsing the natural language query;
            determining whether a word or phrase of the natural language query matches the indexed annotations;
            for a matching word or phrase of the natural language query, generating a group of fragments, wherein the fragments comprise components of the database design schema associated with matching indexed annotations;
            for the matching word or phrase of the natural language query, ranking the group of fragments to generate a group of ranked fragments according to ranking criteria; and
            chaining the fragments from a plurality of groups of ranked fragments together to generate the command query.

2. The apparatus of claim 1 wherein the components of the database design schema annotated by the authoring tool comprise tables, rows, columns, and relationships.

3. The apparatus of claim 1 wherein the indexer further comprises:
   a classifier for classifying words of the annotations based on the dictionary and concordance so that the words have an associated classification from the plurality of classifications.

4. The apparatus of claim 3 wherein the classifier classifies words based on a degree to which the words are distinct, as determined from the dictionary and concordance.

5. The apparatus of claim 1, wherein the information contained in the dictionary and concordance comprises frequencies of words therein, and a classification of the plurality of classifications is derived from the frequencies.

6. The apparatus of claim 1, wherein the plurality of classifications comprises eight classes, and wherein the words belong to a word class comprising adverb, adjective, verb, noun, and pronoun.

7. A computer-implemented method comprising:
   operating on a computer a system to annotate a database design schema to facilitate a natural language interface to stored information via operations comprising:
   annotating components of the database design schema thereby generating annotations;
   indexing the annotations in response to a plurality of classifications based on information contained in a dictionary and concordance;

assigning a normalized weight to words of each annotation, based on classifications associated with the words, such that more weight is assigned to more distinct words than to less distinct words;

accepting a natural language query;

converting the natural language query to a command query using the database design schema, and indexed annotations generated by the authoring tool, wherein the converting comprises:

parsing the natural language query;

determining whether a word or phrase of the natural language query matches the indexed annotations;

for a matching word or phrase of the natural language query, generating a group of fragments, wherein the fragments comprise components of the database design schema associated with matching indexed annotations;

for the matching word or phrase of the natural language query, ranking the criteria of fragments to generate a group of ranked fragments according to ranking criteria; and chaining the fragments from a plurality of groups of ranked fragments together to generate the command query; and presenting the command query to a database management process for interrogating a database.

8. The method of claim 7 further comprising:

classifying words of the annotations based on the dictionary and concordance so that the words have an associated classification from the plurality of classifications.

9. The method of claim 8 wherein the classifying is based on a degree to which the words are distinct, as determined from the dictionary and concordance.

10. The method of claim 7 wherein the plurality of classifications comprises eight classes, and wherein the words belong to a word class comprising adverb, adjective, verb, noun, and pronoun.

11. The method of claim 7 wherein the components of the database design schema comprise tables, rows, columns, and relationships.

12. The method of claim 7, wherein the information contained in the dictionary and concordance comprises frequencies of words therein, and a classification of the plurality of classifications is derived from the frequencies.

13. One or more computer-readable storage media having one or more computer executable modules embodied thereon, the computer-executable modules encoded for execution on a computer to configure the computer to perform operations comprising:

annotating components of a database design schema thereby generating annotations;

indexing the annotations, responsive to a plurality of classifications that are based on information contained in a dictionary and concordance;

assigning a normalized weight to words of each annotation, based on classifications associated with the words, such that more weight is assigned to more distinct words than to less distinct words;

accepting a natural language query;

converting the natural language query to a command query using the database design schema, and indexed annotations generated by the authoring tool, wherein the converting comprises:

parsing the natural language query;

determining whether a word or phrase of the natural language query matches the indexed annotations;

for a matching word or phrase of the natural language query, generating a group of fragments, wherein the fragments comprise components of the database design schema associated with matching indexed annotations;

for the matching word or phrase of the natural language query, ranking the group of fragments to generate a group of ranked fragments according to ranking criteria; and chaining the fragments from a plurality of groups of ranked fragments together to generate the command query; and presenting the command query to a database management process for interrogating a database.

14. The one or more computer-readable storage media of claim 13, further comprising:

classifying words of the annotations based on the dictionary and concordance so that the words have an associated classification from the plurality of classifications.

15. The one or more computer-readable storage media of claim 14, wherein the classifying is based on a degree to which the words are distinct, as determined from the dictionary and concordance.

16. The one or more computer-readable storage media of claim 13, wherein the plurality of classifications comprises eight classes, and wherein the words belong to a word class comprising adverb, adjective, verb, noun, and pronoun.

17. The one or more computer-readable storage media of claim 13, wherein the components of the database design schema comprise tables, rows, columns, and relationships.

18. The one or more computer-readable storage media of claim 13, wherein the information contained in the dictionary and concordance comprises frequencies of words therein, and a classification of the plurality of classifications is derived from the frequencies.

* * * * *